(12) United States Patent
Samachisa et al.

(10) Patent No.: US 12,550,382 B2
(45) Date of Patent: Feb. 10, 2026

(54) THIN-FILM STORAGE TRANSISTOR WITH FERROELECTRIC STORAGE LAYER

(71) Applicant: SUNRISE MEMORY CORPORATION, San Jose, CA (US)

(72) Inventors: George Samachisa, Atherton, CA (US); Vinod Purayath, Sedona, AZ (US); Wu-Yi Henry Chien, San Jose, CA (US); Eli Harari, Saratoga, CA (US)

(73) Assignee: SUNRISE MEMORY CORPORATION, San Jose, CA (US)

( * ) Notice: Subject to any disclaimer, the term of this patent is extended or adjusted under 35 U.S.C. 154(b) by 988 days.

(21) Appl. No.: 17/674,137

(22) Filed: Feb. 17, 2022

(65) Prior Publication Data

US 2022/0173251 A1 Jun. 2, 2022

Related U.S. Application Data

(63) Continuation-in-part of application No. 17/155,673, filed on Jan. 22, 2021, now Pat. No. 11,515,432.

(60) Provisional application No. 63/153,273, filed on Feb. 24, 2021, provisional application No. 63/152,266, filed on Feb. 22, 2021, provisional application No.
(Continued)

(51) Int. Cl.
| | |
|---|---|
| *H10D 30/69* | (2025.01) |
| *G11C 11/22* | (2006.01) |
| *H10B 51/10* | (2023.01) |
| *H10B 51/20* | (2023.01) |
| *H10B 51/30* | (2023.01) |
| *H10D 30/01* | (2025.01) |
| *H10D 30/67* | (2025.01) |

(52) U.S. Cl.
CPC ......... *H10D 30/701* (2025.01); *G11C 11/223* (2013.01); *H10B 51/10* (2023.02); *H10B 51/20* (2023.02); *H10B 51/30* (2023.02); *H10D 30/0415* (2025.01); *H10D 30/6755* (2025.01); *H10D 30/6757* (2025.01); *H10D 30/711* (2025.01)

(58) Field of Classification Search
CPC ........... H10D 30/0415; H10D 30/6755; H10D 30/6757; G11C 11/223
See application file for complete search history.

(56) References Cited

U.S. PATENT DOCUMENTS

| | | |
|---|---|---|
| 4,213,139 A | 7/1980 | Rao |
| 4,984,153 A | 1/1991 | Kregness et al. |

(Continued)

FOREIGN PATENT DOCUMENTS

| | | | | |
|---|---|---|---|---|
| CN | 102436846 A | * | 5/2012 | ......... G11C 11/4097 |
| CN | 109087949 A | * | 12/2018 | ........... H10D 64/689 |

(Continued)

OTHER PUBLICATIONS

"Invitation to Pay Additional Fees, PCT/US2019/065256", Feb. 13, 2020, 2 pages.

(Continued)

*Primary Examiner* — Mohammad M Choudhry

(57) ABSTRACT

By harnessing the ferroelectric phases in the charge storage material of thin-film storage transistors of a 3-dimensional array of NOR memory strings, the storage transistors are adapted to operate as ferroelectric field-effect transistors ("FeFETs"), thereby providing a very high-speed, high-density memory array.

38 Claims, 25 Drawing Sheets

Related U.S. Application Data

62/992,754, filed on Mar. 20, 2020, provisional application No. 62/964,472, filed on Jan. 22, 2020.

(56) References Cited

U.S. PATENT DOCUMENTS

| | | |
|---|---|---|
| 5,388,246 A | 2/1995 | Kasai |
| 5,583,808 A | 12/1996 | Brahmbhatt |
| 5,646,886 A | 7/1997 | Brahmbhatt |
| 5,656,842 A | 8/1997 | Iwamatsu |
| 5,768,192 A | 6/1998 | Eitan |
| 5,789,776 A | 8/1998 | Lancaster et al. |
| 5,880,993 A | 3/1999 | Kramer et al. |
| 5,915,167 A | 6/1999 | Leedy |
| 6,040,605 A | 3/2000 | Sano et al. |
| 6,049,497 A | 4/2000 | Yero |
| 6,057,862 A | 5/2000 | Margulis |
| 6,107,133 A | 8/2000 | Furukawa et al. |
| 6,118,171 A | 9/2000 | Davies et al. |
| 6,130,838 A | 10/2000 | Kim et al. |
| 6,313,518 B1 | 11/2001 | Ahn et al. |
| 6,314,046 B1 | 11/2001 | Kamiya et al. |
| 6,362,508 B1 | 3/2002 | Rasovaky et al. |
| 6,396,744 B1 | 5/2002 | Wong |
| 6,434,053 B1 | 8/2002 | Fujiwara |
| 6,580,124 B1 | 6/2003 | Cleeves et al. |
| 6,587,365 B1 | 7/2003 | Salling |
| 6,627,503 B2 | 9/2003 | Ma |
| 6,744,094 B2 | 6/2004 | Forbes |
| 6,754,105 B1 | 6/2004 | Chang et al. |
| 6,774,458 B2 | 8/2004 | Fricke et al. |
| 6,873,004 B1 | 3/2005 | Han et al. |
| 6,881,994 B2 | 4/2005 | Lee et al. |
| 6,946,703 B2 | 9/2005 | Ryu et al. |
| 7,005,350 B2 | 2/2006 | Walker et al. |
| 7,177,977 B2 | 2/2007 | Chen et al. |
| 7,223,653 B2 | 5/2007 | Cheng et al. |
| 7,307,308 B2 | 12/2007 | Lee |
| 7,465,980 B2 | 12/2008 | Arimoto et al. |
| 7,489,002 B2 | 2/2009 | Forbes et al. |
| 7,512,012 B2 | 3/2009 | Kuo |
| 7,524,725 B2 | 4/2009 | Chung |
| 7,542,348 B1 | 6/2009 | Kim |
| 7,612,411 B2 | 11/2009 | Walker |
| 7,709,359 B2 | 5/2010 | Boes et al. |
| 7,804,145 B2 | 9/2010 | Shimizu et al. |
| 7,872,295 B2 | 1/2011 | Park et al. |
| 7,898,009 B2 | 3/2011 | Wilson et al. |
| 8,026,521 B1 | 9/2011 | Or-Bach et al. |
| 8,139,418 B2 | 3/2012 | Carman |
| 8,178,396 B2 | 5/2012 | Sinha et al. |
| 8,237,213 B2 | 8/2012 | Liu |
| 8,242,504 B2 | 8/2012 | Kim |
| 8,278,183 B2 | 10/2012 | Lerner |
| 8,304,823 B2 | 11/2012 | Boescke |
| 8,383,482 B2 | 2/2013 | Kim et al. |
| 8,395,942 B2 | 3/2013 | Samachisa et al. |
| 8,604,618 B2 | 12/2013 | Cooney et al. |
| 8,630,114 B2 | 1/2014 | Lue |
| 8,743,612 B2 | 6/2014 | Choi et al. |
| 8,767,436 B2 | 7/2014 | Scalia et al. |
| 8,767,473 B2 | 7/2014 | Shim et al. |
| 8,848,425 B2 | 9/2014 | Schloss |
| 8,878,278 B2 | 11/2014 | Alsmeier et al. |
| 9,053,801 B2 | 6/2015 | Sandhu et al. |
| 9,053,802 B2 | 6/2015 | Mueller |
| 9,190,293 B2 | 11/2015 | Wang et al. |
| 9,202,694 B2 | 12/2015 | Konevecki et al. |
| 9,219,225 B2 | 12/2015 | Karda et al. |
| 9,230,985 B1 | 1/2016 | Wu et al. |
| 9,231,206 B2 | 1/2016 | Tao et al. |
| 9,263,577 B2 | 2/2016 | Ramaswamy et al. |
| 9,281,044 B2 | 3/2016 | Ramaswamy et al. |
| 9,299,580 B2 | 3/2016 | Kong et al. |
| 9,337,210 B2 | 5/2016 | Karda et al. |
| 9,362,487 B2 | 6/2016 | Inumiya et al. |
| 9,391,084 B2 | 7/2016 | Lue |
| 9,412,752 B1 | 8/2016 | Yeh et al. |
| 9,455,268 B2 | 9/2016 | Oh et al. |
| 9,472,560 B2 | 10/2016 | Ramaswamy et al. |
| 9,530,794 B2 | 12/2016 | Ramaswamy et al. |
| 9,558,804 B2 | 1/2017 | Mue |
| 9,620,605 B2 | 4/2017 | Liang et al. |
| 9,633,944 B2 | 4/2017 | Kim |
| 9,698,152 B2 | 7/2017 | Peri |
| 9,711,529 B2 | 7/2017 | Hu et al. |
| 9,748,172 B2 | 8/2017 | Takaki |
| 9,786,684 B2 | 10/2017 | Ramaswamy et al. |
| 9,799,761 B2 | 10/2017 | Or-Bach et al. |
| 9,818,468 B2 | 11/2017 | Müller et al. |
| 9,818,848 B2 | 11/2017 | Sun et al. |
| 9,830,969 B2 | 11/2017 | Slesazeck et al. |
| 9,842,651 B2 | 12/2017 | Harari |
| 9,865,680 B2 | 1/2018 | Okumura et al. |
| 9,875,784 B1 | 1/2018 | Li et al. |
| 9,876,018 B2 | 1/2018 | Chavan et al. |
| 9,892,800 B2 | 2/2018 | Harari |
| 9,911,497 B1 | 3/2018 | Harari |
| 9,941,299 B1 | 4/2018 | Chen et al. |
| 10,014,317 B2 | 7/2018 | Peng |
| 10,038,092 B1 | 7/2018 | Chen et al. |
| 10,043,567 B2 | 8/2018 | Slesazeck et al. |
| 10,056,393 B2 | 8/2018 | Schroeder et al. |
| 10,074,667 B1 | 9/2018 | Higashi |
| 10,090,036 B2 | 10/2018 | Van Houdt |
| 10,096,364 B2 | 10/2018 | Harari |
| 10,121,553 B2 | 11/2018 | Harari et al. |
| 10,157,780 B2 | 12/2018 | Wu et al. |
| 10,211,223 B2 | 2/2019 | Van Houdt et al. |
| 10,211,312 B2 | 2/2019 | Van Houdt et al. |
| 10,217,667 B2 | 2/2019 | Or-Bach et al. |
| 10,249,370 B2 | 4/2019 | Harari |
| 10,254,968 B1 | 4/2019 | Gazit et al. |
| 10,283,493 B1 | 5/2019 | Nishida |
| 10,319,696 B1 | 6/2019 | Nakano |
| 10,355,121 B2 | 7/2019 | Or-Bach et al. |
| 10,373,956 B2 | 8/2019 | Gupta et al. |
| 10,381,370 B2 | 8/2019 | Shin et al. |
| 10,381,378 B1 | 8/2019 | Harari |
| 10,395,737 B2 | 8/2019 | Harari |
| 10,403,627 B2 | 9/2019 | Van Houdt et al. |
| 10,418,377 B2 | 9/2019 | Van Houdt et al. |
| 10,424,379 B2 | 9/2019 | Slesazeck et al. |
| 10,431,596 B2 | 10/2019 | Herner et al. |
| 10,438,645 B2 | 10/2019 | Muell et al. |
| 10,460,788 B2 | 10/2019 | Mueller |
| 10,475,812 B2 | 11/2019 | Harari |
| 10,510,773 B2 | 12/2019 | Ramaswamy et al. |
| 10,600,808 B2 | 3/2020 | Schröder et al. |
| 10,608,008 B2 | 3/2020 | Harari et al. |
| 10,608,011 B2 | 3/2020 | Harari et al. |
| 10,622,051 B2 | 4/2020 | Mueller et al. |
| 10,622,377 B2 | 4/2020 | Harari et al. |
| 10,636,471 B2 | 4/2020 | Ramaswamy et al. |
| 10,650,892 B2 | 5/2020 | Noack |
| 10,651,153 B2 | 5/2020 | Fastow et al. |
| 10,651,182 B2 | 5/2020 | Morris et al. |
| 10,651,196 B1 | 5/2020 | Sharangpani et al. |
| 10,692,837 B1 | 6/2020 | Nguyen et al. |
| 10,692,874 B2 | 6/2020 | Harari et al. |
| 10,700,093 B1 | 6/2020 | Kalitsov et al. |
| 10,720,437 B2 | 7/2020 | Yoo |
| 10,825,834 B1 | 11/2020 | Chen |
| 10,872,905 B2 | 12/2020 | Muel |
| 10,879,269 B1 | 12/2020 | Zhang et al. |
| 10,896,711 B2 | 1/2021 | Lee et al. |
| 10,937,482 B2 | 3/2021 | Sharma et al. |
| 10,950,616 B2 | 3/2021 | Harari et al. |
| 11,043,280 B1 | 6/2021 | Prakash et al. |
| 11,171,157 B1 | 11/2021 | Lai et al. |
| 11,217,494 B1 | 1/2022 | Young et al. |
| 11,411,025 B2 | 8/2022 | Lai et al. |
| 2001/0030340 A1 | 10/2001 | Fujiwara |
| 2001/0053092 A1 | 12/2001 | Kosaka et al. |
| 2002/0012271 A1 | 1/2002 | Forbes |

(56) References Cited

U.S. PATENT DOCUMENTS

| | | |
|---|---|---|
| 2002/0028541 A1 | 3/2002 | Lee et al. |
| 2002/0051378 A1 | 5/2002 | Ohsawa |
| 2002/0193484 A1 | 12/2002 | Albee |
| 2003/0038318 A1 | 2/2003 | Forbes |
| 2004/0214387 A1 | 10/2004 | Madurawe et al. |
| 2004/0246807 A1 | 12/2004 | Lee |
| 2004/0262681 A1 | 12/2004 | Masuoka et al. |
| 2004/0262772 A1 | 12/2004 | Ramanathan et al. |
| 2004/0264247 A1 | 12/2004 | Kim |
| 2005/0128815 A1 | 6/2005 | Ishikawa et al. |
| 2005/0218509 A1 | 10/2005 | Kipnis et al. |
| 2005/0236625 A1 | 10/2005 | Schuele et al. |
| 2005/0280061 A1 | 12/2005 | Lee |
| 2006/0001083 A1 | 1/2006 | Bhattacharyya |
| 2006/0080457 A1 | 4/2006 | Hiramatsu et al. |
| 2006/0140012 A1 | 6/2006 | Wan et al. |
| 2006/0155921 A1 | 7/2006 | Gorobets et al. |
| 2006/0189154 A1 | 8/2006 | Ahn et al. |
| 2006/0212651 A1 | 9/2006 | Ashmore |
| 2006/0261404 A1 | 11/2006 | Forbes |
| 2007/0012987 A1 | 1/2007 | McTeer |
| 2007/0023817 A1 | 2/2007 | Dao |
| 2007/0045711 A1 | 3/2007 | Bhattacharyya |
| 2007/0134876 A1 | 6/2007 | Lai et al. |
| 2007/0192518 A1 | 8/2007 | Rupanagunta et al. |
| 2008/0022026 A1 | 1/2008 | Yang et al. |
| 2008/0032465 A1 | 2/2008 | Ahn et al. |
| 2008/0054346 A1 | 3/2008 | Saitoh et al. |
| 2008/0160765 A1 | 7/2008 | Lee et al. |
| 2008/0173930 A1 | 7/2008 | Watanabe |
| 2008/0178794 A1 | 7/2008 | Cho et al. |
| 2008/0212358 A1 | 9/2008 | Mitsui |
| 2008/0239812 A1 | 10/2008 | Naofumi et al. |
| 2008/0266960 A1 | 10/2008 | Kuo |
| 2008/0291723 A1 | 11/2008 | Wang et al. |
| 2008/0301359 A1 | 12/2008 | Smith |
| 2009/0057722 A1 | 3/2009 | Masuoka et al. |
| 2009/0140318 A1 | 6/2009 | Dong |
| 2009/0157946 A1 | 6/2009 | Arya |
| 2009/0237996 A1 | 9/2009 | Kirsch et al. |
| 2009/0242966 A1 | 10/2009 | Son et al. |
| 2009/0268519 A1 | 10/2009 | Ishii |
| 2009/0279360 A1 | 11/2009 | Peter et al. |
| 2009/0290442 A1 | 11/2009 | Rajan |
| 2009/0316487 A1 | 12/2009 | Lee et al. |
| 2010/0013001 A1 | 1/2010 | Cho et al. |
| 2010/0121994 A1 | 5/2010 | Kim et al. |
| 2010/0124116 A1 | 5/2010 | Takashi et al. |
| 2010/0128509 A1 | 5/2010 | Kim et al. |
| 2010/0148215 A1 | 6/2010 | Schulze et al. |
| 2010/0207185 A1 | 8/2010 | Lee et al. |
| 2010/0213527 A1 | 8/2010 | Shim et al. |
| 2010/0219392 A1 | 9/2010 | Awaya et al. |
| 2010/0254191 A1 | 10/2010 | Son et al. |
| 2010/0327413 A1 | 12/2010 | Lee et al. |
| 2011/0003418 A1 | 1/2011 | Sakata et al. |
| 2011/0044113 A1 | 2/2011 | Kim |
| 2011/0047325 A1 | 2/2011 | Mishima |
| 2011/0115011 A1 | 5/2011 | Masuoka et al. |
| 2011/0134705 A1 | 6/2011 | Jones et al. |
| 2011/0143519 A1 | 6/2011 | Lerner |
| 2011/0170266 A1 | 7/2011 | Haensh et al. |
| 2011/0208905 A1 | 8/2011 | Shaeffer et al. |
| 2011/0291176 A1 | 12/2011 | Lee et al. |
| 2011/0298013 A1 | 12/2011 | Hwang et al. |
| 2011/0310683 A1 | 12/2011 | Gorobets |
| 2012/0063223 A1 | 3/2012 | Lee |
| 2012/0146126 A1 | 6/2012 | Lai et al. |
| 2012/0182801 A1 | 7/2012 | Lue |
| 2012/0208347 A1 | 8/2012 | Hwang et al. |
| 2012/0223380 A1 | 9/2012 | Lee et al. |
| 2012/0243314 A1 | 9/2012 | Takashi |
| 2012/0307568 A1 | 12/2012 | Banna et al. |
| 2012/0327714 A1 | 12/2012 | Lue |
| 2013/0031325 A1 | 1/2013 | Nakamoto et al. |
| 2013/0256780 A1 | 10/2013 | Kai et al. |
| 2014/0006688 A1 | 1/2014 | Yu et al. |
| 2014/0015036 A1 | 1/2014 | Fursin et al. |
| 2014/0040698 A1 | 2/2014 | Loh et al. |
| 2014/0070289 A1 | 3/2014 | Tanaka et al. |
| 2014/0070290 A1 | 3/2014 | Inumiya et al. |
| 2014/0075135 A1 | 3/2014 | Choi et al. |
| 2014/0112075 A1 | 4/2014 | Dunga et al. |
| 2014/0117366 A1 | 5/2014 | Saitoh |
| 2014/0151774 A1 | 6/2014 | Rhie |
| 2014/0173017 A1 | 6/2014 | Takagi et al. |
| 2014/0213032 A1 | 7/2014 | Kai et al. |
| 2014/0229131 A1 | 8/2014 | Cohen et al. |
| 2014/0247674 A1 | 9/2014 | Karda et al. |
| 2014/0328128 A1 | 11/2014 | Louie et al. |
| 2014/0340952 A1 | 11/2014 | Ramaswamy et al. |
| 2014/0355328 A1 | 12/2014 | Muller et al. |
| 2015/0054507 A1 | 2/2015 | Gulaka et al. |
| 2015/0098272 A1 | 4/2015 | Kasolra et al. |
| 2015/0113214 A1 | 4/2015 | Sutardja |
| 2015/0155876 A1 | 6/2015 | Jayasena et al. |
| 2015/0194440 A1 | 7/2015 | Noh et al. |
| 2015/0220463 A1 | 8/2015 | Fluman et al. |
| 2015/0249143 A1 | 9/2015 | Sano |
| 2015/0263005 A1 | 9/2015 | Zhao et al. |
| 2015/0340371 A1 | 11/2015 | Lui |
| 2015/0372099 A1 | 12/2015 | Chen et al. |
| 2016/0013156 A1 | 1/2016 | Zhai et al. |
| 2016/0019951 A1 | 1/2016 | Park et al. |
| 2016/0035711 A1 | 2/2016 | Hu |
| 2016/0086970 A1 | 3/2016 | Peng |
| 2016/0118404 A1 | 4/2016 | Peng |
| 2016/0141294 A1 | 5/2016 | Peri et al. |
| 2016/0225860 A1 | 8/2016 | Karda et al. |
| 2016/0237567 A1* | 8/2016 | Sieber ............... C23C 16/45508 |
| 2016/0276360 A1 | 9/2016 | Doda et al. |
| 2016/0300724 A1 | 10/2016 | Levy et al. |
| 2016/0314042 A1 | 10/2016 | Plants |
| 2016/0321002 A1 | 11/2016 | Jung et al. |
| 2016/0322368 A1 | 11/2016 | Sun et al. |
| 2016/0358934 A1 | 12/2016 | Lin et al. |
| 2017/0053906 A1 | 2/2017 | Or-Bach et al. |
| 2017/0062456 A1 | 3/2017 | Sugino et al. |
| 2017/0092370 A1 | 3/2017 | Harari |
| 2017/0092371 A1 | 3/2017 | Harari |
| 2017/0140807 A1 | 5/2017 | Sun et al. |
| 2017/0148517 A1 | 5/2017 | Harari |
| 2017/0148810 A1 | 5/2017 | Kai et al. |
| 2017/0162250 A1* | 6/2017 | Slesazeck ........... G11C 11/2275 |
| 2017/0178712 A1* | 6/2017 | Van Houdt .......... H10D 64/033 |
| 2017/0194341 A1 | 7/2017 | Yamada |
| 2017/0213731 A1 | 7/2017 | Yoon et al. |
| 2017/0213821 A1 | 7/2017 | Or-Bach et al. |
| 2017/0248746 A1* | 8/2017 | Banerjee ................ G02B 5/085 |
| 2017/0358594 A1 | 12/2017 | Lu et al. |
| 2018/0006044 A1 | 1/2018 | Chavan et al. |
| 2018/0095127 A1 | 4/2018 | Pappu et al. |
| 2018/0108416 A1 | 4/2018 | Harari |
| 2018/0151419 A1 | 5/2018 | Wu et al. |
| 2018/0166453 A1* | 6/2018 | Müller ................... H10D 1/692 |
| 2018/0261613 A1 | 9/2018 | Ariyoshi et al. |
| 2018/0269229 A1 | 9/2018 | Or-Bach et al. |
| 2018/0286918 A1 | 10/2018 | Bandyopadhyay et al. |
| 2018/0314635 A1 | 11/2018 | Alam |
| 2018/0330791 A1 | 11/2018 | Li et al. |
| 2018/0331042 A1 | 11/2018 | Manusharow et al. |
| 2018/0342455 A1 | 11/2018 | Nosho et al. |
| 2018/0342544 A1 | 11/2018 | Lee et al. |
| 2018/0366471 A1 | 12/2018 | Harari et al. |
| 2018/0366485 A1 | 12/2018 | Harari |
| 2018/0366489 A1 | 12/2018 | Harari et al. |
| 2018/0374929 A1 | 12/2018 | Yoo |
| 2019/0006009 A1 | 1/2019 | Harari |
| 2019/0006015 A1 | 1/2019 | Norman et al. |
| 2019/0006376 A1 | 1/2019 | Ramaswamy |
| 2019/0019564 A1 | 1/2019 | Li et al. |
| 2019/0067327 A1 | 2/2019 | Herner et al. |
| 2019/0103145 A1* | 4/2019 | Tseng ..................... G11C 16/24 |
| 2019/0148286 A1 | 5/2019 | Or-Bach et al. |

(56) References Cited

U.S. PATENT DOCUMENTS

| | | |
|---|---|---|
| 2019/0157296 A1 | 5/2019 | Harari et al. |
| 2019/0180821 A1 | 6/2019 | Harari |
| 2019/0206890 A1 | 7/2019 | Harari et al. |
| 2019/0214077 A1 | 7/2019 | Oh et al. |
| 2019/0237470 A1 | 8/2019 | Mine et al. |
| 2019/0238134 A1 | 8/2019 | Lee et al. |
| 2019/0244971 A1 | 8/2019 | Harari |
| 2019/0259769 A1 | 8/2019 | Karda et al. |
| 2019/0303042 A1 | 10/2019 | Kim et al. |
| 2019/0304988 A1 | 10/2019 | Dong et al. |
| 2019/0319044 A1 | 10/2019 | Harari |
| 2019/0325945 A1 | 10/2019 | Linus |
| 2019/0325964 A1 | 10/2019 | Harari |
| 2019/0348424 A1 | 11/2019 | Karda et al. |
| 2019/0355747 A1 | 11/2019 | Herner et al. |
| 2019/0370117 A1 | 12/2019 | Fruchtman et al. |
| 2020/0020718 A1 | 1/2020 | Harari et al. |
| 2020/0051990 A1 | 2/2020 | Harari et al. |
| 2020/0063263 A1 | 2/2020 | Yang et al. |
| 2020/0065647 A1 | 2/2020 | Mulaosmanovic et al. |
| 2020/0075631 A1 | 3/2020 | Dong |
| 2020/0098738 A1 | 3/2020 | Herner et al. |
| 2020/0098779 A1 | 3/2020 | Cernea et al. |
| 2020/0098881 A1 | 3/2020 | Vellianitis |
| 2020/0176468 A1 | 6/2020 | Herner et al. |
| 2020/0201718 A1 | 6/2020 | Richter et al. |
| 2020/0203378 A1 | 6/2020 | Harari et al. |
| 2020/0219572 A1 | 7/2020 | Harari |
| 2020/0243486 A1 | 7/2020 | Quader et al. |
| 2020/0258897 A1 | 8/2020 | Yan et al. |
| 2020/0350234 A1 | 11/2020 | Shan et al. |
| 2020/0350324 A1 | 11/2020 | Hoffman |
| 2020/0357453 A1 | 11/2020 | Slesazeck et al. |
| 2020/0357455 A1 | 11/2020 | Noack et al. |
| 2020/0357470 A1 | 11/2020 | Noack |
| 2020/0357821 A1* | 11/2020 | Chen .................... H10B 51/20 |
| 2020/0357822 A1 | 11/2020 | Chen |
| 2020/0365609 A1 | 11/2020 | Harari |
| 2020/0388313 A1 | 12/2020 | Cho et al. |
| 2020/0388711 A1 | 12/2020 | Doyle et al. |
| 2020/0403002 A1 | 12/2020 | Harari |
| 2020/0411533 A1 | 12/2020 | Alsmeier et al. |
| 2021/0005238 A1 | 1/2021 | Mueller |
| 2021/0013224 A1 | 1/2021 | Purayath et al. |
| 2021/0020659 A1 | 1/2021 | Chen |
| 2021/0066502 A1 | 3/2021 | Karda et al. |
| 2021/0074725 A1 | 3/2021 | Lue |
| 2021/0074726 A1 | 3/2021 | Lue |
| 2021/0111179 A1 | 4/2021 | Shivaraman et al. |
| 2021/0167073 A1* | 6/2021 | Shivaraman ....... H10D 30/0415 |
| 2021/0174887 A1* | 6/2021 | Sanada ............. G11C 16/0483 |
| 2021/0175251 A1 | 6/2021 | Zhang et al. |
| 2021/0217775 A1* | 7/2021 | Zhang ................. H10D 64/033 |
| 2021/0247910 A1 | 8/2021 | Kim et al. |
| 2021/0248094 A1 | 8/2021 | Norman et al. |
| 2021/0265308 A1 | 8/2021 | Norman et al. |
| 2021/0272983 A1 | 9/2021 | Gilbert et al. |
| 2021/0375933 A1 | 12/2021 | Lu et al. |
| 2021/0399015 A1 | 12/2021 | Lin et al. |
| 2021/0407600 A1 | 12/2021 | Cariello |
| 2021/0407845 A1 | 12/2021 | Wang et al. |
| 2022/0028876 A1 | 1/2022 | Purayath et al. |
| 2022/0028886 A1 | 1/2022 | Pur et al. |
| 2022/0084564 A1 | 3/2022 | Choi et al. |
| 2022/0139933 A1 | 5/2022 | Noack |
| 2022/0231049 A1 | 7/2022 | Lin et al. |
| 2022/0238551 A1 | 7/2022 | Petti |
| 2022/0246766 A1 | 8/2022 | Manfrini et al. |
| 2022/0254390 A1 | 8/2022 | Gans et al. |
| 2022/0351776 A1 | 11/2022 | Nam et al. |
| 2022/0384459 A1 | 12/2022 | Lu et al. |
| 2022/0393031 A1 | 12/2022 | Ando et al. |
| 2023/0012093 A1 | 1/2023 | Kakushima et al. |
| 2023/0052477 A1 | 2/2023 | Ha et al. |

FOREIGN PATENT DOCUMENTS

| | | | | |
|---|---|---|---|---|
| CN | 111799263 A | | 10/2020 | |
| JP | 6043021 B | * | 6/1994 | |
| JP | 2000339978 A | | 12/2000 | |
| JP | 2004079606 A | | 3/2004 | |
| JP | 2006099827 A1 | | 4/2006 | |
| JP | 2009206451 A1 | | 9/2009 | |
| JP | 2010108522 A1 | | 5/2010 | |
| JP | 2010251572 A | | 11/2010 | |
| JP | 2011028540 A1 | | 2/2011 | |
| KR | 20120085591 A | | 8/2012 | |
| KR | 20120085591 A1 | | 8/2012 | |
| KR | 20120085603 A | | 8/2012 | |
| WO | WO-2018144957 A1 | * | 8/2018 | ........... H10D 64/689 |
| WO | 2018236937 A1 | | 12/2018 | |
| WO | WO-2018236356 A1 | * | 12/2018 | ......... H10D 30/6757 |
| WO | 2019066948 A1 | | 4/2019 | |

OTHER PUBLICATIONS

"PCT Search Report and Written Opinion, PCT/US2019/065256", Apr. 14, 2020.

"PCT Search Report and Written Opinion, PCT/US2021/042607", Nov. 4, 2021, 17 pages.

"PCT Search Report and Written Opinion, PCT/US2022/039473", Dec. 6, 2022, 14 pages.

Chan, Chi-Yu, et al., "FeFET Memory Featuring Large Memory Window and Robust Endurance of Long-Pulse Cycling by Interface Engineering using High-k AION", 2020 IEEE Symposium on VLSI Technology, doi: 10.1109/VLSITechnology18217.2020.9265103., 2020, pp. 1-2.

Kim, Hyungwoo, et al., "Two-step deposition of TiN capping electrodes to prevent degradation of ferroelectric properties in an in-situ crystallized TiN/Hf0.5Zr0.5O2/TiN device", Nano Express 3 015004., 2022, 12 pages.

McBriarty, Martin E., et al., "Crystal Phase Distribution and Ferroelectricity in Ultrathin HfO2—ZrO2 Bilayers", Phys. Status Solidi B, 257: 1900285. https://doi.org/10.1002/pssb.201900285, Aug. 21, 82019, pp. 1-25.

Mittmann, T., et al., "Impact of Oxygen Vacancy Content in Ferroelectric HZO films on the Device Performance", 2020 IEEE International Electron Devices Meeting (IEDM), doi: 10.1109/IEDM13553.2020.9372097., 2020, pp. 18.4.1-18.4.4.

Mo, Fei, et al., "Experimental Demonstration of Ferroelectric HfO2 FET with Ultrathin-body IGZO for High-Density and Low-Power Memory Application", Symposium on VLSI Technology, 2019, pp. T42-T43, doi: 10.23919/VLSIT.2019.8776553., Jul. 13, 2020, 7 pages.

Onaya, Takashi, et al., "Improvement in ferroelectricity of HfxZr1—xO2 thin films using top- and bottom-ZrO2 nucleation layers", APL Materials 7, 061107; https://doi.org/10.1063/1.5096626, 2019, pp. 1-8.

Saitoh, Masumi, et al., "HfO2-based FeFET and FTJ for Ferroelectric-Memory Centric 3D LSI towards Low-Power and High-Density Storage and AI Applications", IEEE International Electron Devices Meeting (IEDM), doi: 10.1109/IEDM13553.2020.9372106., 2020, pp. 18.1.1-18.1.4.

Sato, Yuta, et al., "Source/Drain Contact Engineering of InGaZnO Channel BEOL Transistor for Low Contact Resistance and Suppressing Channel Shortening Effect,", 20th International Workshop on Junction Technology (IWJT), doi: 10.23919/IWJT52818.2021.9609366., 2021, 3 pages.

Si, Mengwei, et al., "Why In2O3 Can Make 0.7 nm Atomic Layer Thin Transistors?", https://arxiv.org/ftp/arxiv/papers/2012/2012.12433.pdf., 2012, 26 pages.

Wang, Chin-I, et al., "Atomic layer deposited TiN capping layer for sub-10 nm ferroelectric Hf0.5Zr0.5O2 with large remnant polarization and low thermal budget", Applied Surface Science, vol. 570, 2021, 151152, ISSN 0169-4332, https://doi.org/10.1016/j.apsusc.2021.151152., Aug. 9, 2021, pp. 1-8.

Wu, Jixuan, et al., "A Monolithic 3D Integration of RRAM Array with Oxide Semiconductor FET for In-Memory Computing in

(56) References Cited

OTHER PUBLICATIONS

Quantized Neural Network AI Applications", 2020 IEEE Symposium on VLSI Technology Digest of Technical Papers, Honolulu, HI, USA, Jun. 2020, 4 pages.
"EP Extended Search Report EP168690149.3", Oct. 18, 2019.
"European Search Report, EP 16852238.1", Mar. 28, 2019.
"European Search Report, EP17844550.8", Aug. 12, 2020, 11 pages.
"Imec Demonstrates Capacitor-less IGZO-Based DRAM Cell With >400s Retention Time", IMEC, Press release, available at https://www.imec-int.com/en/press/imec-demonstrates-capacitor-less-igzo-based-dram-cell-400s-retention-time, Dec. 15, 2020, 15 pages.
"Invitation to Pay Additional Fees (PCT/ISA/206), PCT/US2020/015710", Mar. 20, 2020, 2 pages.
"Notification of Reasons for Refusal, Japanese Patent Application 2018-527740", (English translation), Nov. 4, 2020, 8 pages.
"Partial European Search Report EP 16869049.3", Jul. 1, 2019, pp. 1-12.
"PCT Search Report and Written Opinion, PCT/US2018/038373", Sep. 10, 2018.
"PCT Search Report and Written Opinion, PCT/US2018/067338", May 8, 2019.
"PCT Search Report and Written Opinion, PCT/US2019/014319", Apr. 15, 2019.
"PCT Search Report and Written Opinion, PCT/US2019/041678", Oct. 9, 2019.
"PCT Search Report and Written Opinion, PCT/US2019/052164", Feb. 27, 2020.
"PCT Search Report and Written Opinion, PCT/US2019/052446", Dec. 11, 2019.
"PCT Search Report and Written Opinion, PCT/US2020/015710", Jun. 9, 2020.
"PCT Search Report and Written Opinion, PCT/US2020/017494", Jul. 20, 2020, 13 pages.
"PCT Search Report and Written Opinion, PCT/US2020/065374", Mar. 15, 2021, 17 pages.
"PCT Search Report and Written Opinion, PCT/US2020/065670", Apr. 5, 2021, 12 pages.
"PCT Search Report and Written Opinion, PCT/US2021/016964", Jun. 15, 2021, 19 pages.
"PCT Search Report and Written Opinion, PCT/US2021/025722", Jun. 15, 2021, 10 pages.
"PCT Search Report and Written Opinion, PCT/US2021/064844", Mar. 8, 2022, 15 paged.
"PCT Search Report and Written Opinion, PCT/US2021/42620", Oct. 28, 2021, 18 pages.
Ahn, Min-Ju , et al., "Transparent multi-level-cell nonvolatile memory with dual-gate amorphous indiumgallium-zinc oxide thin-film transistors", Appl. Phys. Lett. 109, 252106; doi: 10.1063/1.4972961., 2016, 6 pages.
Alessandri, Cristobal , et al., "Monte Carlo Simulation of Switching Dynamics in Polycrystalline Ferroelectric Capacitors", IEEE Transactions on Electron Devices, vol. 66, No. 8, doi: 10.1109/TED.2019.2922268., Aug. 2019, pp. 3527-3534.
Ali, T. , et al., "A Multilevel FeFET Memory Device based on Laminated HSO and HZO Ferroelectric Layers for High-Density Storage", IEEE International Electron Devices Meeting (IEDM), 2019, doi: 10.1109/IEDM19573.2019.8993642., Dec. 2019, pp. 28.7.1-28.7.4.
Ali, T. , et al., "High Endurance Ferroelectric Hafnium Oxide-Based FeFET Memory Without Retention Penalty,", IEEE Transactions on Electron Devices, vol. 65, No. 9, doi: 10.1109/TED.2018.2856818.—paper cited in Bae (Berkeley) paper, Sep. 2018, pp. 3769-3774.
Bae, Jong-Ho , et al., "Highly Scaled, High Endurance, Q-Gate, Nanowire Ferroelectric FET Memory Transistors", IEEE Electron Device Letters, vol. 41, No. 11, doi: 10.1109/LED.2020.3028339.—Sayeef-Berkeley paper on FeFET memory, Nov. 2020, pp. 1637-1640.

Beyer, Sven , et al., "FeFET: A versatile CMOS compatible device with game-changing potential", IEEE International Memory Workshop (IMW), doi: 10.1109/IMW48823.2020.9108150., 2020, pp. 1-4.
Böscke, T.S. , et al., "Ferroelectricity in hafnium oxide: CMOS compatible ferroelectric field effect transistors", 2011 International Electron Devices Meeting, Washington, DC, USA, doi: 10.1109/IEDM.2011.6131606., 2011, pp. 24.5.1-24.5.4.
Chang, Sou-Chi , et al., "Anti-ferroelectric HfxZr1—xO2 Capacitors for High-density 3-D Embedded-DRAM", IEEE International Electron Devices Meeting (IEDM), doi: 10.1109/IEDM13553.2020.9372011., 2020, pp. 28.1.1-28.1.4.
Cho, Min Hoe, et al., "Achieving a Low-Voltage, High-Mobility IGZO Transistor through an ALD-Derived Bilayer Channel and a Hafnia-Based Gate Dielectric Stack", ACS Applied Materials & Interfaces, Apr. 1, 2021, 13 (14), , DOI: 10.1021/acsami.0c22677, 2021, pp. 16628-16640.
Cho, Min Hoe, et al., "Comparative Study on Performance of IGZO Transistors With Sputtered and Atomic Layer Deposited Channel Layer", IEEE Transactions on Electron Devices, vol. 66, No. 4, doi: 10.1109/TED.2019.2899586., Apr. 2019, pp. 1783-1788.
Choi, Seonjun , et al., "A novel three-dimensional NAND flash structure for improving the erase performance", IEICE Electronics Express, 2019 vol. 16 Issue 3, 2019, 6 pages.
De, Sourav , et al., "Ultra-Low Power Robust 3bit/cell Hf0.5Zr0.5O2 Ferroelectric FinFET with High Endurance for Advanced Computing-In-Memory Technology", 2021 Symposium on VLSI Technology, Kyoto, Japan, Jun. 13-19, 2021, Jun. 2021, 2 pages.
Dunkel , "A FeFET based super-low-power ultra-fast embedded NVM technology for 22nm FDSOI and beyond", EEE International Electron Devices Meeting (IEDM), San Francisco, CA, USA, 2017, doi: 10.1109/IEDM.2017.8268425., 2017, pp. 19.7.1-19.7.4.
Dutta, Sourav , et al., "Logic Compatible High-Performance Ferroelectric Transistor Memory", available at https://arxiv.org/abs/2105.11078, Department of Electrical Engineering, University of Notre Dame, Notre Dame, IN 46556, USA, May 24, 2021, 28 pages.
Florent, K. , "First demonstration of vertically stacked ferroelectric Al doped HfO2 devices for NAND applications", Symposium on VLSI Technology, doi: 10.23919/VLSIT.2017.7998162., 2017, pp. T158-T159.
Florent, K. , et al., "Vertical Ferroelectric HfO2 FET based on 3-D NAND Architecture: Towards Dense Low-Power Memory", IEEE International Electron Devices Meeting (IEDM), San Francisco, CA, 2018, doi: 10.1109/IEDM.2018.8614710., 2018, pp. 2.5.1-2.5.4.
Hendy, Ian , "The Role of Increased Semiconductor Mobility—an IGZO Case Study", Display Daily, available at https://www.displaydaily.com/article/display-daily/the-role-of-increased-semiconductor-mobility-an-igzo-case-study, Apr. 2021, 11 pages.
Hou, S. Y., et al., "Wafer-Leval Integration of an Advanced Logic-Memory System Through the Second-Generation CoWoS Technology", IEEE Transactions on Electron Devices, vol. 64, No. 10, Oct. 2017, 4071-4077.
Hisain, Hanan Alexandra, et al., "Many routes to ferroelectric HfO2: A review of current deposition methods", J. Vac. Sci. Technol. A 40, 010803 (2022), published Dec. 1, 2021., Dec. 1, 2021, pp. 010803-1-010803-36.
Jeewandara, Thamarasee , et al., "High-speed 3-D memory with ferroelectric NAND flash memory", available at https://techxplore.com/news/2021-01-high-speed-d-memoryferroelectric-nand.html, Jan. 26, 2021, 5 pages.
Kawai, H. , et al., "Design Principle of Channel Material for Oxide-Semiconductor Field-Effect Transistor with High Thermal Stability and High On-current by Fluorine Doping", IEEE International Electron Devices Meeting (IEDM), doi: 10.1109/IEDM13553.2020.9372121., 2020, pp. 22.2.1-22.2.4.
Kim, Min-Kyu , et al., "CMOS-compatible ferroelectric NAND flash memory for high-density, low-power, and high-speed three-dimensional memory", Science Advances, vol. 7, No. 3, eabe 1341, DOI: 10.1126/sciadv.abe1341. (Replacement of polysilicon channel material—use IZO for channel), Jan. 13, 2021, 10.

(56) References Cited

OTHER PUBLICATIONS

Kim, Taeho, et al., "Effects of high pressure nitrogen annealing on ferroelectric Hf0.5Zr0.5O2 films", Appl. Phys. Lett. 112, 092906 https://doi.org/10.1063/1.5003369, Mar. 2, 2018, 5 pages.

Kim, N., et al., "Multi-layered Vertical gate NANO Flash Overcoming Stacking Limit for Terabit Density Storage", Symposium on VLSI Tech. Dig. of Technical Papers, 2009, pp. 188-189.

Kunitake, Hitoshi, et al., "High-temperature Electrical Characteristics of 60nm CAAC-IGZO FET : Comparison with Si FET", Sep. 2018 International Conference on Solid State Devices and Materials, https://doi.org/10.7567/SSDM.2018.N-3-04, Sep. 2018, 2 pages.

Lee, Sang Yeol, "Comprehensive Review on Amorphous Oxide Semiconductor Thin Film Transistor", Trans. Electr. Electron. Mater. 21, https://doi.org/10.1007/s42341-020-00197-w, 2020, pp. 235-248.

Lee, Chea-Young, et al., "Etching Characteristics and Changes in Surface Properties of IGZO Thin Films by O2 Addition in CF4/Ar Plasma", Coatings. 2021, 11(8):906. https://doi.org/10.3390/coatings11080906, Jul. 29, 2021.

Liao, P.J., et al., "Characterization of Fatigue and Its Recovery Behavior in Ferroelectric HfZrO", 2021 Symposium on VLSI Technology, Jun. 2021, 2 p.

Liao, C.Y., et al., "Multibit Ferroelectric FET Based on Nonidentical Double HfZrO2 for High-Density Nonvolatile Memory", IEEE Electron Device Letters, vol. 42, No. 4, doi: 10.1109/LED.2021.3060589., Apr. 2021, pp. 617-620.

"PCT Search Report and Written Opinion, PCT/US2022/016729", Applicant: SunRise Memory Corporation, May 17, 2022, 20 pages.

Lue, H.T., et al., "A Highly Scalable 8-Layer 3D Vertical-gate {VG} TFT NANO Flash Using Junction-Free Buried Channel BE-SONOS Device", Symposium on VLSI: Tech. Dig. of Technical Papers, 2010, pp. 131-132.

Materano, Monica, et al., "Interplay between oxygen defects and dopants: effect on structure and performance of HfO2-based ferroelectrics", Inorg. Chem. Front. (8), Apr. 9, 2021, pp. 2650-2672.

Mo, Fei, et al., "Experimental Demonstration of Ferroelectric HfO2 FET with Ultrathin-body IGZO for High-Density and Low-Power Memory Application", 2019 Symposium on VLSI Technology, 3, doi: 10.23919/VLSIT.2019.8776553., 2019, pp. T42-T44.

Mo, Fei, et al., "Low-Voltage Operating Ferroelectric FET with Ultrathin IGZO Channel for High-Density Memory Application", IEEE Journal of the Electron Devices Society, vol. 8, doi: 10.1109/JEDS.2020.3008789., Jul. 13, 2020, pp. 717-723.

Mueller, S., et al., "Development Status of Gate-First FeFET Technology", 2021 Symposium on VLSI Technology, Jun. 2021, 2 pages.

Mueller, J., et al., "Ferroelectric Hafnium Oxide Based Materials and Devices: Assessment of Current Status and Future Prospects", ECS Journal of Solid State Science and Technology, 4 (5) N30-N35 (2015), Feb. 21, 2015, pp. N29-N35.

Mueller, J., et al., "Ferroelectric hafnium oxide: A CMOS-compatible and highly scalable approach to future ferroelectric memories", IEEE International Electron Devices Meeting, Washington, DC, USA, doi: 10.1109/IEDM.2013.6724605., 2013, pp. 10.8.1-10.8.4.

Mueller, Stephen, et al., "From MFM Capacitors Toward Ferroelectric Transistors: Endurance and Disturb Characteristics of HfO2-Based FeFET Devices", IEEE Transactions on Electron Devices, vol. 60, No. 12, doi: 10.1109/TED.2013.2283465., Dec. 2013, pp. 4199-4205.

Müller, J., et al., "Ferroelectric hafnium oxide: A CMOS-compatible and highly scalable approach to future ferroelectric memories", 2013 IEEE International Electron Devices Meeting, Washington, DC, USA, doi: 10.1109/IEDM.2013.6724605., 2013, pp. 10.8.1-10.8.4.

Nguyen, Manh-Cuong, et al., "Wakeup-Free and Endurance-Robust Ferroelectric Field-Effect Transistor Memory Using High Pressure Annealing", IEEE Electron Device Letters, vol. 42, No. 9, doi: 10.1109/LED.2021.3096248., Sep. 2021, pp. 1295-1298.

On, Nuri, et al., "Boosting carrier mobility and stability in indium-zinc-tin oxide thin-film transistors through controlled crystallization", Sci Rep 10, 18868, https://doi.org/10.1038/s41598-020-76046-w, 2020, 16 pages.

Onuki, Tatsuya, et al., "Embedded memory and ARM Cortex-M0 core using 60-nm C-axis aligned crystalline indium-gallium-zinc oxide FET integrated with 65-nm Si CMOS", IEEE Journal of Solid-State Circuits, vol. 52, No. 4,, Apr. 2017, pp. 925-932.

Park, Goon-Ho, et al., "Electrical Characteristics of SiO2/High-k Dielectric Stacked Tunnel Barriers for Nonvolatile Memory Applications", Journal of the Korean Physical Society, vol. 55, No. 1, Jul. 2009, pp. 116-119.

Park, Min Hyuk, et al., "Review of defect chemistry in fluorite-structure ferroelectrics for future electronic devices", J. Mater. Chem. C, vol. 8, No. 31 10526-10550, Jun. 9, 2020., Aug. 21, 2020, pp. 10526-10550.

Rios, Rafael, et al., "A Physically Based Compact Model for IGZO Transistors", IEEE Transactions on Electron Devices, vol. 68, No. 4, doi: 10.1109/TED.2021.3059387., Apr. 2021, pp. 1664-1669.

Rzehak, Volker, "Low-Power FRAM Microcontrollers and Their Applications", Texas Instruments White Paper, SLAA502, Jul. 2019, 7 pages.

Saitoh, Masumi, et al., "HfO2-based FeFET and FTJ for Ferroelectric-Memory Centric 3D LSI towards Low-Power and High-Density Storage and AI Applications", 2020 IEEE International Electron Devices Meeting (IEDM), doi: 10.1109/IEDM13553.2020.9372106., 2020, pp. 18.1.1-18.1.4.

Salahuddin, Sayeef, et al., "FeFETs for Near-Memory and In-Memory Compute", 2021 IEEE International Electron Devices Meeting (IEDM), Department of Electrical Engineering and Computer Sciences, Dec. 2021, 4 pages.

Sharma, Abhishek A., et al., "High Speed Memory Operation in Channel-Last, Back-gated Ferroelectric Transistors", IEEE International Electron Devices Meeting (IEDM), doi: 10.1109/IEDM13553.2020.9371940., 2020, pp. 18.5.1-18.5.4.

Sheng, Jiazhen, et al., "Review Article: Atomic layer deposition for oxide semiconductor thin film transistors: Advances in research and development", J. Vac. Sci. Technol. A 36, 060801, https://doi.org/10.1116/1.5047237., Nov. 2, 2018, 14 pages.

Si, Mengwei, et al., "Why In2O3 Can Make 0.7 nm Atomic Layer Thin Transistors?", available at https://arxiv.org/ftp/arxiv/papers/2012/2012.12433.pdf, School of Electrical and Computer Engineering and Birck Nanotechnology Center, Purdue University, West Lafayette, IN 47907, United States, 2012, pp. 1-26.

Su, Nai-Chao, et al., "A Nonvolatile InGaZnO Charge-Trapping-Engineered Flash Memory With Good Retention Characteristics", IEEE Electron Device Letters, vol. 31, No. 3, Mar. 2010, pp. 201-203.

Sun, Chen, "First Demonstration of BEOL-Compatible Ferroelectric TCAM Featuring a-IGZO Fe-TFTs with Large Memory Window of 2.9 V, Scaled Channel Length of 40 nm, and High Endurance of 10^8 Cycles", 2021 Symposium on VLSI Technology Digest of Technical Papers, Kyoto, doi: 978-4-86348-779-6., Jun. 2021, 2 pages.

Tan, Ava J., et al., "A Nitrided Interfacial Oxide for Interface State Improvement in Hafnium Zirconium Oxide-Based Ferroelectric Transistor Technology", IEEE Electron Device Letters, vol. 39, No. 1, doi: 10.1109/LED.2017.2772791., Jan. 2018, pp. 95-98.

Tan, Ava J., et al., "Experimental Demonstration of a Ferroelectric HfO2-Based Content Addressable Memory Cell", IEEE Electron Device Letters, vol. 41, No. 2, doi: 10.1109/LED.2019.2963300., Feb. 2020, pp. 240-243.

Tan, Ava Jiang, et al., "Ferroelectric HfO2 Memory Transistors with High-κ Interfacial Layer and Write Endurance Exceeding 1010 Cycles", arXiv:2103.08806 [physics.app-ph], available at https://arxiv.org/abs/2103.08806., Mar. 16, 2021.

Tan, Ava J., et al., "Hot Electrons as the Dominant Source of Degradation for Sub-5nm HZO FeFETs", IEEE Symposium on VLSI Technology, Honolulu, HI, USA, doi: 10.1109/VLSITechnology18217.2020.9265067., 2020, pp. 1-2.

(56) References Cited

OTHER PUBLICATIONS

Tan, Yan-Ny, et al., "Over-Erase Phenomenon in SONOS-Type Flash Memory and its Minimization Using a Hafnium Oxide Charge Storage Layer", IEEE Transactions on Electron Devices, vol. 51, No. 7, Jul. 2004, pp. 1143-1147.

Tanaka, T., et al., "A 768 GB 3b/cell 3D-Floaling-Gate NANO Flash Memory", Digest of Technical Papers, the 2016 EEE International Solid-Slate Circuits Conference, 2016, pp. 142-144.

Van Houdt, Jan, "The 3D FeFET: contender for 3D-NAND Flash memory and machine learning", available at https://www.imec-int.com/en/imec-magazine/imec-magazine-october-2017/the-vertical-ferroelectric-fet-a-new-contender-for-3d-nand-flash-memory-and-machine-learning, Sep. 30, 2019, 8 pages.

Wann, H.C., et al., "High-Endurance Ultra-Thin Tunnel Oxide in Monos Device Structure for Dynamic Memory Application", IEEE Electron Device letters, vol. 16, No. 11, Nov. 1995, pp. 491-493.

Yang, Jin, et al., "Highly Optimized Complementary Inverters Based on p-SnO and n-InGaZnO With High Uniformity", IEEE Electron Device Letters, vol. 39, No. 4, doi: 10.1109/LED.2018.2809796., Apr. 2018, pp. 516-519.

\* cited by examiner

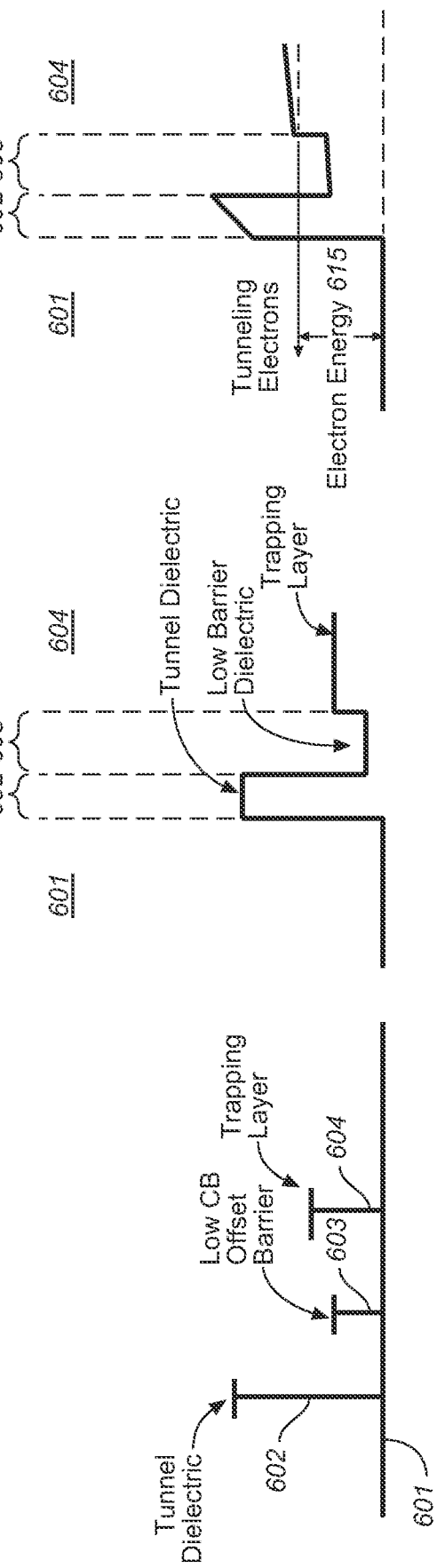

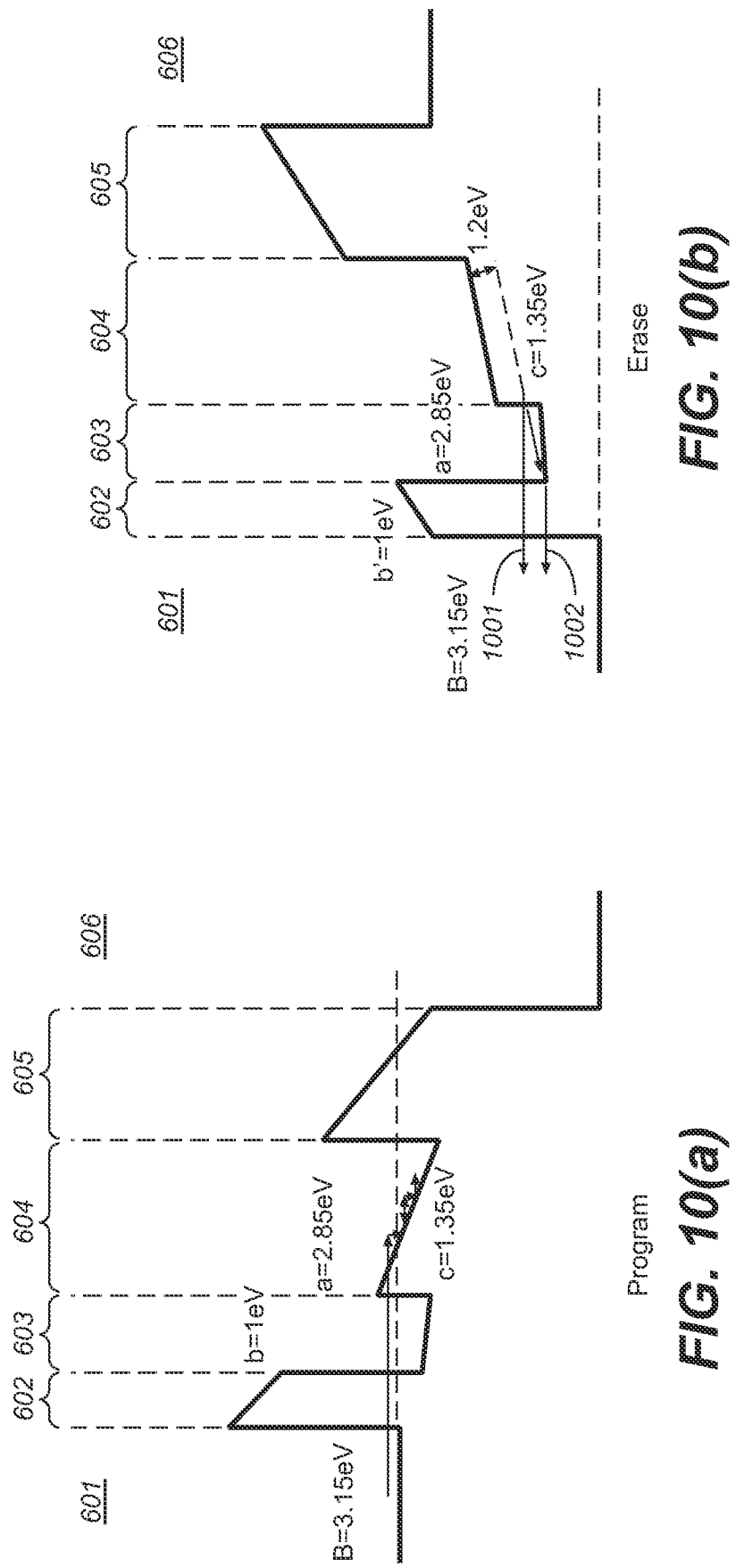

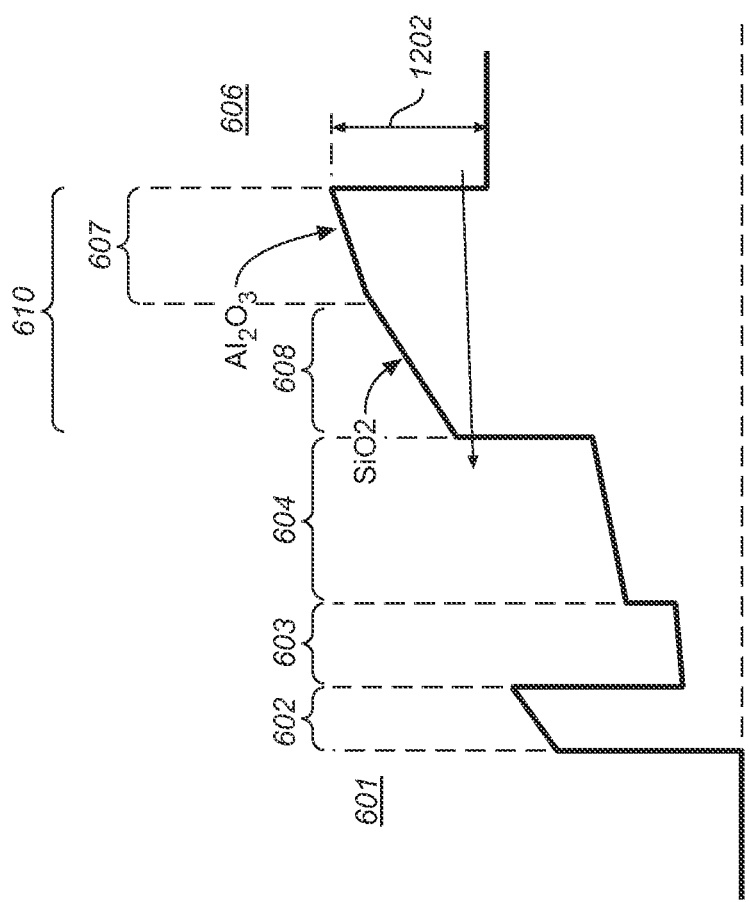
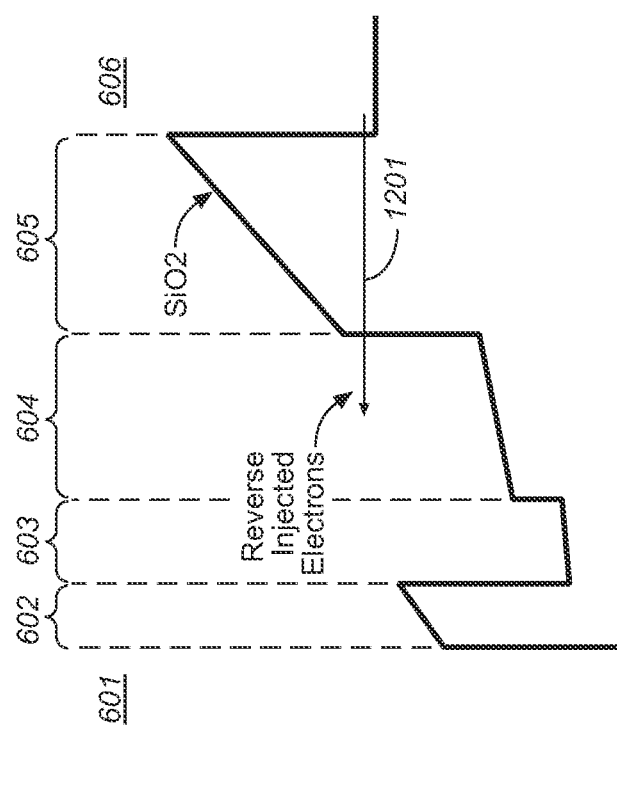

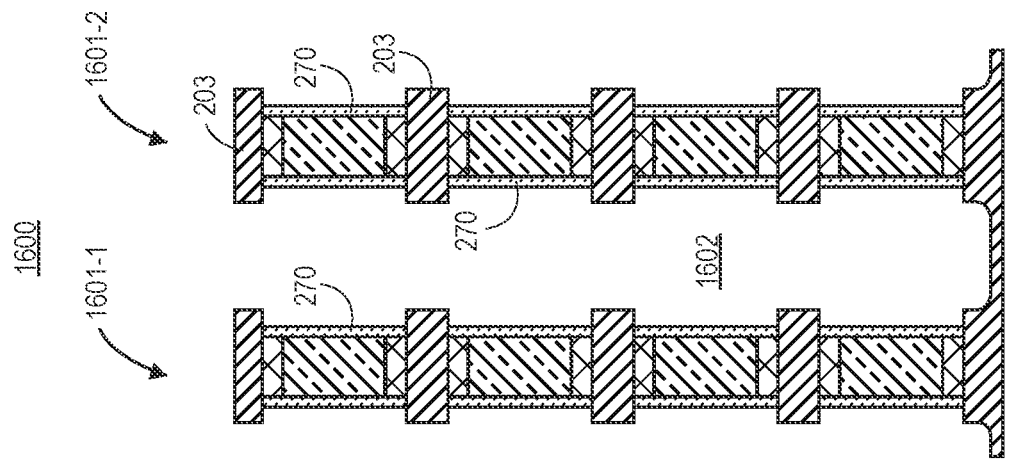
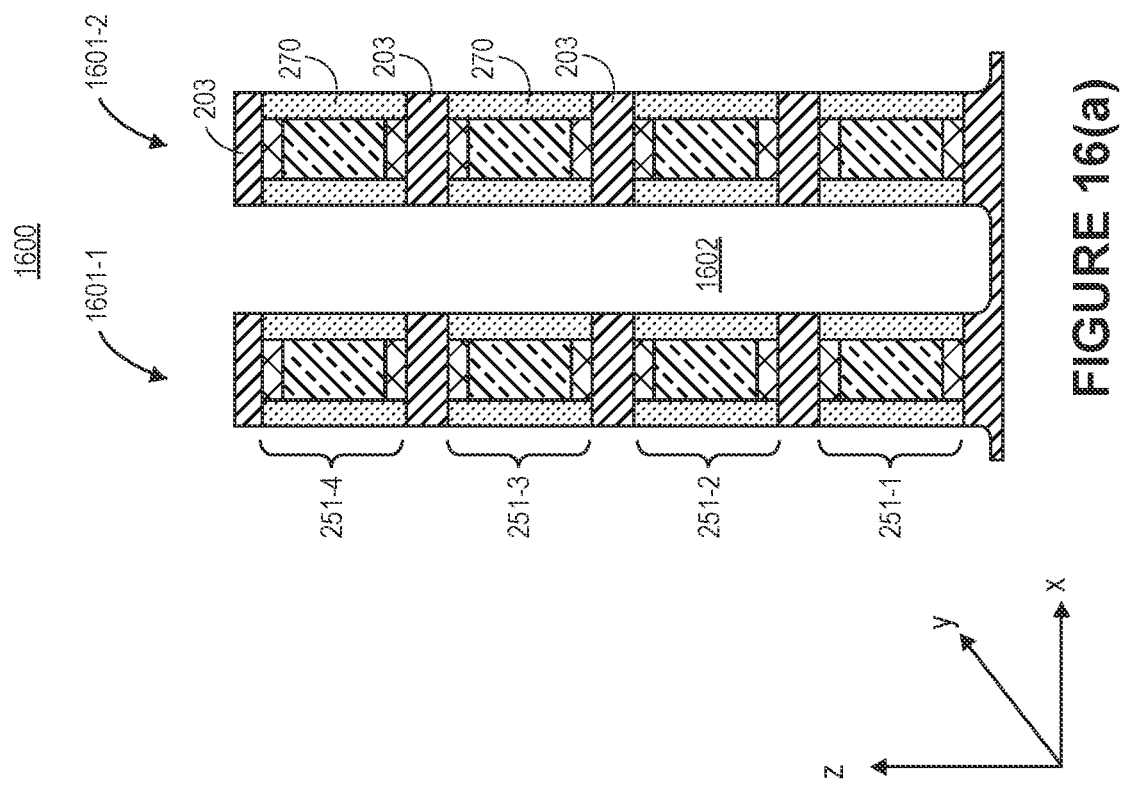
FIGURE 16(a)
FIGURE 16(b)

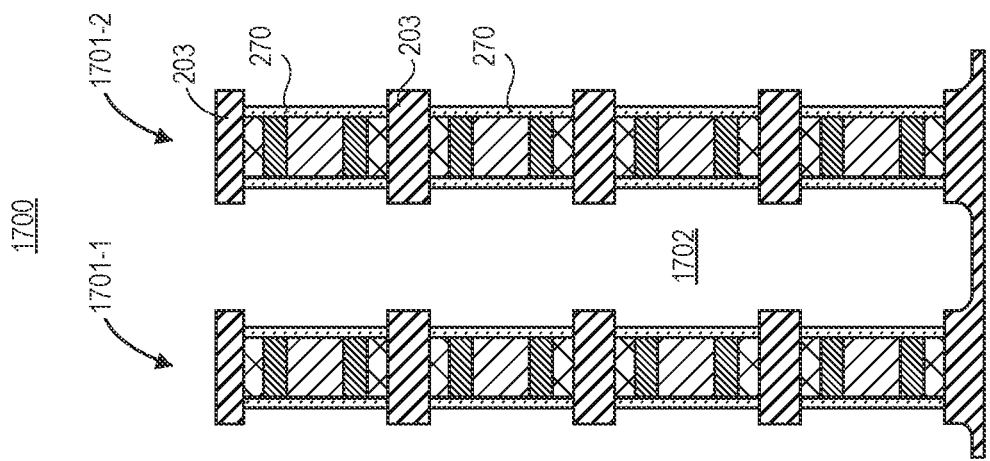
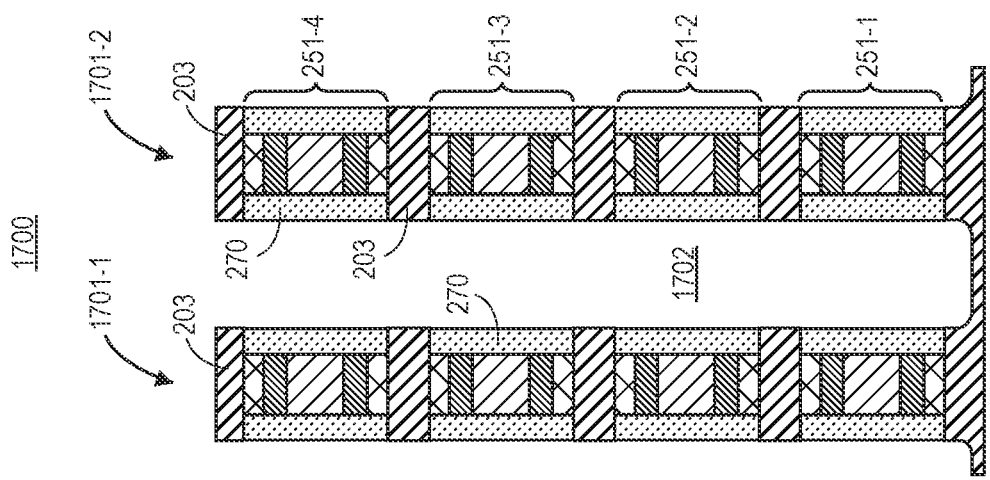
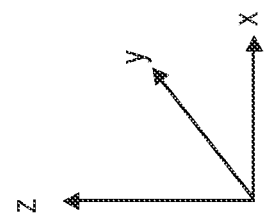

THIN-FILM STORAGE TRANSISTOR WITH FERROELECTRIC STORAGE LAYER

CROSS REFERENCE TO RELATED APPLICATIONS

The present application is a continuation-in-part application of U.S. patent application ("Parent Application"), Ser. No. 17/155,673, entitled "COOL ELECTRON ERASING IN THIN-FILM STORAGE TRANSISTORS," filed on Jan. 22, 2021, which is related to and claims priority of: (i) U.S. provisional patent application ("Provisional Application I"), Ser. No. 62/964,472, entitled "Cool Electron Erasing In Thin-film Storage Transistors," filed on Jan. 22, 2020, and (ii) U.S. provisional patent application ("Provisional Application II"), Ser. No. 62/992,754, entitled "Cool Electron Erasing In Thin-film Storage Transistors," filed on Mar. 20, 2020.

The present application is also related to (i) U.S. provisional application ("Provisional Application III"), Ser. No. 63/054,743, entitled "Methods For Fabricating A 3-Dimensional Memory Structure Of NOR Memory Strings," filed on Jul. 21, 2020; (ii) U.S. provisional ("Provisional Application IV"), Ser. No. 63/054,750, entitled "Methods for Fabricating A 3-Dimensional Memory Structure of NOR Memory Strings," filed on Jul. 21, 2020; and (iii) U.S. provisional application ("Provisional Application V"), Ser. No. 63/139,435, entitled "Vertical NOR Thin-film Transistor Strings and Fabrication Thereof," filed on Jan. 20, 2021.

The present application is related to and claims priority of (i) U.S. provisional application ("Provisional Application VI"), Ser. No. 63/152,266, entitled "Thin-Film Storage Transistor With Ferroelectric Storage Layer," filed on Feb. 22, 2021; and (ii) U.S. provisional application ("Provisional Application VII"), Ser. No. 63/153,273, entitled "Thin-Film Storage Transistor With Ferroelectric Storage Layer," filed on Feb. 24, 2021.

The present application is also related to U.S. non-provisional patent application ("Related Application"), Ser. No. 16/894,596, entitled "Capacitive-Coupled Non-Volatile Thin-Film Transistor Strings in Three Dimensional Arrays," filed on Jun. 5, 2020, which is a continuation of U.S. patent application Ser. No. 16/107,118, entitled "Capacitive-Coupled Non-Volatile Thin-Film Transistor Strings in Three Dimensional Arrays," filed on Aug. 21, 2018, which is a divisional application of U.S. non-provisional patent application Ser. No. 15/248,420, entitled "Capacitive-Coupled Non-Volatile Thin-Film Transistor Strings in Three Dimensional Arrays," filed on Aug. 26, 2016, which is related to and claims priority of (i) U.S. provisional application, Ser. No. 62/235,322, entitled "Multi-gate NOR Flash Thin-film Transistor Strings Arranged in Stacked Horizontal Active Strips With Vertical Control Gates," filed on Sep. 30, 2015; (ii) U.S. provisional patent application, Ser. No. 62/260,137, entitled "Three-dimensional Vertical NOR Flash Thin-film Transistor Strings," filed on Nov. 25, 2015; (iii) U.S. non-provisional patent application Ser. No. 15/220,375, "Multi-Gate NOR Flash Thin-film Transistor Strings Arranged in Stacked Horizontal Active Strips With Vertical Control Gates," filed on Jul. 26, 2016; and (vi) U.S. provisional patent application, Ser. No. 62/363,189, entitled "Capacitive Coupled Non-Volatile Thin-film Transistor Strings," filed Jul. 15, 2016.

The disclosures of Related Application, Parent Application, and Provisional Applications I, II, III, IV, V, VI and VII are hereby incorporated by reference in their entireties.

FIELD OF THE INVENTION

The present invention relates to thin-film storage transistors that may be organized as 3-dimensional memory arrays. In particular, the present invention relates to such thin-film transistors that may include a ferroelectric storage layer.

SUMMARY

According to one embodiment of the present invention, a storage transistor has a tunnel dielectric layer and a charge-trapping layer between a channel region and a gate electrode, wherein the charge-tapping layer has a conduction band offset—relative to a n-type silicon conduction band—that is less than the lowering of the tunneling barrier in the tunnel dielectric layer when a programming voltage is applied, such that electrons direct tunnel into the charge-trapping layer. The conduction band offset of the charge-trapping layer is selected to have a value between −1.0 eV and 2.3 eV. In some embodiments, the charge-tapping layer may include one or more of: hafnium oxide ($HfO_2$), yttrium oxide ($Y_2O_3$), silicon nitride ($Si_3N_4$), zirconium oxide ($ZrO_2$), zirconium silicon oxide ($ZrSiO_4$), lanthanum oxide ($La_2O_3$) tantalum oxide ($Ta_2O_5$), cerium oxide ($CeO_2$), titanium oxide ($TiO_2$), strontium titanium oxide ($SrTiO_3$), other semiconductors, and metal nanodots (e.g., silicon, ruthenium, platinum and cobalt nanodots).

According to one embodiment of the present invention, the storage transistor may further include a barrier layer between the tunnel dielectric layer and the charge-trapping layer, the barrier layer having a conduction band offset less than the conduction band offset of the charge-trapping layer. The barrier layer may also include a material having a conduction band offset between −1.0 eV and 2.3 eV, preferably between −1.0 eV to 1.5 eV, such as one or more of: hafnium oxide ($HfO_2$), yttrium oxide ($Y_2O_3$), silicon nitride ($Si_3N_4$), zirconium oxide ($ZrO_2$), zirconium silicon oxide ($ZrSiO_4$), tantalum oxide ($Ta_2O_5$), cerium oxide ($CeO_2$), titanium oxide ($TiO_2$), strontium titanium oxide ($SrTiO_3$), other semiconductors, and metal nanodots (e.g., silicon, ruthenium, platinum and cobalt nanodots).

In one embodiment, when a voltage substantially less than the programming voltage is applied across the channel region and the gate electrode, electrons tunnel into the charge-trapping layer by Fowler-Nordheim tunneling through an energy barrier that is wider than the thickness of the tunnel dielectric layer.

In one embodiment, the tunnel dielectric layer may be as thin as 5-40 Å and may be formed out of silicon oxide (e.g., $SiO_2$) or silicon nitride (SiN). A silicon oxide tunnel dielectric layer may be formed using conventional oxidation techniques (e.g., a high-temperature oxidation), chemical synthesis (e.g., atomic layer deposition (ALD)), or any suitable combination of these techniques. A reactive $O_2$ process may include ozone for a precisely controlled thickness and an improved oxide quality (e.g., reduced leakage due to defect sites). A silicon nitride tunnel dielectric layer may be formed using conventional nitridation, direct synthesis, chemical synthesis (e.g., by atomic layer deposition), or any suitable combination of these techniques. A plasma process may be used for a precisely controlled thickness and an improved dielectric quality (e.g., reduced leakage due to defect sites).

The tunnel dielectric layer may also include in addition a thin aluminum oxide ($Al_2O_3$) layer (e.g., 10 Å or less). The aluminum oxide layer in the tunnel dielectric layer may be synthesized in the amorphous phase, to reduce leakage due to defect sites.

Further, according to one embodiment of the present invention, a memory string in a 3-dimensional array of memory strings formed above a planar surface of a semiconductor substrate includes: (a) first and second semiconductor layers of a first conductivity type; (b) a third semiconductor layer of a second conductivity type, opposite the first conductivity type, in contact with both the first and the second semiconductor layers; (c) a plurality of conductors; and (d) a ferroelectric storage layer between the conductors and the third semiconductor layer, wherein (I) the first, the second and the third semiconductor layers, the ferroelectric storage layer and the conductors form thin film ferroelectric field-effect transistors ("FeFETs") for the memory strings; (ii) the first and the second semiconductor layers provide a common bit line and a common source line for the FeFETs, respectively; (iii) the third semiconductor layer provides a channel region for each FeFET in the memory string, (iv) the ferroelectric storage layer provides a polarizable layer for each FeFET; and (v) each conductor provides a gate electrode for one of the FeFETs in the memory string. The memory string may be organized as a horizontal NOR memory string. The memory string may be part of a 3-dimensional array of memory strings in which the thin film FeFETs of the memory string are arranged as a NOR string along a direction substantially parallel to the planar surface. In another embodiment, the FeFETs of the memory string are arranged along a direction substantially normal to the planar surface to form vertical NOR thin-film FeFET strings.

In one embodiment, the ferroelectric storage layer may include both an interface dielectric layer and a ferroelectric material layer, in which the interface dielectric layer has a dielectric constant in the range of 3.9 to greater than 2500.0, or any value greater than 3.9. The interface dielectric layer may include one or more of silicon oxynitride (SiON), silicon nitride ($Si_3N_4$), or silicon oxide ($SiO_2$), providing a refractive index between 1.5 and 2.0. The interface dielectric layer may be between 0.0 nm to 2.0 nm thick. The interface dielectric layer may include silicon oxide ($SiO_2$) and zirconium oxide ($ZrO_2$). In another embodiment, the interface dielectric layer may include a native oxide formed inherently when the ferroelectric material layer is directly deposited on the third semiconductor layer. Alternatively, the interface dielectric layer may include a native oxide layer formed by a chemical clean of the surface of the third semiconductor layer, followed by densification, for example by pulsed ozone or by thermal annealing in a hydrogen or deuterium ambient, or any other techniques known to a person of ordinary skill in the art. This treatment reduces electronic leakage through the interface dielectric layer and may also reduce the surface states at the interface between the third semiconductor layer and the ferroelectric storage layer.

In one embodiment, the ferroelectric material layer may include a zirconium-doped hafnium oxide ($HfO_2$:Zr; or "HZO"), an aluminum-doped hafnium oxide ($HfO_2$:Al), a silicon-doped hafnium oxide ($HfO_2$:Si) or a lanthanum-doped hafnium oxide ($HfO_2$:La), or any combination thereof. The term HZO may include hafnium zirconium oxide (HfZrO), hafnium zirconium oxynitride (HfZrON), hafnium zirconium aluminum oxide (HfZrAlO), any combination thereof, or any other hafnium oxide that includes zirconium impurities.

The 3-dimensional array of memory strings including the FeFETs may be organized such that the ferroelectric material layer of each FeFET is separated from the ferroelectric material layer of the FeFETs in other memory strings.

In one embodiment, the ferroelectric storage layer of the FeFET may be deposited on the third semiconductor layer using atomic layer deposition (ALD) techniques at temperature between 200° C. to 330° C., preferably between 270° C. and 330° C. The ferroelectric material layer is subject to a post-deposition annealing step at a temperature between 400° C. and 1000° C.

In one embodiment, the conductors in the memory string may be formed out of tungsten (W), molybdenum (Mo), aluminum (Al), ruthenium (Ru), tantalum (Ta), titanium (Ti), titanium nitride (TiN), or any combination or alloy of thereof.

The thin film FeFET of the present invention may have a conducting state threshold voltage greater than 0.0 volts, and a wide window (e.g., 0.5 volts to 2.5 volts) between its threshold voltage in its conducting state and its threshold voltage in its non-conducting state.

According to another embodiment of the present invention, a thin-film ferroelectric field-effect transistor (FeFET) may include a channel region formed out an oxide semiconductor material and a metal source region or a metal bit line. The ferroelectric material may include indium zinc oxide (InZnO; or "IZO") in a channel layer between 7.0 nm to 14.0 nm thick, with an electron mobility greater than or equal to 10.0 $cm^2$/V when the channel region has a thickness greater than 7.0 nm. The metal source region or the metal bit line may include molybdenum.

The present invention is better understood upon consideration of the detailed description below in conjunction with the accompanying drawings.

BRIEF DESCRIPTION OF THE DRAWINGS

FIGS. 7(a), 7(b) and 7(c) show, respectively, (i) the relative conduction band offsets at substrate 601, tunnel dielectric 602, low conduction band offset (LCBO) barrier layer 603, and charge-trapping layer 604 of a storage transistor; (ii) an energy band diagram of these layers of the storage transistor without application of a voltage; and (iii)

Figure 1:
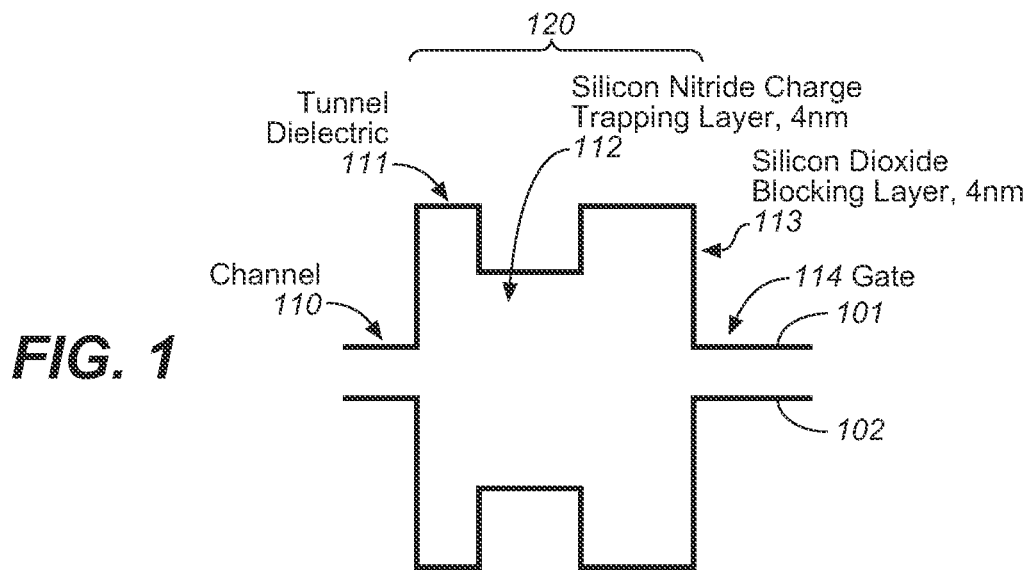
FIG. 1 is an energy band diagram of a conventional storage transistor, which includes multiple sublayers of dielectric materials and stores charge between a channel region and a gate electrode.

electron energy offset 615 between substrate 601 and charge-trapping layer 604, when an erase voltage is applied.

FIGS. 8(*a*), 8(*b*) and (*c*) illustrate the conduction band offset parameters for dielectric layers 602-604 illustrated in FIGS. 7(*a*)-7(*c*).

FIG. 9(*a*) illustrates direct tunneling and FIGS. 9(*b*) and 9(*c*) illustrate MFN tunneling in the storage transistor of FIGS. 7(*a*)-7(*c*).

FIGS. 10(*a*) and 10(*b*) are band diagrams for the structure during programming and erase operations, based on a one-volt drop across tunnel dielectric layer 602 (i.e., b=1 eV, during a programming operation and b'=1 eV, during an erase operation).

FIGS. 11(*a*), 11(*b*), 11(*c*) and 11(*d*) show various simulation results for storage transistors of the present invention.

FIG. 12(*a*) is an energy band diagram for the conduction band of a gate stack of a storage transistor during an erase operation.

FIG. 12(*b*) is an energy band diagram for the conduction band of a gate stack of a storage transistor during an erase operation, the storage transistor having additional aluminum oxide layer 607 in blocking dielectric layer 610, according to one embodiment of the present invention.

FIG. 13(*a*) shows a cross-section of a 3-dimensional array 1300 of NOR memory strings, which may be formed out of the thin-film storage transistors discussed herein, according to one embodiment of the present invention.

FIG. 13(*b*) shows active stacks 1351-1 and 1351-2 of NOR memory strings in a 3-dimensional array 1350, with each NOR memory string including numerous FeFETs as storage transistors, according to one embodiment of the present invention.

FIG. 14(*a*) shows hysteresis in the drain current in response to the gate voltage in a conventional FeFET.

FIG. 14(*b*) shows the desirable hysteresis in the drain current (Ia) response to an applied gate voltage ($V_g$) in a thin-film FeFET in a NOR memory array, according to one embodiment of the present invention.

FIGS. 15(*a*), 15(*b*), 15(*c*), and 15(*d*) illustrate a first process that forms a 3-dimensional memory array of FeFETs organized as NOR memory strings, according to one embodiment of the present invention.

FIGS. 16(*a*), 16(*b*), 16(*c*), and 16(*d*) illustrate a second process that forms a 3-dimensional memory array of thin film FeFETs organized as horizontal NOR memory strings, according to one embodiment of the present invention.

FIGS. 17(*a*), 17(*b*), 17(*c*), 17(*d*), 17(*e*), 17(*f*), and 17(*g*) illustrate a third process that forms a 3-dimensional memory array of FeFETs organized as NOR memory strings, according to one embodiment of the present invention.

To facilitate cross-reference among the figures, like elements are assigned like reference numerals.

DETAILED DESCRIPTION OF THE PREFERRED EMBODIMENTS

The above-referenced Related Application discloses 3-dimensional arrays of NOR memory strings, each being formed out of thin-film storage transistors. Provisional Application III further discloses, for example, various methods for fabricating such 3-dimensional arrays of NOR memory strings. These 3-dimensional arrays may be formed, for example, above a planar surface of a semiconductor substrate. In this detailed description, a Cartesian coordinate system is adopted to facilitate clarity in the spatial relationships among features shown in the figures. In this coordinate system, the Z-direction corresponds to a direction substantially normal to the planar surface, and the X- and Y-directions correspond to directions orthogonal to each other and to the Z-direction. The storage transistors of such NOR memory strings may be programmed and erased in 100 nanosecond (ns) or less, rendering them suitable for use in many applications of conventional volatile memory devices, such as dynamic random-access memory (DRAM) devices. These thin-film storage transistors of the Related Application also have an advantage of a retention time in minutes, rather than milliseconds, as typical of conventional DRAM devices. Therefore, one may refer to these thin-film storage transistors as quasi-volatile storage transistors. In many applications, such a quasi-volatile storage transistor should preferably have a high endurance (e.g., in the range of $10^{11}$ cycles) and may preferably be programed or erased using voltages of about 8-9 volts or lower.

Fast programming and fast erase operations require relatively high currents through the gate stack of the storage transistor. FIG. 1 is an energy band diagram of a portion of a storage transistor, which includes multiple sublayers of dielectric materials and stores charge between a channel region and a gate electrode. As shown in FIG. 1, various materials 120 between channel region 110 and gate electrode 114 allow data storage in the storage transistor. These materials include tunnel dielectric sublayer 111, charge-trapping sublayer 112 (e.g., silicon nitride) and blocking dielectric sublayer 113 (e.g., silicon oxide). Charge-trapping sublayer 112 and blocking dielectric sublayer 113 may each be, for example, 4 nm thick. In FIG. 1, line 101 traces the lowest energy states in the conduction bands of the various materials and line 102 traces the highest energy states in the valence bands of the various materials. In such a system, to change the threshold voltage of the storage transistor by one volt in 100 ns requires a programming current density of about 5.0 amps/cm². Using silicon dioxide as tunneling dielectric sublayer 111, such a high current density may be achieved at a moderate electric field in the range of 10.0 MV/cm through a direct tunneling mechanism.

Figure 2:
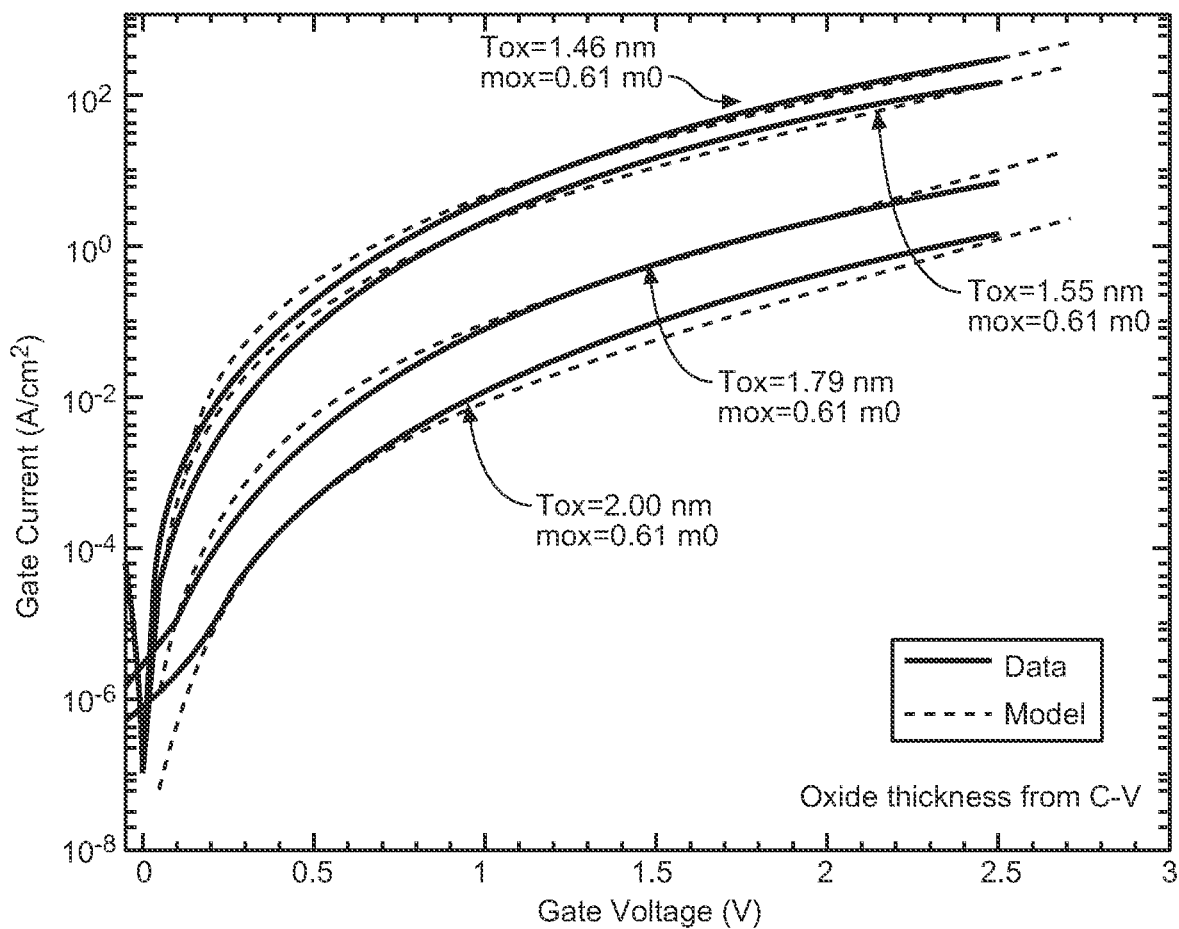
FIG. 2 shows some typical direct tunneling current densities (gate currents) for various silicon dioxide thicknesses under different bias conditions.

FIG. 2 shows some typical direct tunneling current densities (gate currents) for various silicon dioxide thicknesses under different bias conditions. As shown in FIG. 2, the desired high current density (e.g., 5.0 amps/cm²) may be achieved in silicon dioxide for thicknesses less than 1.5 nm, even for voltages below 1.5 volts across the silicon dioxide layer.

FIGS. 3(*a*) and 3(*b*) illustrate, respectively, direct tunneling of electrons into charge-trapping sublayer 112 and out of charge-trapping sublayer 112 during programming and erase operations. As illustrated in FIG. 3(*a*), the applied programming voltage across gate electrode 114 and channel region 110 lowers the conduction bands of tunnel dielectric sublayer 111, charge-trapping sublayer 112 and blocking dielectric sublayer 113 relative to channel region 110. Specifically, the lowest energy levels in the conduction band of charge-trapping sublayer 112 is lowered to slightly below that of channel region 110 to allow electrons with energy at the lowest energy levels of the conduction band in channel region 110 to direct-tunnel into charge-trapping sublayer 112, as illustrated by arrow 301 in FIG. 3(*a*).

Figure 3A:
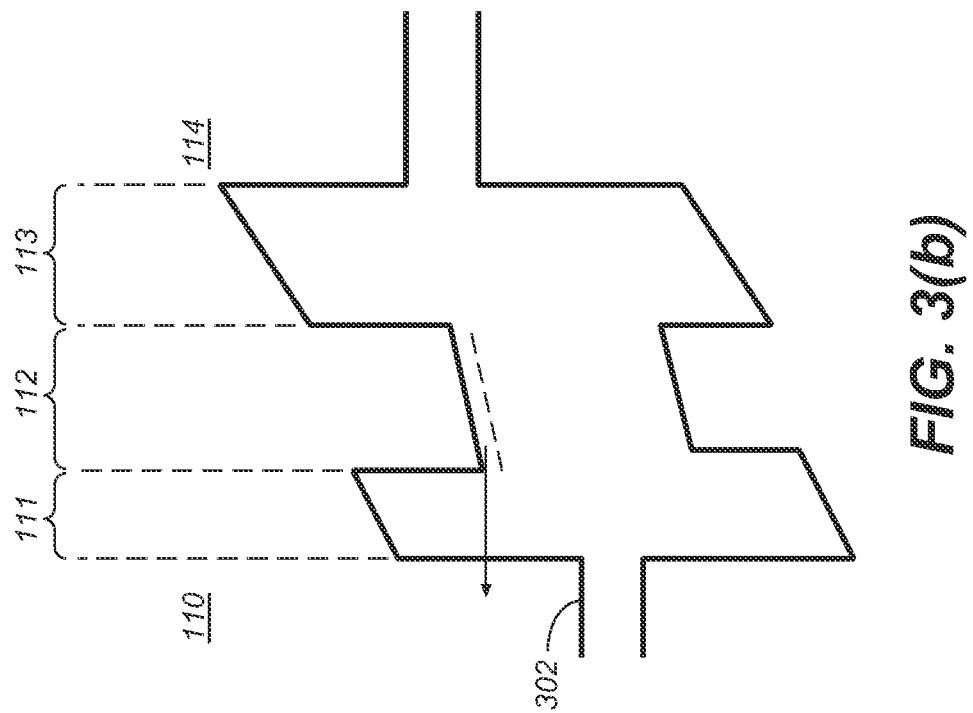
FIGS. 3(a) and 3(b) illustrate, respectively, direct tunneling of electrons into charge-trapping sublayer 112 and out of charge-trapping sublayer 112 during programming and erase operations.
Figure 3B:
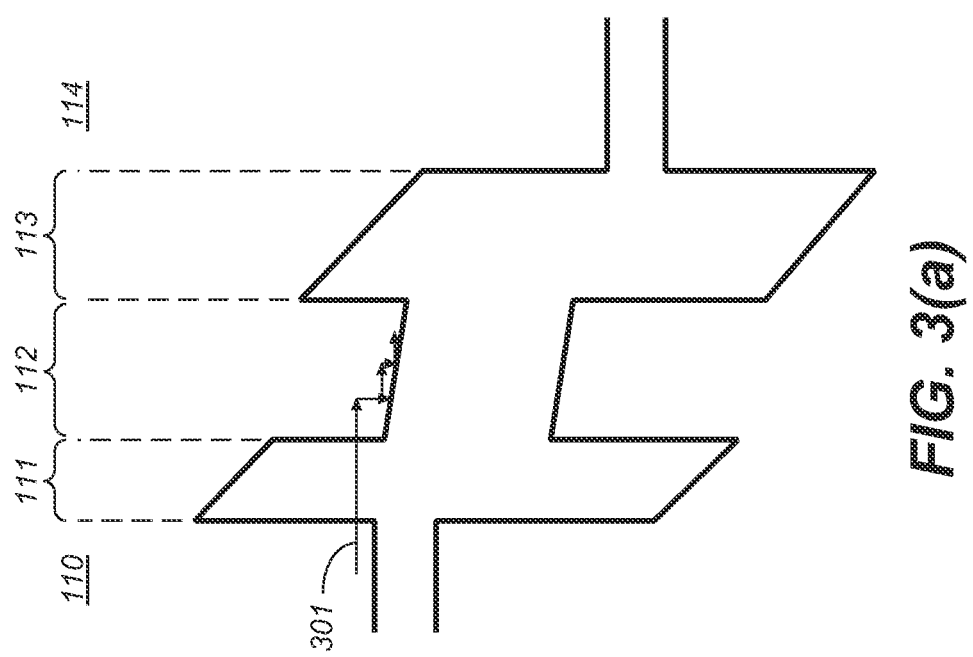

Likewise, as illustrated in FIG. 3(*b*), the applied erase voltage across gate electrode 114 and channel region 110 raises the lowest energy levels in the conduction bands of tunnel dielectric sublayer 111, charge-trapping sublayer 112 and blocking dielectric sublayer 113 relative to those of channel region 110. The electric field imparts energy to electrons at the allowed energy levels of the charge-trapping sites in charge-trapping sublayer 112 to direct tunnel into channel region 110, as illustrated by arrow 302 in FIG. 3(b).

The direct tunneling mechanisms by electrons illustrated in FIGS. 3(a) and 3(b) allow fast programming and erase. In contrast, erasing by holes is a slow mechanism. In a floating-substrate quasi-volatile storage cell (e.g., the thin-film storage transistor disclosed in the Related Application), for example, holes in channel region 110 are insufficient to provide an adequate hole current into charge-trapping sublayer 112; the likely erase mechanism for such a storage transistor pulls electrons out from charge-trapping sublayer 112.

In a storage transistor, the voltage difference between the threshold voltages of the storage transistor in the erased state and in the programmed state is referred to as the "programming window." The programming window narrows or closes with the number of cycles the storage transistor has been programmed and erased. Such programming window narrowing is due to, for example, degradation at the interface between channel region 110 and tunnel dielectric 111, as a result of interface states formation. Programming window narrowing may also result from charge-trapping at other material interfaces, e.g., between charge-trapping sublayer 112 and blocking dielectric sublayer 113. The endurance of a storage transistor refers to the number of program-erase cycles before the storage transistor fails to maintain an acceptable programming window. As illustrated in FIG. 3(a), electrons that direct tunnel from channel region 110 to charge-trapping sublayer 112 have low energy entering charge-trapping sublayer 112, so that they give up only a small amount of energy settling in the lowest allowed energy states in charge-trapping sublayer 112 (i.e., the lowest energy levels in the conduction bands of channel region 110 and charge-trapping sublayer 112 are very close in the presence of the programming voltage). This energy loss does not cause any appreciable damage to charge-trapping sublayer 112. In contrast, as illustrated in FIG. 3(b), the energy loss by electrons entering channel region 110 during an erase operation is significantly larger. The greater energy loss generates energetic holes ("hot holes") in channel region 110, which would be driven by the electric field of the erase voltage towards gate electrode 114. These hot holes create interface traps at the interface between channel region 110 and tunnel dielectric sublayer 111. These interface traps are detrimental to the endurance of the storage transistor and, in fact, may be primarily responsible for the programming window closing. One of ordinary skill in the art may also recognize that the hot holes phenomenon, known as the "anode hot hole injection mechanism," provides one model for dielectric breakdown.

Figure 4:
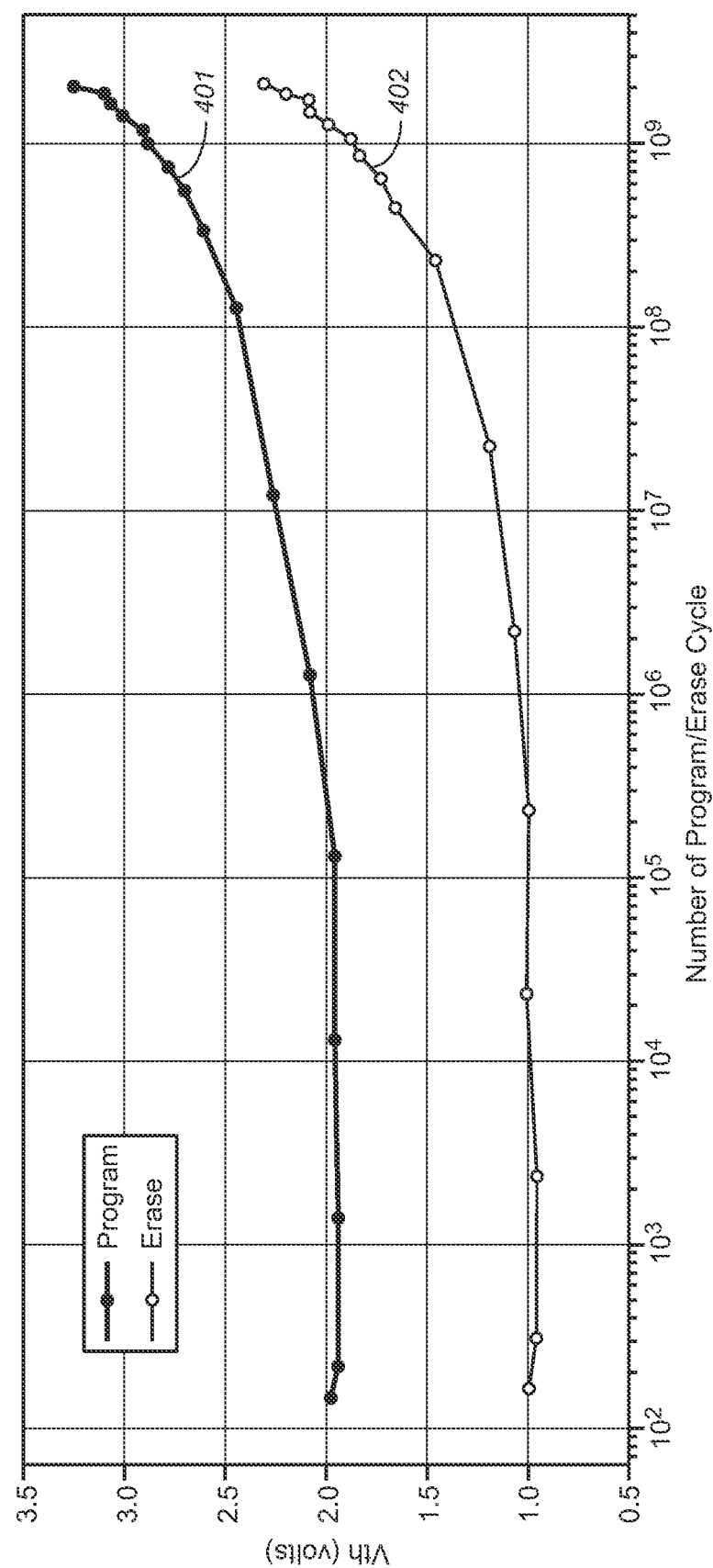
FIG. 4 illustrates an evolution of the programming window in a storage transistor over more than $10^9$ program and erase cycles, showing program state threshold voltage 401 and erase state threshold voltage 402.

FIG. 4 illustrates the evolution of the programming window in a storage transistor over more than $10^9$ program and erase cycles, showing program state threshold voltage 401 and erase state threshold voltage 402.

The present invention improves endurance in a storage transistor to exceed $10^{11}$ program-erase cycles using a device structure that ensures electrons tunneling out of a charge-trapping layer into the channel region of the storage transistor (e.g., during an erase operation) are within a desirable low energy range ("cool electrons"), such that any resulting hole generations are also low-energy and are thus less damaging to the programming window. The device structure provides a substantial direct tunneling programming current density exceeding 1.0 amps/cm² (e.g., 5.0 amps/cm²). The present invention is particularly advantageous for use in storage layers of thin-film storage transistors that are formed in 3-dimensional memory structures, such as those quasi-volatile storage transistors in the 3-dimensional arrays of NOR memory strings disclosed in the Related Application discussed above.

Figure 5:
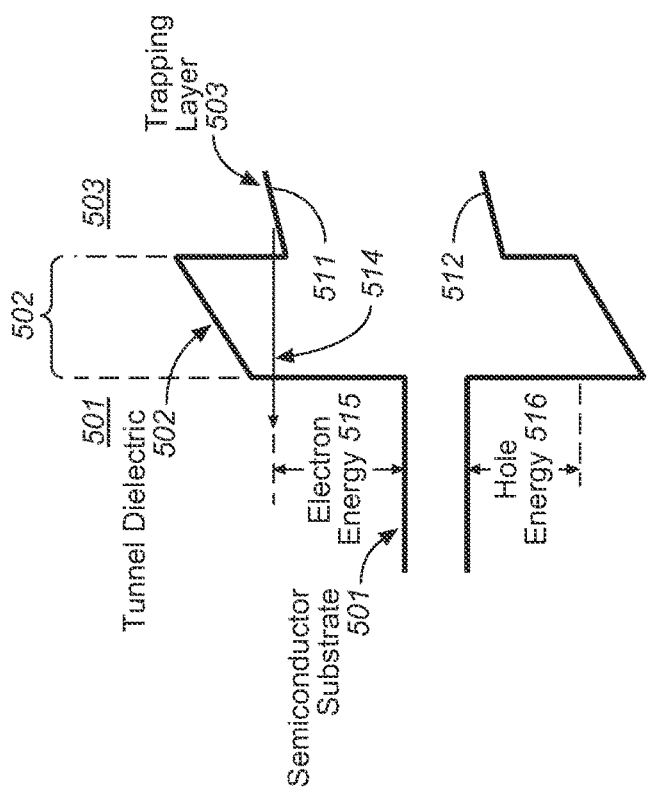
FIG. 5 is an energy band diagram in an exemplary storage transistor having channel region 501, tunnel dielectric layer 502 and charge-trapping layer 503.

One embodiment of the present invention is illustrated by the model of FIG. 5, showing the conduction and valence energy band boundaries 511 and 512 of an exemplary storage transistor having channel region 501, tunnel dielectric layer 502 and charge-trapping layer 503. As FIG. 5 illustrates, arrow 514 represents electrons direct tunnel from charge-trapping layer 503 to channel region 501. The energy difference ("conduction band offset") between the lowest energy levels in the conduction bands of charge-trapping layer 503 and channel region 501—indicated by reference numeral 515—is the expected energy loss by an electron so tunneled.

Figure 6C:
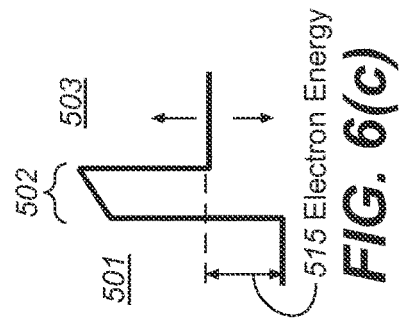
FIGS. 6(a), 6(b) and 6(c) show, respectively, (i) the lowest energy levels of the conduction bands at substrate 501, tunnel dielectric 502 and charge-trapping layer 503 of a storage transistor; (ii) the lowest energy levels in the conduction bands of these layers of the storage transistor without application of a voltage; and (iii) the electron energy offset 515 between substrate 501 and charge-trapping layer 503, when an erase voltage is applied.
Figure 6B:
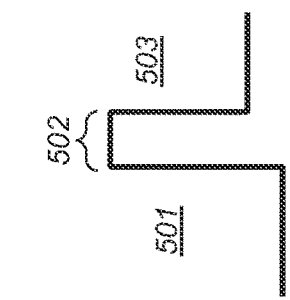
Figure 6A:
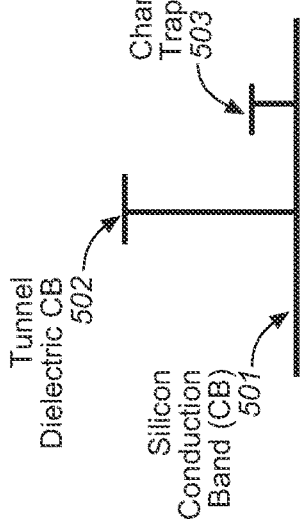

The present invention may be achieved by judiciously selecting a combination of materials for a tunnel dielectric material and a charge-trapping dielectric material, to obtain desirable conduction band offsets at these layers relative to the semiconductor substrate (i.e., the channel region) of the storage transistor. FIG. 6(a) shows the lowest energy levels of the conduction bands at substrate 501, tunnel dielectric 502 and charge-trapping layer 503 of the storage transistor. FIG. 6(b) shows the lowest energy levels in the conduction bands of these layers of the storage transistor without application of a voltage. FIG. 6(c) shows the electron energy offset 515 between substrate 501 and charge-trapping layer 503, when an erase voltage is applied. Electron energy offset 515 depends on conduction band offsets between substrate 501 and each of tunnel dielectric layer 502 and charge-trapping layer 503, as well as on the voltage applied for the erase operation. As illustrated in FIG. 6(c), for tunnel dielectric layer 502, using different charge-trapping materials as charge-trapping layer 503, with different conduction band offsets relative to the substrate layer 501, results in greater or lesser energy loss in the tunneling electrons reaching substrate 501. Likewise, for charge-trapping layer 503, using different tunnel dielectric materials as tunnel dielectric layer 502, with different conduction band offsets relative to the substrate layer 501, also results in greater or lesser energy loss in the tunneling electrons reaching substrate 501.

Tunnel dielectric layer 502 may be as thin as 5-40 Å and may be formed out of silicon oxide (e.g., $SiO_2$), silicon nitride (SiN), or silicon oxynitride (SiON). A silicon oxide tunnel dielectric layer may be formed using conventional oxidation techniques (e.g., a high-temperature oxidation), chemical synthesis (e.g., atomic layer deposition (ALD)), or any suitable combination of these techniques. A reactive $O_2$ process may include an ozone step (e.g., using pulsed ozone) for a precisely controlled thickness and an improved oxide quality (e.g., reduced leakage due to defect sites). The ozone step augments solidification of the oxide in a conformal manner, which is particularly advantageous for three-dimensional transistor structures. An annealing step (e.g., an $H_2$ anneal, a $NH_3$ anneal, or a rapid thermal annealing) may also fortify tunnel dielectric layer 502. A silicon nitride tunnel dielectric layer may be formed using conventional nitridation, direct synthesis, chemical synthesis (e.g., by ALD), or any suitable combination of these techniques. A plasma process may be used for a precisely controlled thickness and an improved dielectric quality (e.g., reduced leakage due to defect sites).

Tunnel dielectric layer 502 may also include an additional thin aluminum oxide ($Al_2O_3$) layer (e.g., 10 Å or less). This additional aluminum oxide layer in the tunnel dielectric layer may be synthesized in the amorphous phase, to reduce leakage due to defect sites.

The following materials may be used to provide tunnel dielectric layer 502 and charge-trapping layer 503:

| Material | Conduction Band Offset |
| --- | --- |
| Silicon oxide (SiO$_2$) | 3.15 eV |
| Hafnium oxide (HfO$_2$) | 1.5 eV |
| Silicon Nitride (Si$_3$N$_4$) | 2.4 eV |
| Yttrium oxide (Y$_2$O$_3$) | 2.3 eV |
| Zirconium oxide(ZrO$_2$) | 1.4 eV |
| Zirconium silicon oxide (ZrSiO$_4$) | 1;5 eV |
| Lanthanum oxide (La$_2$O$_3$) | 2.3 eV |
| Silicon oxinitrides (SiN:H) | 1.3-2.4 eV |
| Tantalum oxide (Ta$_2$O$_5$) | 0.3 eV |
| Cerium oxide (CeO$_2$) | 0.6 eV |
| Titanium oxide (TiO$_2$) | 0.0 eV |
| Strontium titanium oxide (SrTiO$_3$) | 0.0 eV |
| Silicon-rich silicon nitride (SiN:Si) | 1.35 eV |
| Silicon nanodots | 0.0 eV |
| Ruthenium nanodots | −0.7 eV |
| Cobalt nanodots | −1.0 eV |

Using a lower conduction band offset in the charge-trapping layer provides an effective increase in tunneling barrier in the tunnel dielectric layer, resulting in improved data retention.

Alternatively, a barrier material of low conduction band offset may be introduced into the storage transistor between the tunnel dielectric layer and the charge-trapping layer. FIGS. 7(a)-7(c) are band diagrams representative of such a structure. FIG. 7(a) shows the relative conduction band offsets at substrate 601, tunnel dielectric 602, low conduction band offset barrier dielectric 603 and charge-trapping layer 604 of the storage transistor. FIG. 7(b) is an energy band diagram of these layers of the storage transistor without application of a voltage. FIG. 7(c) shows the electron energy offset 615 between substrate 601 and charge-trapping layer 604, when an erase voltage is applied. Electron energy offset 615 depends on conduction band offsets between substrate 601 and each of tunnel dielectric layer 602, low conduction band offset barrier layer 603 and charge-trapping layer 604, as well as on the voltage applied for the erase operation. As shown in FIGS. 7(a)-7(c), low conduction band offset (LCBO) barrier dielectric 603 preferably has a conduction band offset relative to substrate 601 that is lower than those of both tunnel dielectric layer 602 and charge-trapping layer 604. Judiciously choosing the materials for tunnel dielectric layer 602, LCBO barrier layer 603, and trapping layer 604, cool electron direct tunneling may be achieved for both program and erase operations, resulting in a high endurance in the storage transistor.

Figure 8A:
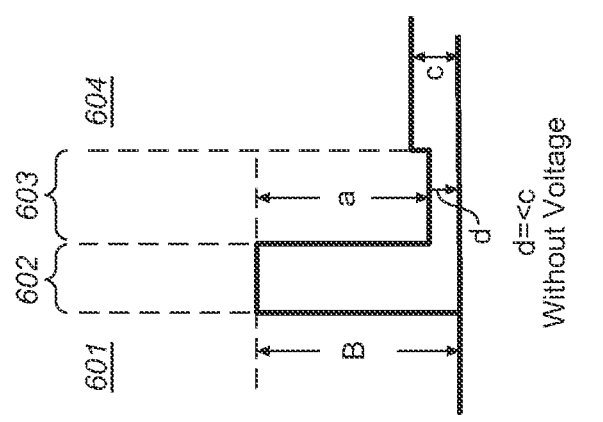
Figure 8B:
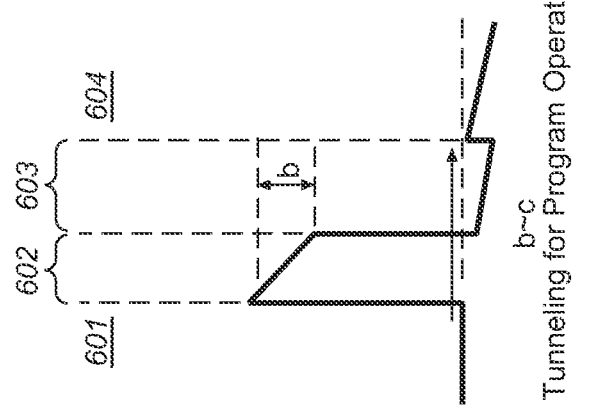
Figure 8C:
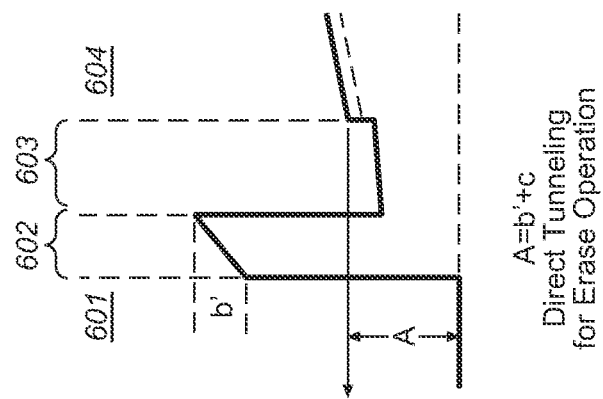

FIGS. 8(a)-(c) illustrate the conduction band offset parameters for dielectric layers 602-604 illustrated in FIGS. 7(a)-7(c). As shown in FIG. 8(a), (i) parameter B represents the conduction band offset of tunnel dielectric layer 602 relative to substrate 601, (ii) parameter a represents the conduction band offset of LCBO barrier layer 603 relative to the conduction band offset of tunnel dielectric layer 602, (iii) parameter d represents the conduction band offset of LCBO barrier layer 603 relative to substrate 601, and (iv) parameter c represents the conduction band offset of charge-trapping layer 604 relative to substrate 601. According to one embodiment of the present invention, the conduction band offset of LCBO barrier layer 603 should not be greater than the conduction band offset of charge-trapping layer 604 (i.e., d≤c) to allow a substantial direct tunneling programming current density exceeding 1.0 amps/cm$^2$ (e.g., 5.0 amps/cm$^2$).

FIG. 8(b) shows sloping of the energy level at the bottom of the conduction band of tunnel dielectric layer 602 as a result of the programming voltage. The sloping lowers the energy level of tunnel dielectric layer 602 by parameter b over the thickness of tunnel dielectric layer 602. For the programming operation to be effectuated by direct tunneling, the value of parameter b should be greater or equal to the value of parameter c (i.e., b≥c). The value of parameter b (in eV units) is the product of the voltage drop across tunnel dielectric layer 602 and the electron charge q (i.e., 1.6×10$^{-19}$ coulombs).

When the voltage drop across tunnel dielectric 602 is less than the conduction band offset of charge-trapping layer 604 (i.e., b<c), the tunneling barrier becomes wider, as at least a part of LCBO barrier layer 603 remains a tunneling barrier. In that case, direct tunneling may give way to a modified Fowler-Nordheim (MFN) mechanism, which provides a much smaller current than direct tunneling (e.g., less than 0.1 amps/cm$^2$).

Figure 9A:
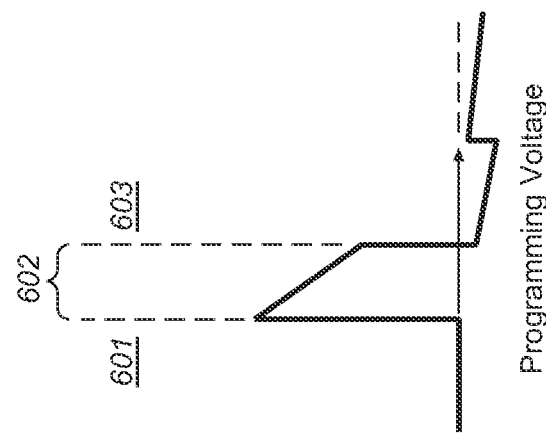
Figure 9B:
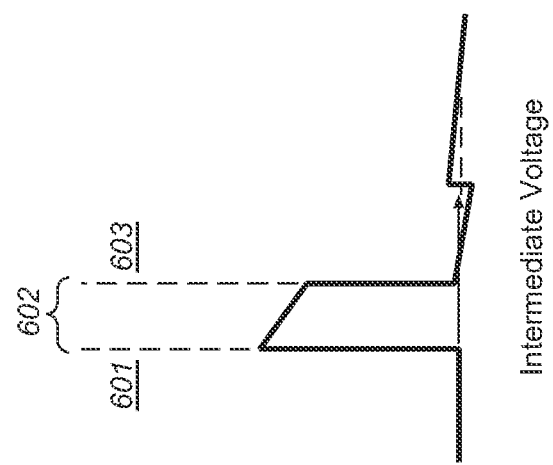
Figure 9C:
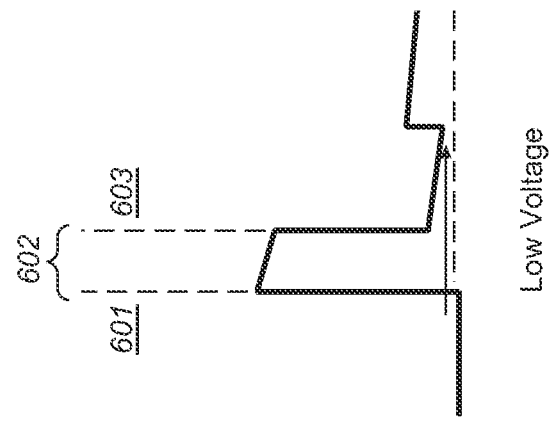

FIG. 9(a) illustrates direct tunneling, under application of a programming voltage, and FIGS. 9(b) and 9(c) illustrate MFN tunneling, under a lower voltage ("intermediate") and an even lower voltage, respectively, in the storage transistor of FIGS. 7(a)-7(c). One may recognize that MFN tunneling may occur in a region of low voltage disturbs during operations of the storage transistor. However, for a storage transistor having the structure illustrated in FIGS. 7(a)-7(c), this MFN tunneling current can be very low for a range of voltages applied. The materials and the thicknesses for charge-trapping layer 604 and barrier layer 603 are selected such that read disturb voltages, programming inhibit voltages or erase inhibit voltages fall within the range of low or intermediate voltages that restrict tunneling to the MFN mechanism.

Thus, the storage transistor of the present invention provides an important advantage: high currents at the programming voltage due to direct tunneling, while having merely a low MFN tunneling current when exposed to a low voltage. This characteristic reduces disturbs during read, programming inhibit, or erase inhibit operations and improves data retention and endurance, particularly in quasi-volatile storage transistors of the present invention that use direct tunneling for fast programming and fast erase operations. In this regard, LCBO barrier layer 603 improves endurance by enabling cool electron-erase operations, which reduces device degradation, as the resulting holes generated in the channel region are low-energy.

By restricting tunneling at low voltages to MFN tunneling, LCBO barrier layer 603 also improve data retention and reduces read disturb, programming-inhibit disturbs and erase-inhibit disturbs, as the read disturbs, programming-inhibit disturbs and erase-inhibit disturbs all occur at low voltages. For example, programming-inhibit disturbs and erase-inhibit disturbs occur at half-select or a lower voltage than that used in the respective programming and erase operations. All these benefits accrue in the storage transistors biased at low voltages, while at the same time maintaining the advantages of the high efficiency of direct tunneling accrue in the storage transistors biased at the higher read, programming or erase voltages.

FIG. 8(c) shows sloping of the energy level at the bottom of the conduction band of tunnel dielectric layer 602 during an erase operation. The sloping raises the energy level of tunnel dielectric layer 602 by parameter b' over the thickness of tunnel dielectric layer 602. During the erase operation, electrons in direct tunneling from charge-trapping layer 604 to substrate 601 loses an energy represented by parameter A, which is given by: A=b'+c. Note that the conduction band offset of charge-trapping layer 604 should be greater than the amount by which the energy level of a charge-trapping site is below the conduction band of charge-trapping layer 604 in order for the electrons at the charge-trapping site to be included in the direct tunneling current.

According to one embodiment of the present invention, substrate 601 may be implemented by a P-doped silicon, tunnel dielectric layer 602 may be implemented by a 1-nm thick $SiO_2$ layer (B=3.15 eV), low conduction band offset barrier layer 603 may be implemented by a 2-nm thick $Ta_2O_5$ layer (d=0.3 eV), charge-trapping layer 604 may be implemented by a 4-nm thick silicon-rich silicon nitride (i.e., SiN:Si; c=1.35 eV), and another 4-nm thick $SiO_2$ layer may be used to provide a blocking dielectric layer. Unlike silicon nitride (stoichiometrically, $Si_3N_4$), silicon-rich silicon nitride includes silicon as impurity, which reduces silicon nitride's band gap from 4.6 eV to about 3.6 eV for silicon-rich silicon nitride. Also, silicon nitride has a refractive index of 2.0, while silicon-rich silicon nitride has a refractive index in the range of 2.1-2.3. Gate electrode 606 may be implemented by a highly-doped P-type polysilicon. FIGS. 10(a) and 10(b) are band diagrams for the structure during programming and erase operations, based on a one-volt drop across tunnel dielectric layer 602 (i.e., b=1 eV, during a programming operation and b'=1 eV, during an erase operation). As shown in FIG. 10(b), as indicated by arrow 1001, an electron reaching substrate 601 by direct tunneling loses about 1.4 eV of energy during the erase operation. Scattering in LCBO barrier layer 603, as indicated by arrow 1002, may further reduce this energy loss.

According to another embodiment of the present invention, substrate 601 may be implemented by a P-doped silicon, tunnel dielectric layer 602 may be implemented by a 1-nm thick $SiO_2$ layer (B=3.15 eV), low conduction band offset barrier layer 603 may be implemented by a 2-nm thick $CeO_2$ layer (d=0.6 eV), charge-trapping layer 604 may be implemented by a 4-nm thick silicon-rich silicon nitride (i.e., $Si_3N_{r4}$:Si; c=1.35 eV), and another 5-nm thick $SiO_2$ layer may be used to provide a blocking dielectric layer 605. Gate electrode 606 may be implemented by a highly-doped P-type polysilicon.

FIG. 11(a)-11(d) show various simulation results for storage transistors of the present invention.

Figure 11A:
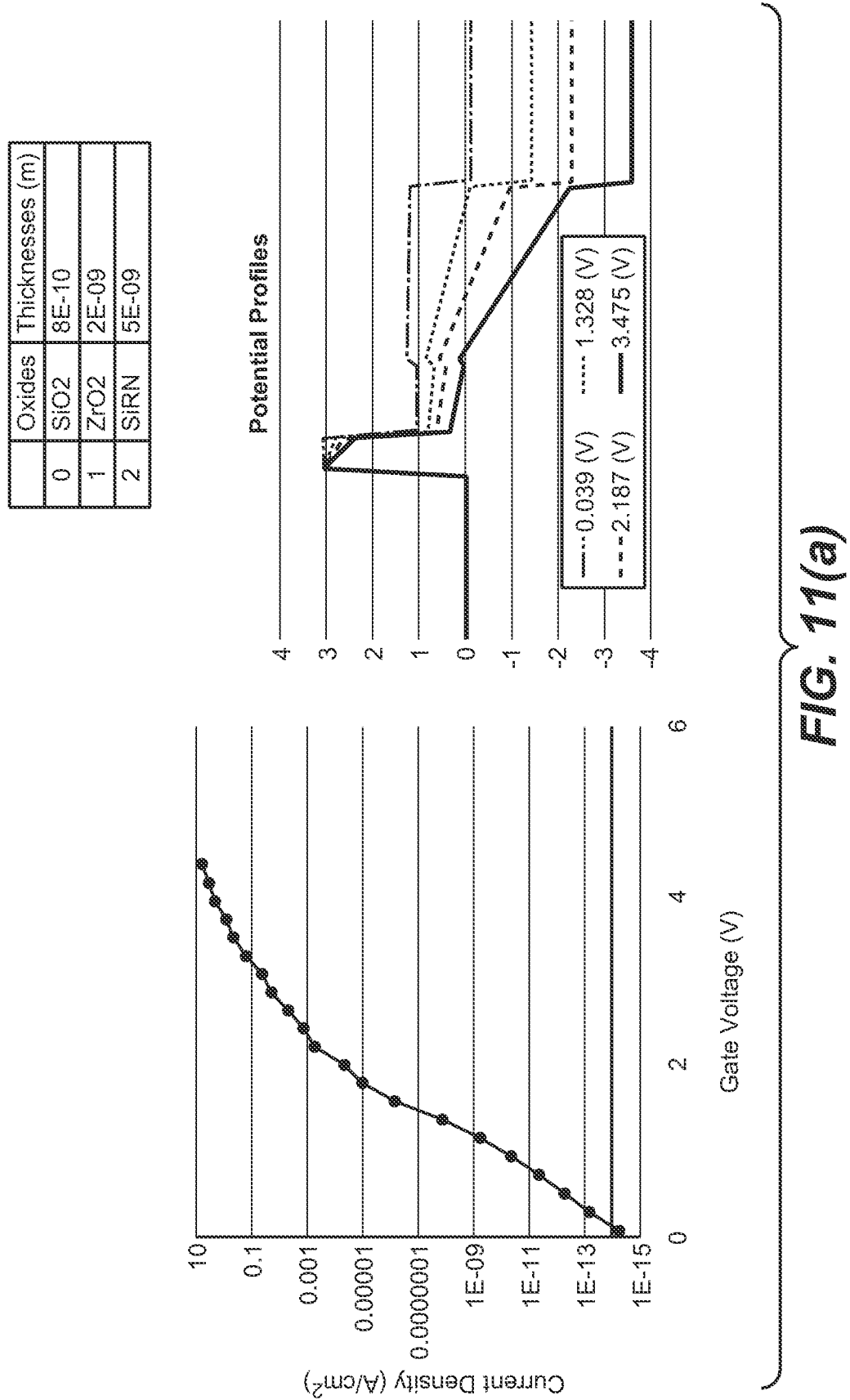

FIG. 11(a) shows a simulation of a storage transistor having a 0.8 nm thick silicon oxide tunneling dielectric layer, a 2.0 nm thick zirconium oxide LCBO barrier layer and a 5.0 nm thick silicon-rich silicon nitride trapping layer. FIG. 11(a) shows that a direct-tunneling current density exceeding 1.0 amps/cm$^2$ is achieved with a programming voltage around 3.1 volts.

Figure 11B:
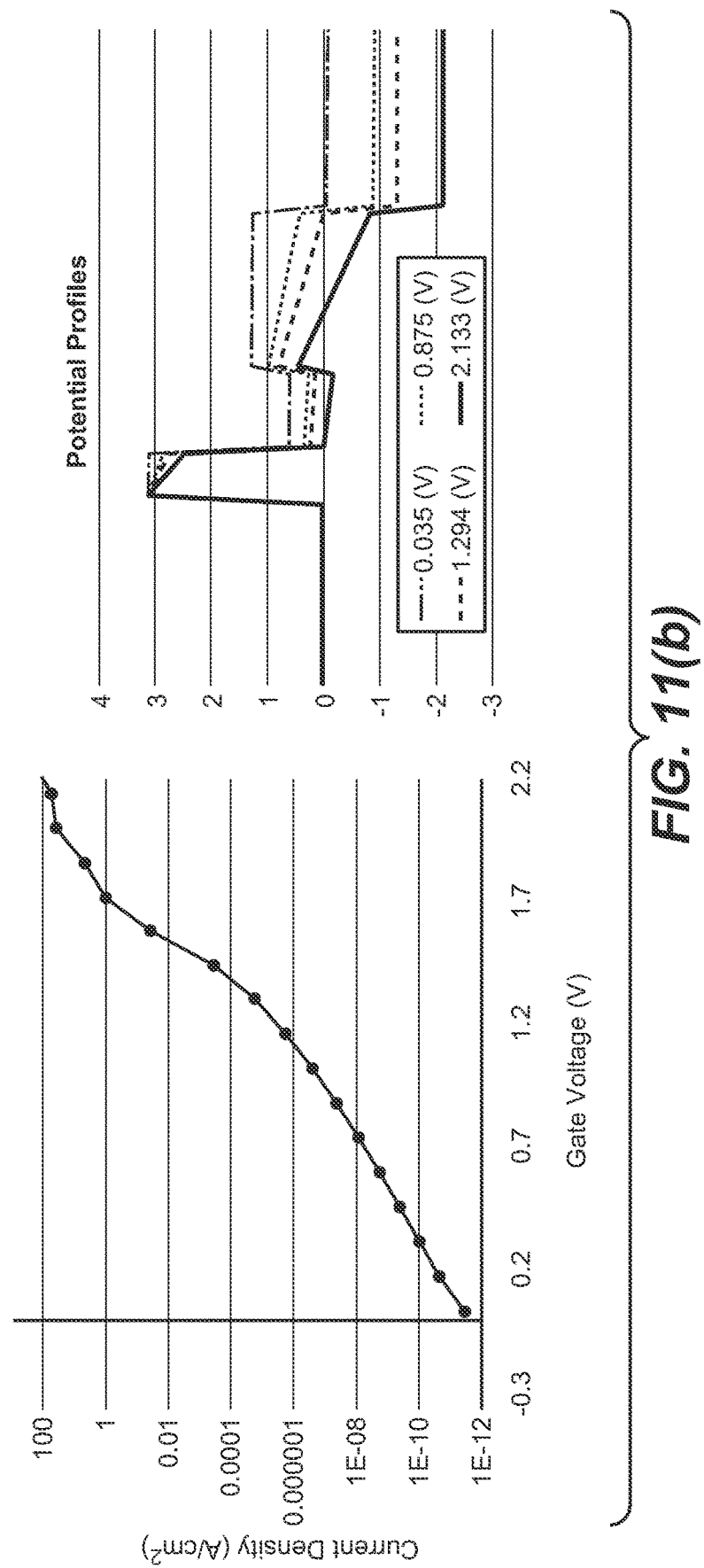

FIG. 11(b) shows a simulation of a storage transistor having a 1.0 nm thick silicon oxide tunneling dielectric layer, a 2.0 nm thick cerium oxide LCBO barrier layer and a 4.0 nm thick silicon-rich silicon nitride trapping layer. FIG. 11(b) shows that a direct-tunneling current density exceeding 1.0 amps/cm$^2$ is achieved with a programming voltage around 1.6 volts.

Figure 11C:
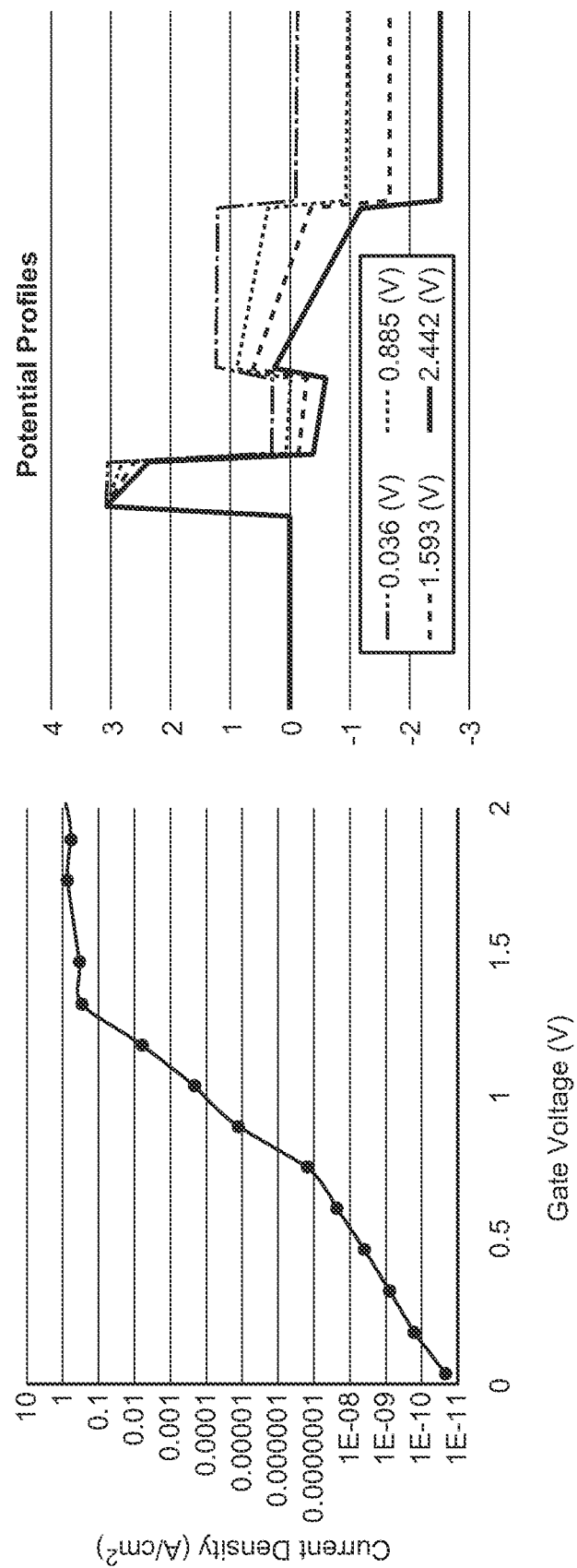

FIG. 11(c) shows a simulation of a storage transistor having a 1.0 nm thick silicon oxide tunneling dielectric layer, a 2.0 nm thick tantalum oxide LCBO barrier layer and a 4.0 nm thick silicon-rich silicon nitride trapping layer. FIG. 11(c) shows that a direct-tunneling current density exceeding 1.0 amps/cm$^2$ is achieved with a programming voltage around 1.8 volts.

Figure 11D:
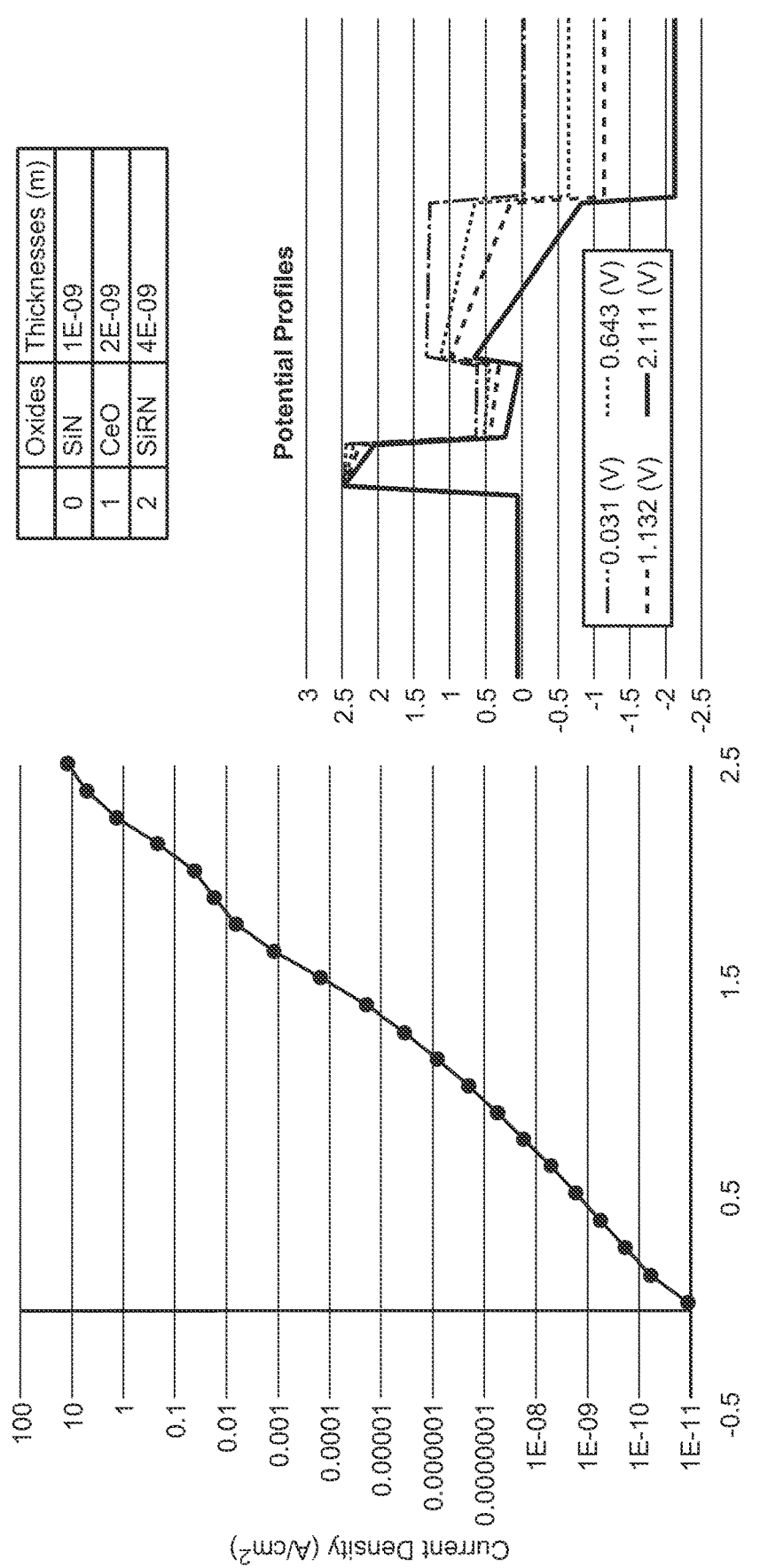

FIG. 11(d) shows a simulation of a storage transistor having a 1.0 nm thick silicon nitride tunneling dielectric layer, a 2.0 nm thick cerium oxide LCBO barrier layer and a 4.0 nm thick silicon-rich silicon nitride trapping layer. FIG. 11(d) shows that a direct-tunneling current density exceeding 1.0 amps/cm$^2$ is achieved with a programming voltage around 2.1 volts.

FIG. 12(a) illustrates a "reverse injection electrons" phenomenon that may occur during an erase operation. The reverse injection electrons may affect endurance adversely. FIG. 12(a) is an energy band diagram for the conduction band of a gate stack in a storage transistor during an erase operation. As shown in FIG. 12(a), the gate stack includes substrate 601, tunnel dielectric 602, LCBO barrier dielectric 603, charge-trapping layer 604, blocking dielectric layer 605 and gate electrode 606. (Blocking dielectric layer 605 may be, for example, silicon oxide ($SiO_2$)). During an erase operation, the relatively high electric field across blocking dielectric layer 605 may cause high-energy electrons—indicated in FIG. 12(a) by arrow 1201—to tunnel from the gate electrode into charge-trapping layer 604, or even into tunnel dielectric layer 602. These reverse injection electrons may damage these layers, adversely affecting the storage transistor's endurance.

According to one embodiment of the present invention, reverse injection electrons may be significantly reduced or substantially eliminating by including a layer of material with a high dielectric constant ("high-k material"), such as aluminum oxide ($Al_2O_3$) in the blocking dielectric layer (e.g., blocking dielectric layer 605 of FIG. 10(a)). In that embodiment, a high work function metal (e.g., greater than 3.8 eV, preferably not less than 4.0 eV) may be used for gate electrode. A high-k material of $t_H$ provides an equivalent oxide thickness $t_{EOT}$ given by:

$$t_{EOT} = t_H \times \frac{\kappa_{ox}}{\kappa_H}$$

where $\kappa_{ox}$ and $\kappa_H$ are the relative dielectric constants of silicon oxide and the high-k material, respectively. Thus, a high-k material can provide the same desirable transistor characteristics (e.g., gate capacitance) at a thickness of $t_H$, without incurring undesirable leakage of its silicon oxide layer counterpart at the much thinner equivalent thickness $t_{EOT}$.

FIG. 12(b) is an energy band diagram for the conduction band of a gate stack in a storage transistor during an erase operation, the storage transistor having additional aluminum oxide layer 607 in blocking dielectric layer 610, according to one embodiment of the present invention. In FIG. 12(b), blocking dielectric layer 610 includes aluminum oxide layer 607 and silicon oxide layer 608. In one implementation, blocking dielectric layer 610 has an equivalent oxide thickness that is substantially the same as blocking layer dielectric 605 of FIG. 12(a). However, as aluminum oxide has a relative dielectric constant of 9.0, while silicon oxide's relative dielectric constant is 3.9, the actual combined physical thickness of aluminum oxide 607 and silicon oxide 608 in FIG. 12(b) is greater than the thickness of blocking dielectric layer 605 of FIG. 12(a). Because high-k dielectric layer 607 has a greater relative dielectric constant than silicon oxide layer 608, the electric field is lower in high-k dielectric layer 607 than in silicon oxide layer 608. The greater combined physical thickness of blocking dielectric layer 610 of FIG. 12(b)—which provides a wider tunneling barrier between gate electrode 606 and charge-trapping layer 604—and a lower electric field at the interface between gate electrode 606 and high-k material 607 reduce or eliminate reverse injection electrons, thereby resulting in an improved endurance. With high-k electric layer 607 (e.g., aluminum oxide), a high work function metal is preferred for gate electrode 606. The high work function metal creates a high barrier (indicated by barrier height 1202 in FIG. 12(b)) at the gate electrode-aluminum oxide interface, which significantly reduces reverse electron injection the erase operation. Suitable high work function metals include: tungsten (W), tantalum nitride (TaN), tantalum silicon nitride (TaSiN).

Figure 13A:
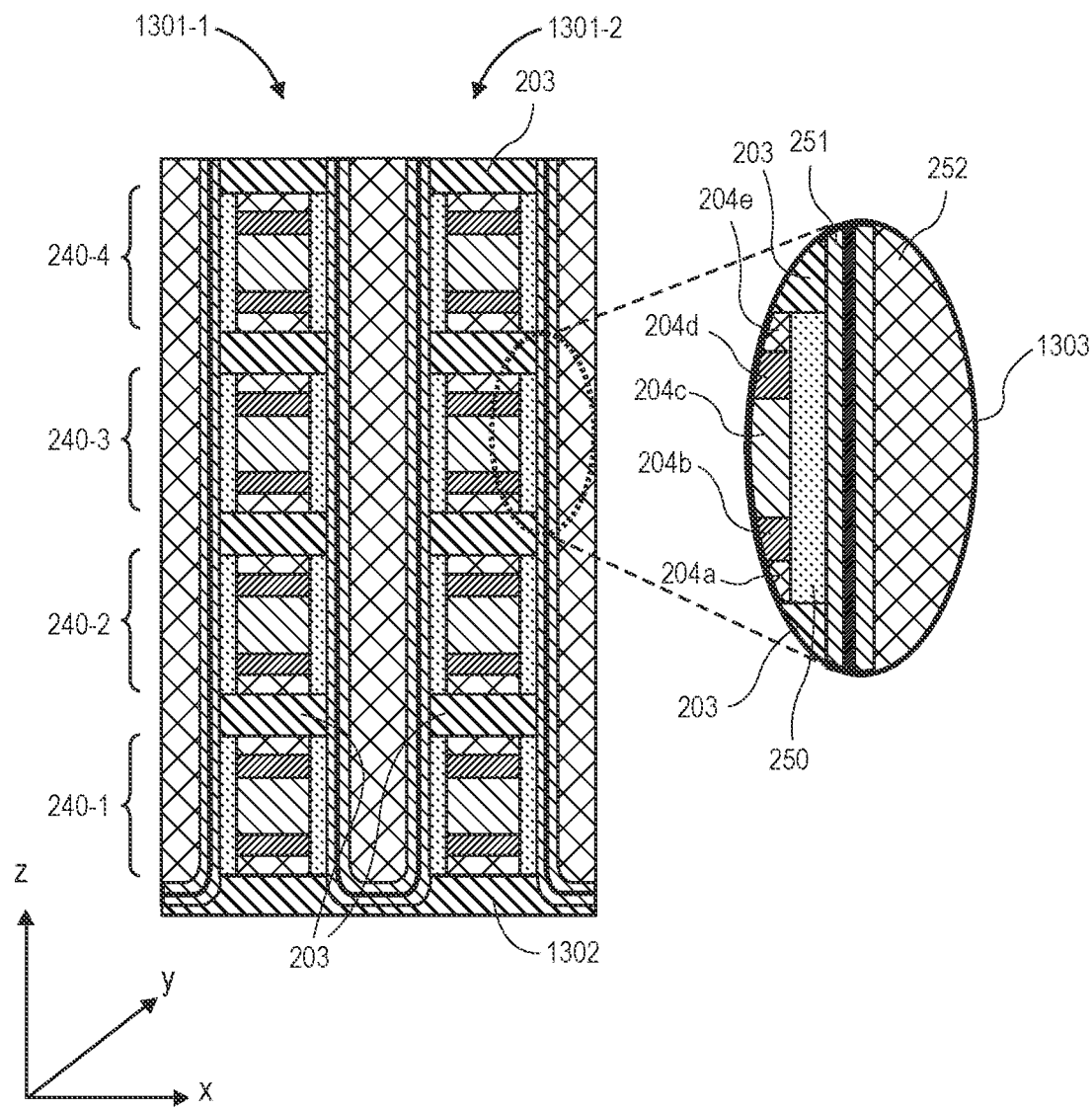

FIG. 13(a) shows a cross-section of a 3-dimensional array 1300 of NOR memory strings, which may be formed out of the thin-film storage transistors discussed above, according to one embodiment of the present invention. As shown in FIG. 13(a), stacks 1301-1 and 1301-2 of NOR memory strings are formed above a planar surface of silicon substrate 1302. Stacks 1301-1 and 1301-2 represent a row of any suitable number of active stacks (e.g., 2, 4, 8, 16 . . . ) separated from each other by isolation dielectric (e.g., silicon oxycarbide (SiOC)) layers 203 along the X-direction. Each of the active stacks may include any suitable number (e.g., 2, 4, 8, 16, . . . ) active multi-layers, each providing any suitable number of storage transistors (e.g., 8, 16, . . . , 2048, 4096, . . . )—organized as one or more NOR memory strings—separated from each other along the Y-direction. For example, stack 1301-1 is shown in FIG. 13(a) to include NOR memory strings 204-1 to 204-4. The inset of FIG. 13(a) shows a cross-section of storage transistor 1303 in one NOR memory string of active stack 1301-2.

As shown in FIG. 13(a), storage transistor 1303 includes (i) conductor layer 204a (e.g., a titanium nitride-lined tungsten layer), (ii) N$^+$-doped amorphous silicon or polysilicon layer 204b (e.g., phosphorus or arsenic-doped amorphous or polysilicon), (iii) oxide layer 204c, (iv) N$^+$-doped amorphous silicon or polysilicon layer 204d (e.g., phosphorus or arsenic-doped amorphous or polysilicon), (v) conductor layer 204e (e.g., a titanium nitride-lined tungsten layer), channel layer 250 (e.g., any channel region formed out of any suitable semiconductor material described above), charge storage layer 251 (e.g., a multi-layer that may include any tunneling layer, any charge-trapping layer and any blocking layer, described above), and gate electrode or local word line 252 (e.g., any gate electrode described above). N$^+$-doped amorphous silicon or polysilicon layers 204b and 204d extend lengthwise along the Y-direction to form, respectively, the common source region and the common drain region ("common bit line") for all the storage transistors of the NOR memory string. Conductor layers 204a and 204e are in contact with and are provided to reduce the resistivities of the common source region and the common bit line, respectively.

3-dimensional array 1300 of NOR memory strings may be formed using any of the processes, or any combination thereof, discussed in Provisional Application III or Provisional Application IV (e.g., the process discussed in conjunction with FIGS. 2a-2j of Provisional Application III).

The present inventors realize that the materials for the charge-trapping layer of the above-disclosed thin-film storage transistors (e.g., charge trapping layer 503 of FIG. 5), such as hafnium oxide, may have ferroelectric polarization phases, as known in the prior art. The present inventors realize that, by harnessing these ferroelectric phases for data storage, the thin-film storage transistors in a 3-dimensional memory array of NOR memory strings may be readily adapted to operate as ferroelectric field-effect transistors ("FeFETs"), thereby providing high data endurance, long data retention, and relatively low voltage operations for both erase (under 7.0 volts) and program (under −7.0 volts). The combining of the ferroelectric polarization characteristics of the FeTFT and the 3-dimensional organization of the thin film horizontal (or, alternatively, vertical) NOR memory strings described herein achieves the additional benefits of high-density, low-cost memory arrays with thin film FeTFTs that can be randomly accessible at high speed (i.e. low read latency).

Figure 13B:
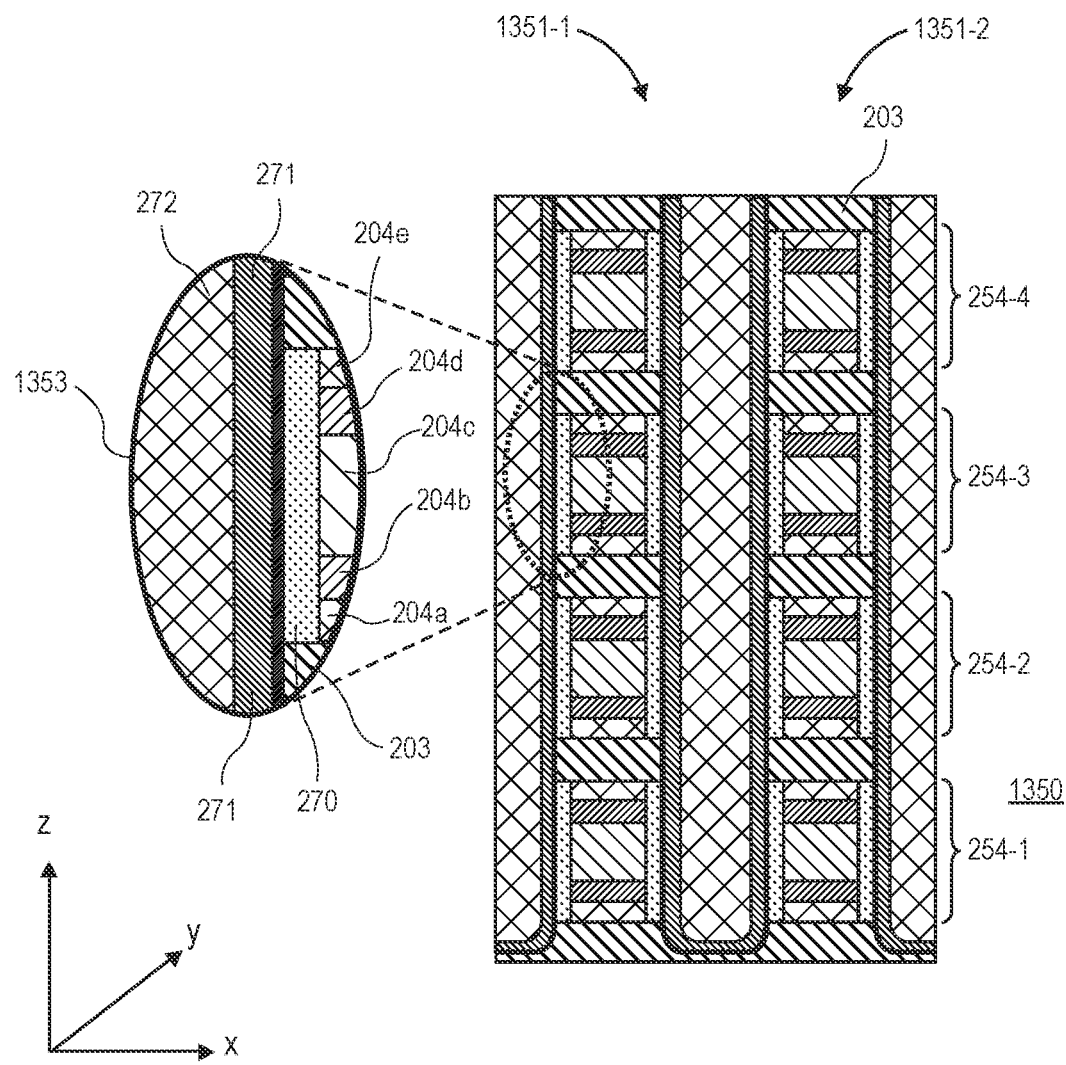

FIG. 13(b) shows active stacks 1351-1 and 1351-2 of NOR memory strings in a 3-dimensional array 1350, with each NOR memory string including numerous FeFETs as storage transistors, according to one embodiment of the present invention. In 3-dimensional array 1350, each active stack (e.g., stack 1351-1) includes numerous NOR memory strings formed by the FeFETs (e.g., represented by NOR memory strings 254-1 to 254-4). The inset of FIG. 13(b) shows a cross-section of FeFET 1353 in one NOR memory string of active stack 1351-2.

FIG. 13(b) shows representative FeFET 1353 in a NOR memory string of 3-dimensional array 1350. Representative FeFET 1353 includes (i) conductor layer 204a (e.g., a titanium nitride-lined tungsten layer), (ii) N$^+$-doped amorphous silicon or polysilicon layer 204b, (iii) oxide layer 204c, (iv) N$^+$-doped amorphous silicon or polysilicon layer 204d, and (v) conductor layer 204e (e.g., a titanium nitride-lined tungsten layer), which function in like manner, and may be provided in substantially the same manner, as those like layers that are assigned like reference numerals in FIG. 13(a). Rather than charge storage layer 251 of storage transistor 1303, FeFET 1353, however, has ferroelectric storage layer 271 that may include a ferroelectric material and an interface dielectric layer. FeFET 1353 has channel region 270 and gate electrode or local word line 272, which may be formed out of the same or different materials from channel region 250 and gate electrode or local word line 252, respectively. As in the storage transistors of a NOR memory string of FIG. 13(a), N$^+$-doped amorphous silicon or polysilicon layers 204b and 204d extend lengthwise along the Y-direction to form, respectively, the common source region and the common drain region ("common bit line") for all the FeFETs of the NOR memory string of FIG. 13(b). Likewise, conductor layers 204a and 204e in FIG. 13(b) are in contact with and are provided to reduce the resistivities of the common source region and the common bit line, respectively.

In this detailed description, in all the embodiments of the present invention, the semiconductor substrate typically includes control, sensing and driving circuit that support the memory operations of the storage transistors or the FeFETs in the 3-dimensional array of NOR memory strings above it.

In some embodiments, in order to reduce interference between neighboring FeFETs, ferroelectric storage layer 271 of FeFET 1353 of FIG. 13(b) is preferably separated from the ferroelectric storage layers of the FeFETs in other active multi-layers of its active stack, unlike charge storage layer 251 of storage transistor 1303 of FIG. 13(a), which may be continuous with the charge storage layers of the storage transistors in other active multi-layers of its active stack.

According to one embodiment of the present invention, channel region 270 of FeFET 1350, which may be formed in a 3-dimensional memory array, may include p$^-$-doped poly silicon (e.g., 7.0-14.0 nm thick) and gate electrode 272 may be formed out of tungsten (W), molybdenum (Mo), aluminum (Al), ruthenium (Ru), tantalum (Ta), titanium (Ti), or any combination or alloy of these metals. Ferroelectric storage layer 271 may include an interface dielectric layer (e.g., silicon oxynitride (SiON), silicon nitride ($Si_3N_4$), or silicon oxide ($SiO_2$), 0.0 to 2.0 nm thick, with a refractive index between 1.5 to 2.0) and a ferroelectric material layer (e.g., zirconium-doped hafnium oxide ($HfO_2$:Zr; or "HZO"), aluminum-doped hafnium oxide ($HfO_2$:Al), silicon-doped hafnium oxide ($HfO_2$:Si) or lanthanum-doped hafnium oxide ($HfO_2$:La). The ferroelectric material layer may be, for example, 3.0 to 8.0 nm thick. The term HZO may encompass hafnium zirconium oxide (HfZrO), hafnium zirconium oxynitride (HfZrON), hafnium zirconium aluminum oxide (HfZrAlO) or any hafnium oxide that includes zirconium impurities. The HZO ferroelectric material layer may be formed using atomic layer deposition (ALD) techniques at temperature between 200° C. to 330° C. (e.g., around 300° C.), with a post-deposition annealing step at a temperature between 400° C. and 1000° C., based on the desired crystallization phase requirement of the ferroelectric material.

The interface dielectric layer isolates the ferroelectric material layer from electron or hole tunneling from the channel region during conduction, as the electrons or holes tunneled into the ferroelectric material layer may adversely affect polarization in the ferroelectric material layer. The interface dielectric layer may be formed out of a material with a dielectric constant greater than that of silicon oxide ("high-k" material; preferably with a dielectric constant greater than 3.9) to reduce the electric field during program or erase operations and to reduce the tunneling from the channel region. For a 0.0 nm thick interface dielectric layer, the ferroelectric material layer is directly deposited by atomic layer deposition (ALD) onto the channel region (e.g., polysilicon). A native oxide of a self-limiting thickness (e.g., 1.0 to 10.0 angstrom) would be inherently formed at the interface between the channel region and the ferroelectric material layer. This approach is particularly advantageous when the channel region is formed after high temperature steps, such that contamination by dopant diffusion is a lesser concern. In some embodiments, the bandgap-engineered tunneling layer (e.g., a silicon oxide ($SiO_2$) and zirconium oxide ($ZrO_2$) multi-layer) may serve as the interface dielectric layer, providing the advantage of reduced tunneling into the ferroelectric material layer. The high-k dielectric properties of the zirconium oxide reduce the electric field in the interface dielectric layer.

Figure 14A:
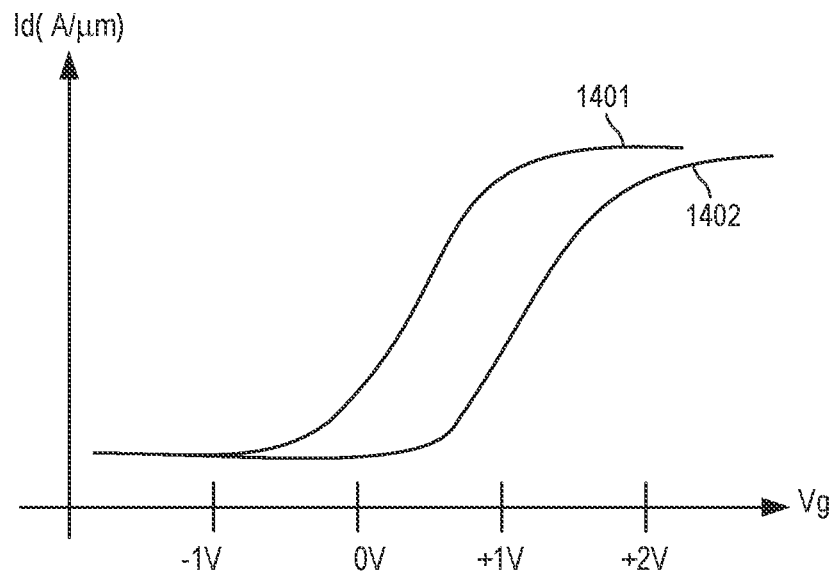

An FeFET may be polarized to either a conducting or "erased" state or a non-conducting state or "programmed" state. In an FeFET, its threshold voltage in the erased state is lower than its threshold voltage in the conducting state. FIG. 14(a) shows hysteresis in the drain current (Ia) in response to an applied gate voltage ($V_g$) in a conventional FeFET. (The conventional FeFET is formed at the planar surface of a monocrystalline semiconductor substrate and is not formed as a thin-film field effect transistor.) In FIG. 14(a), waveform 1401 traces the drain current of the FeFET in its erased state, as the gate voltage increases from less than −1.0 volts to greater than 1.0 volts, and waveform 1402 traces the drain current of the FeFET in its programmed state, as the gate voltage decreases from greater than 1.0 volts to less than −1.0 volts. As seen in FIG. 14(a), the conventional FeFET has a negative threshold voltage ($V_t$).

It is desirable in some applications, however, for an FeFET (e.g., a thin-film FeFET in a NOR memory string) to have a positive threshold voltage ($V_t$), such as around 0.5 volts, to prevent undesirable leakage current when it is subject to a disturb condition (e.g., a neighboring FeFET in the NOR memory string, not the FeFET itself, is selected in a read operation).

Figure 14B:
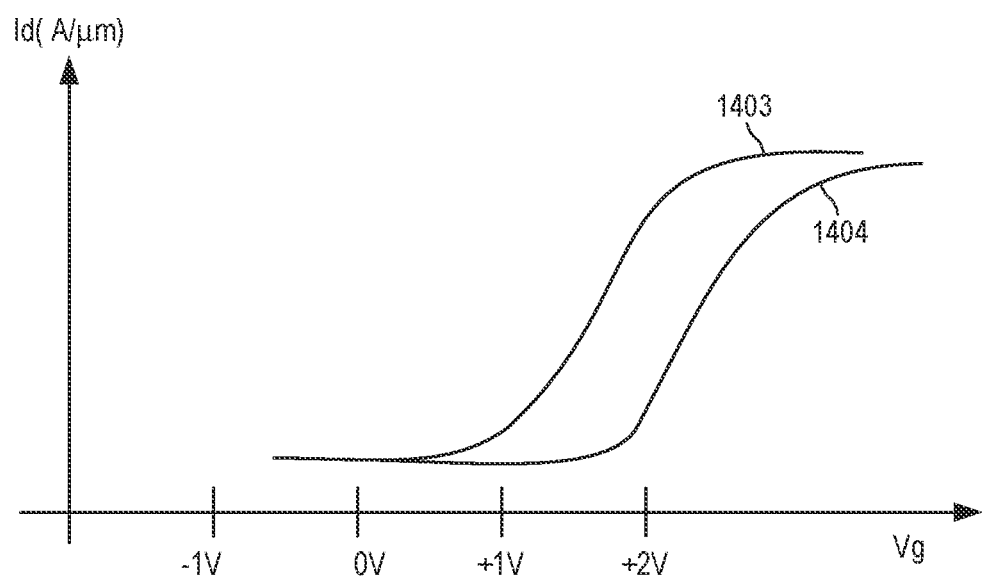

FIG. 14(b) shows a desirable hysteresis in the drain current (Ia) response to an applied gate voltage ($V_g$) in a thin-film FeFET in a NOR memory array, according to one embodiment of the present invention. In FIG. 14(b), waveform 1403 traces the drain current of the FeFET in its erased state, as the gate voltage increases from less than −1.0 volts to greater than 1.0 volts, and waveform 1404 traces the drain current of the FeFET in its programmed state, as the gate voltage decreases from greater than 1.0 volts to less than −1.0 volts. As seen in FIG. 14(b), the FeFET has a positive threshold voltage ($V_t$) of about 0.5 volts, and a threshold voltage difference ("window") between the erased state and the programmed state of 1.0 volts to 2.5 volts. With a p⁻ polysilicon channel region (e.g., boron-doped), this threshold voltage may be achieved by (i) increasing the boron dopant concentration in the channel region, (ii) providing a gate electrode that is formed out of a conductive material that has a high work function (e.g., tungsten (W), molybdenum (Mo), aluminum (Al), ruthenium (Ru), tantalum (Ta), or titanium (Ti), (iii) appropriate biasing in the common source region (see below), or (iv) the combination of (i), (ii) and (iii).

Table 1 summarizes exemplary bias voltages for a 3-dimensional array of NOR memory strings during erase, program and read operations at (i) the gate electrode or word line, the common source line, and the common bit line of a selected FeFET and (ii) the non-selected word lines and bit lines of the 3-dimensional memory array:

TABLE 1

| Operation | Selected | | | Non-selected | |
| --- | --- | --- | --- | --- | --- |
| | Gate/Word Line | Source | Drain | Word Lines | Source or Bit Lines |
| Erase | 2.0 to 6.0 volts (e.g., 4.0 volts) | 0 volts | 0 volts | e.g., 1.0 volt | 1.0 to 3.0 volts (e.g., 2.0 volts) |
| Program | 0 volts | 3.0 to 6.0 volts (e.g., 4.0 volts) | 3.0 to 6.0 volts (e.g., 4.0 volts) | 1.0 to 3.0 volts (e.g., 1.0 volts) | e.g., 2.0 volts |
| Read | 1.0 to 3.0 volts | 0.0 volts | 0.05 to 1.0 volts | 0.0 volts | 0.0 to 1.0 volts |

When the body region of an FeFET in a NOR memory string is floating, its programming speed may be slower than its erase speed. In such a condition, the gate-induced drain leakage (GIDL) effect may be harnessed to improve the programming speed. The GIDL effect may be activated by creating a voltage difference of 0.5 to 2.0 volts between the common bit line and the common source line ($V_{ds}$) during programming, for example, by first momentarily pre-charging the common source line to a predetermined source line voltage through the common bit line, and then setting the common bit line to its target voltage, as disclosed in the Related Application.

During a read operation, when the thin film FeFET in the erased state has a negative threshold voltage, its common source line may be biased to a voltage above such a threshold voltage to prevent conduction in the non-selected FeFETs of the NOR memory string. Of importance, during a read operation, the voltage between the gate or word line and the common bit line or the common source line in the selected FeFET is maintained at less than the voltage that may change the polarization phase of the selected FeTET, so as to avoid the phenomenon known as read-disturb.

3-dimensional memory array of thin film FeFET transistors that are organized as NOR memory strings may be formed by adapting any suitable process or processes disclosed in Provisional Applications III and IV.

Figure 15A:
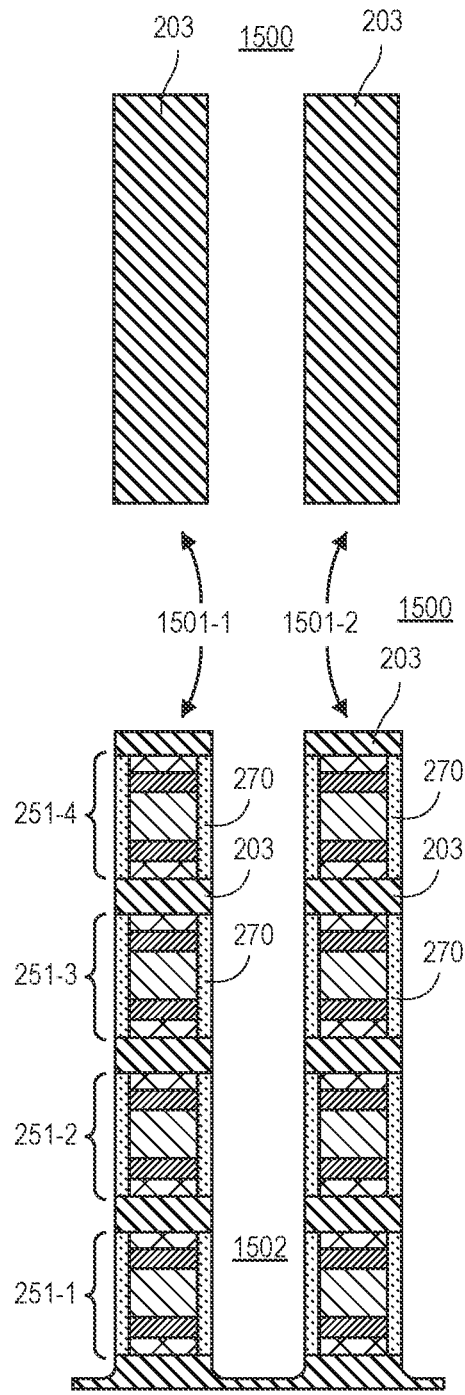
Figure 15B:
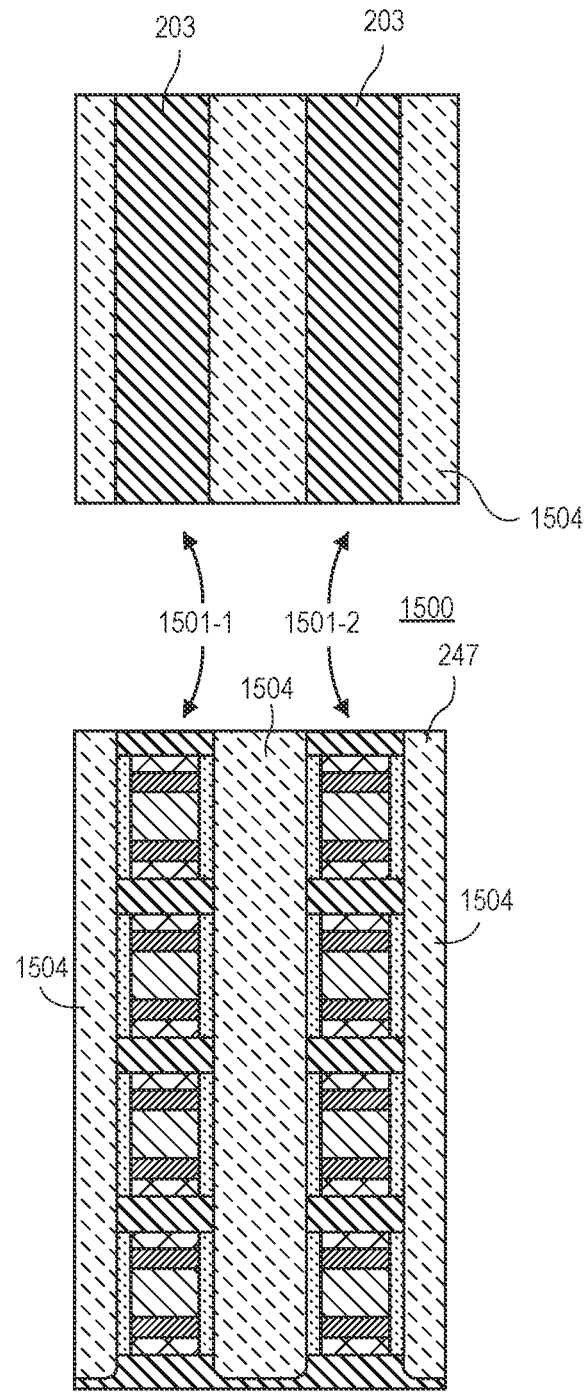

FIGS. 15(a)-15(d) illustrate a first process that forms a 3-dimensional memory array of thin film FeFETs organized as NOR memory strings, according to one embodiment of the present invention. FIG. 15(a) shows in top (i.e., X-Y plane) and X-Z plane cross-sectional view intermediate memory structure 1500, after formation of active stacks 1501-1 and 1501-2 and deposition into recesses of multi-layers 251-1 to 251-4 and etching back of a channel material (e.g., p⁻-doped amorphous silicon or polysilicon). In FIG. 15(a), adjacent active stacks are separated by trenches 1502 that extend along the Y-direction. Intermediate memory structure 1500 may be achieved using the process steps, for example, illustrated by FIGS. 2a to 2h in Provisional Application III. In FIG. 15(a), channel region 270 in multi-layer 251-4 is separated to the like channel region of multi-layer 251-3 due to the multi-layers being recessed into adjacent isolation dielectric layers 203 (e.g., SiOC). Thereafter, trenches 1502 are filled by dielectric material 1504 (e.g., silicon oxide) and excess dielectric material is removed from the top of intermediate memory structure 1500 by, for example, chemical-mechanical polishing (CMP). Resulting intermediate structure 1500 is shown in FIG. 15(b).

Figure 15C:
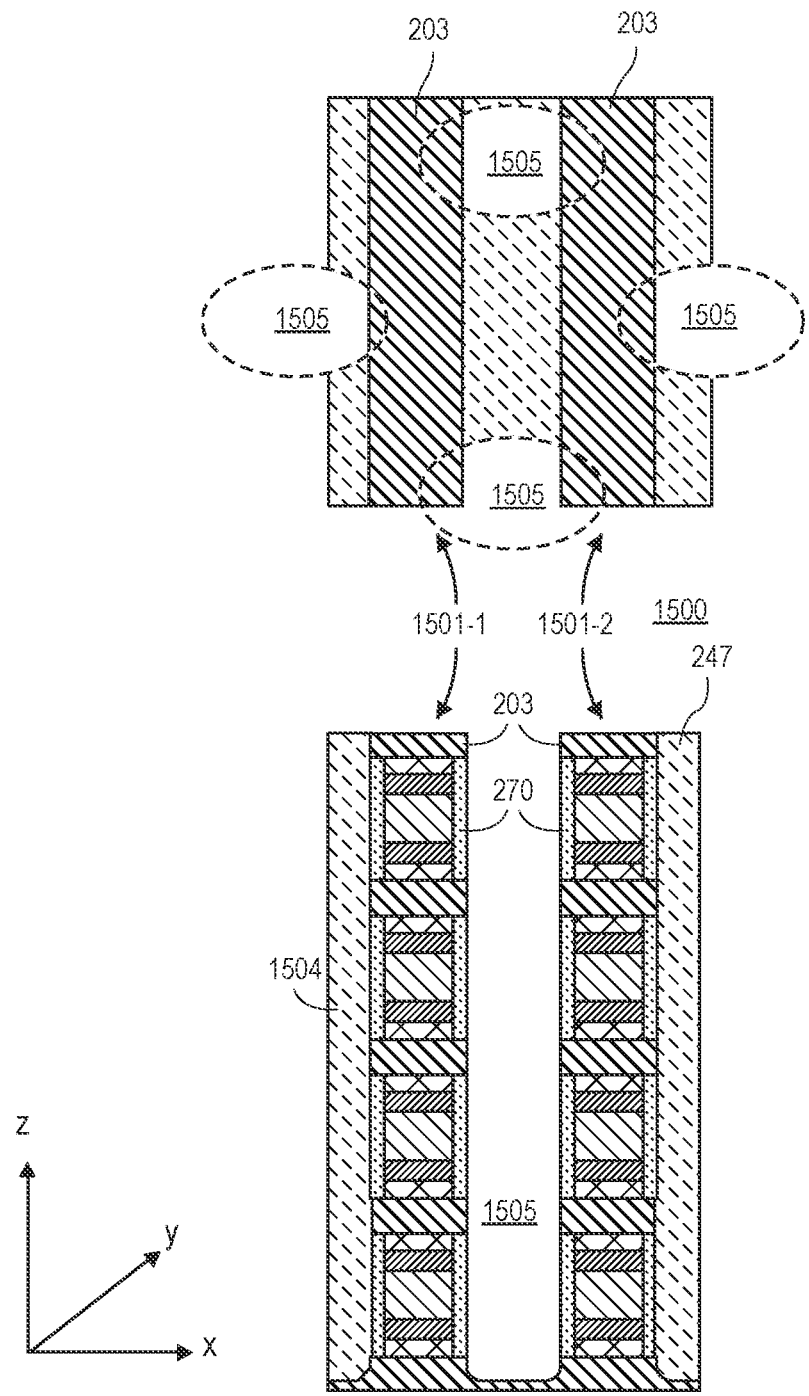

Thereafter, shafts 1505 (e.g., oval shafts) are formed in dielectric material 1505 of filled trenches 1502, using a process such as described in conjunction with FIG. 2j in Provisional Application IV. Resulting intermediate structure 1500 is shown in FIG. 15(c). Shafts 1505 each exposes sidewalls of isolation dielectric layers 203 and channel material 270.

Figure 15D:
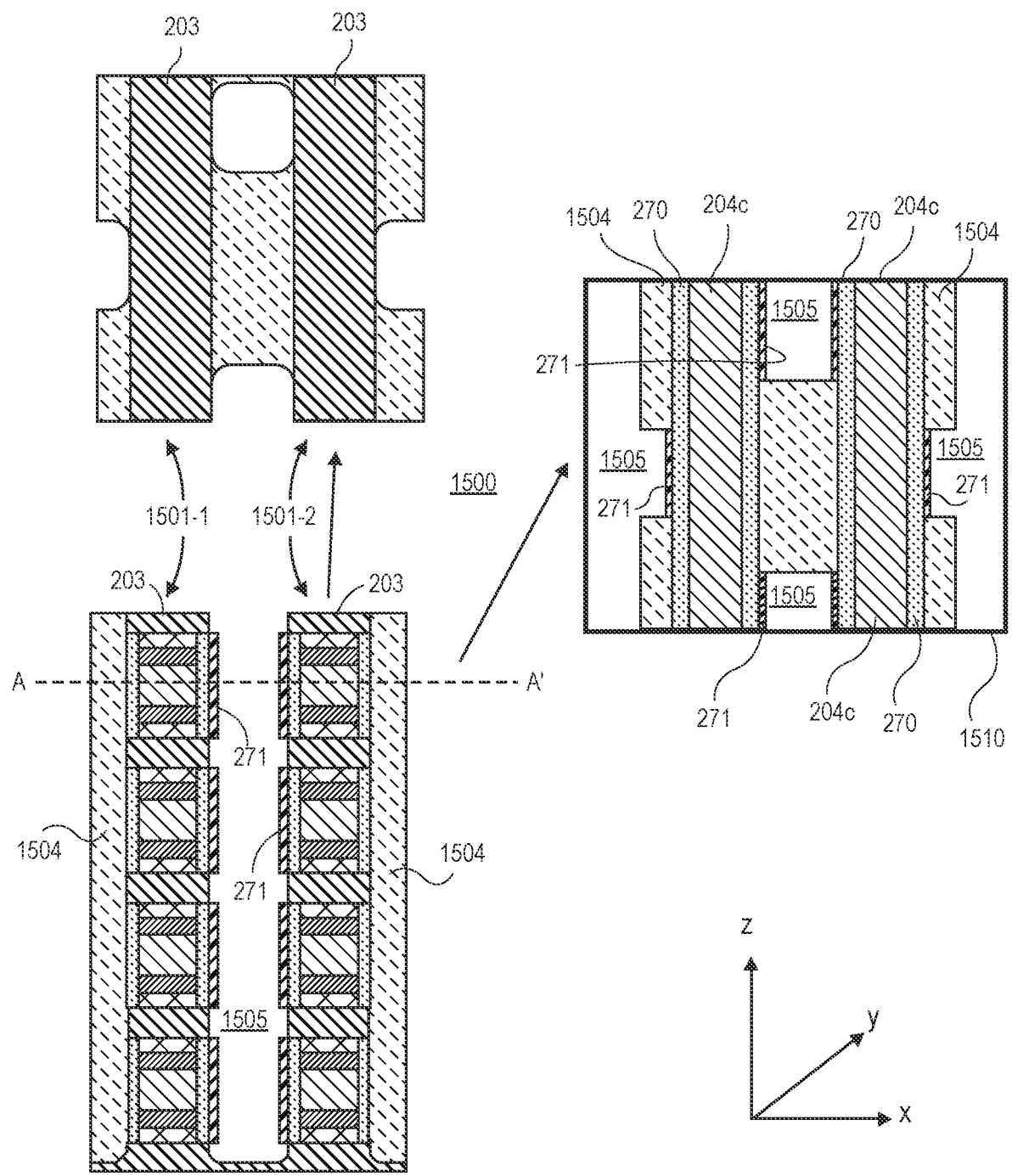

Thereafter, self-assembled monolayers ("SAMs"; e.g., species having active hydroxyl (—OH) bonds) are provided to passivate the sidewalls of isolation dielectric layers 203. Thereafter, ferroelectric storage layer 271 may then be selectively deposited on the exposed surfaces of channel material 270. (The treatment by SAMs prevents deposition of ferroelectric storage layer 271 onto the sidewalls of isolation dielectric layers 203.) Resulting intermediate structure 1500 is shown in FIG. 15(d). Ferroelectric storage layer 271 may be formed by the selective deposition, using ALD techniques in an ozone ambient, of the interface dielectric layer and the ferroelectric material layer.

The interface dielectric layer may include a native oxide layer formed by a chemical clean of the surface of channel material 270, followed by densification, for example by pulsed ozone or by thermal annealing in a hydrogen or deuterium ambient, or any other techniques known to a person of ordinary skill in the art. This treatment reduces electronic leakage through the interface dielectric layer, reduces the surface states at the interface between the third semiconductor layer and the ferroelectric storage layer, or both. The ferroelectric material layer may be formed for example, using repeated cycles of hafnium oxide depositions and zirconium oxide depositions (e.g., in a $HfO_2$:$ZrO_2$ ratio of 4:1). For the thicker ferroelectric material layers (e.g., greater than 40 nm), additional SAM treatments between deposition cycles may be advisable. FIG. 15(d) includes an additional X-Y plane cross-sectional view 1510 of memory structure 1500 along line A-A' through oxide layer 204c of the X-Y plane cross sectional view. The 3-dimensional array may then be completed using, for example, the process steps described in conjunction with FIGS. 2l to 2t of Provisional Application IV.

Figure 16D:
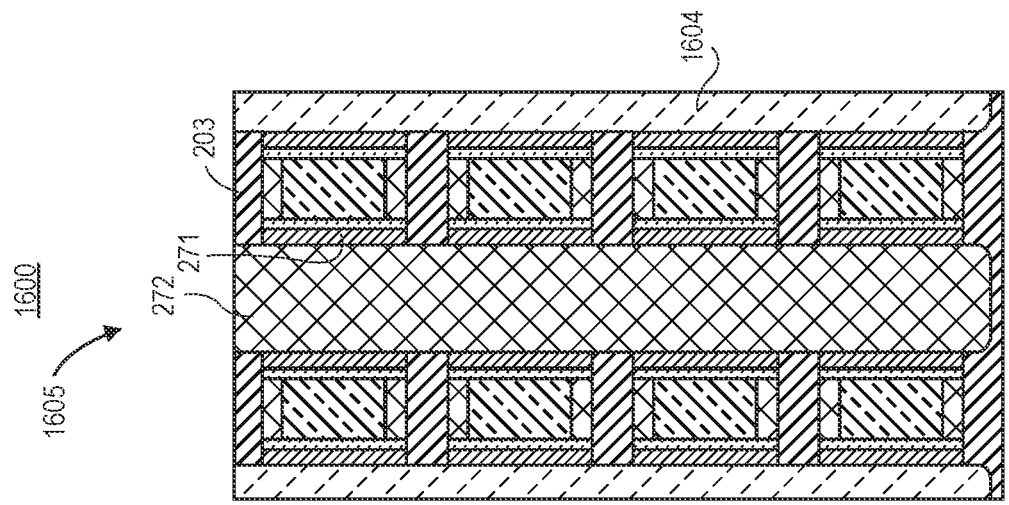

FIGS. 16(a)-16(d) illustrate a second process that forms a 3-dimensional memory array of thin film FeFETs organized as NOR memory strings, according to one embodiment of the present invention. FIG. 16(a) shows an X-Z plane cross-sectional view intermediate memory structure 1600, after formation of active stacks 1601-1 and 1601-2 and deposition into recesses of multi-layers 251-1 to 251-4 and etching back of a channel material (e.g., p⁻-doped amorphous silicon or polysilicon) to expose the sidewalls of isolation dielectric layer 203. As in FIG. 15(a), adjacent active stacks in FIG. 16(a) are separated by trenches (i.e., trenches 1602) that extend along the Y-direction. Intermediate memory structure 1600 may be achieved using the process steps, for example, illustrated by FIGS. 2a to 2h in Provisional Application III.

Relative to intermediate memory structure 1500 of FIG. 15(a), however, the recesses of multi-layers 251-1 to 251-4 in FIG. 16(a) are deeper. For example, for channel region 270 targeted for a 10.0 nm thickness, the recesses of multi-layers 251-1 to 251-4 are made 20.0 nm thick, such that channel material 270 is 20.0 nm thick at the process step of FIG. 16(a). A further etch back of channel region 270 (e.g., by a wet etch) reduces the thickness of channel regions 270, for example, to 10.0 nm, thereby creating recesses of approximately 10.0 nm deep between adjacent isolation dielectric layers 203. Resulting intermediate memory structure 1600 is shown in FIG. 16(b).

Figure 16C:
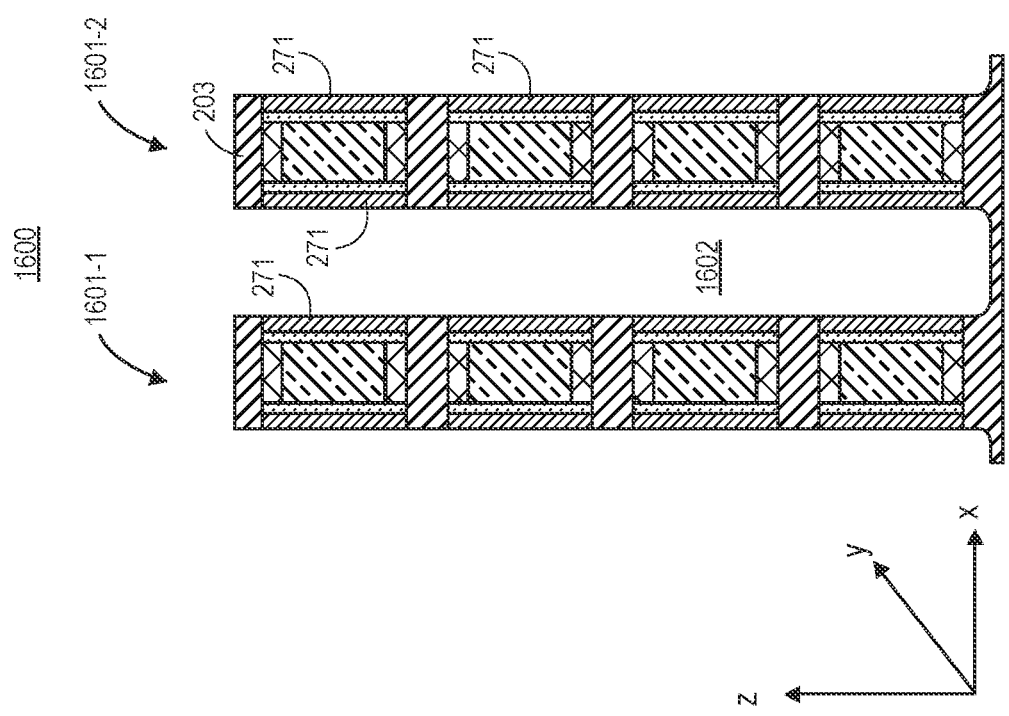

Thereafter, ferroelectric storage layer 271 may be formed by the deposition, using ALD techniques, of the interface dielectric layer and the ferroelectric material layer onto channel material 270 in the 10.0 nm deep recesses of between adjacent isolation dielectric layers 203. The ferroelectric material layer may be formed for example, using repeated cycles of hafnium oxide depositions and zirconium oxide depositions (e.g., in a $HfO_2$:$ZrO_2$ ratio of 4:1). Resulting intermediate memory structure 1600 is shown in FIG. 16(c). As shown in FIG. 16(c), because of the recesses, the ferroelectric storage layer 271 of the multi-layers are separated from each other by isolation dielectric layers 203.

The 3-dimensional array of NOR memory strings may then be completed using, for example, the process steps described in conjunction with FIGS. 2j to 2t of Provisional Application IV. FIG. 16(d) shows a X-Z plane cross-sectional view of the completed 3-dimensional array of NOR memory strings, showing (i) conductive material 272 (i.e., gate electrode) in shaft 1605 and (ii) oxide 1604 electrically isolating adjacent gate electrodes from each other.

Figure 17C:
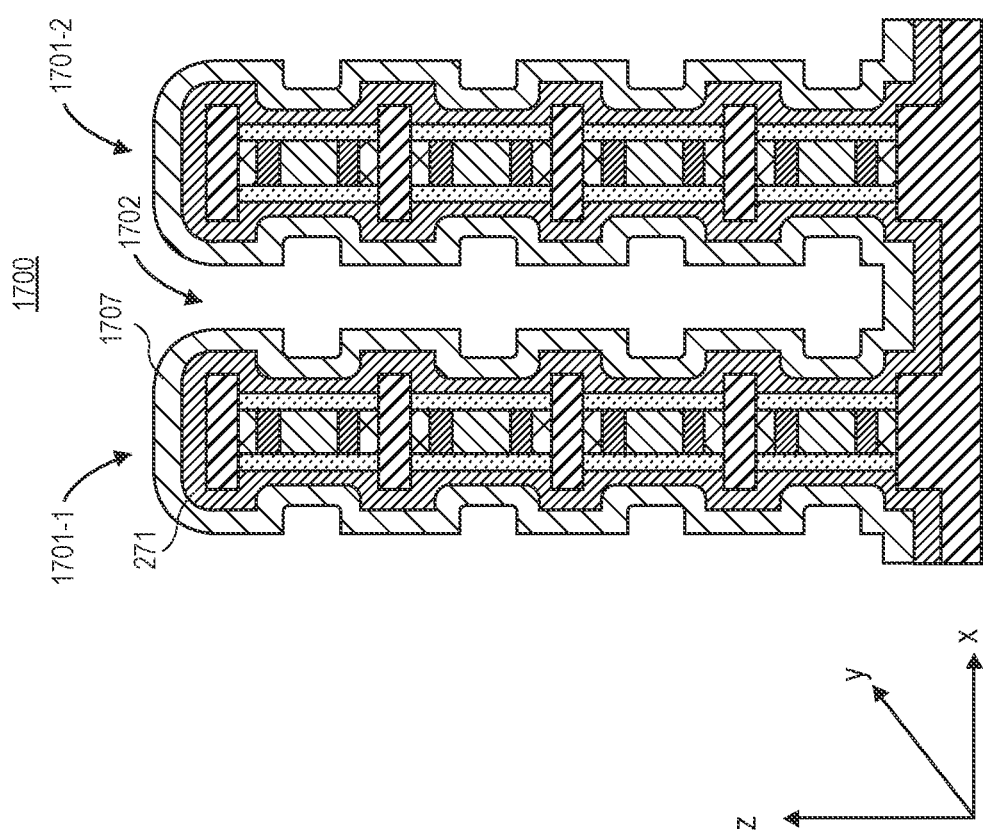

FIGS. 17(a)-17(g) illustrate a third process that forms a 3-dimensional memory array of thin film FeFETs organized as NOR memory strings, according to one embodiment of the present invention. FIG. 17(a) shows an X-Z plane cross-sectional view intermediate memory structure 1700, after formation of active stacks 1701-1 and 1701-2 and deposition into recesses of multi-layers 251-1 to 251-4 and etching back of a channel material (e.g., p⁻-doped amorphous silicon or polysilicon; e.g., 20.0 nm thick) to expose the sidewalls of isolation dielectric layer 203. As in FIG. 16(a), adjacent active stacks in FIG. 17(a) are separated by trenches (i.e., trenches 1702) that extend along the Y-direction. A further etch back of channel region 270 (e.g., by a wet etch) reduces the thickness of channel regions 270, for example, to 10.0 nm, thereby creating recesses of approximately 10.0 nm deep between adjacent isolation dielectric layers 203. Resulting intermediate memory structure 1700 is shown in FIG. 17(b). Intermediate memory structures 1700 of FIGS. 17(a) and 17(b) may be formed using substantially the same process steps as those discussed above that are used to form intermediate memory structure 1600 of FIGS. 16(a) and 16(b), respectively.

Figure 17E:
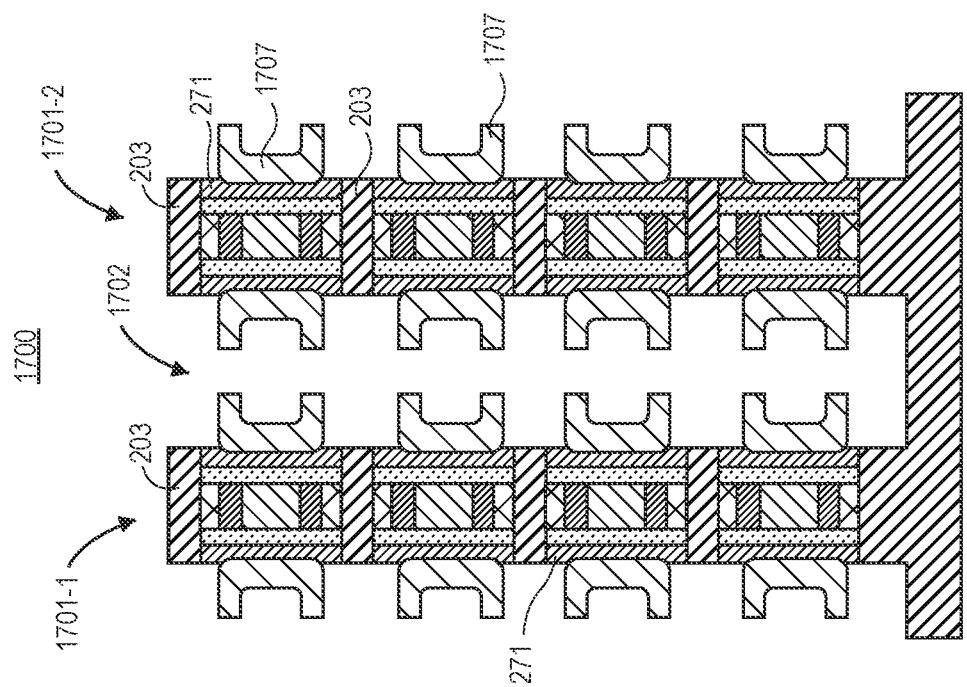
Figure 17D:
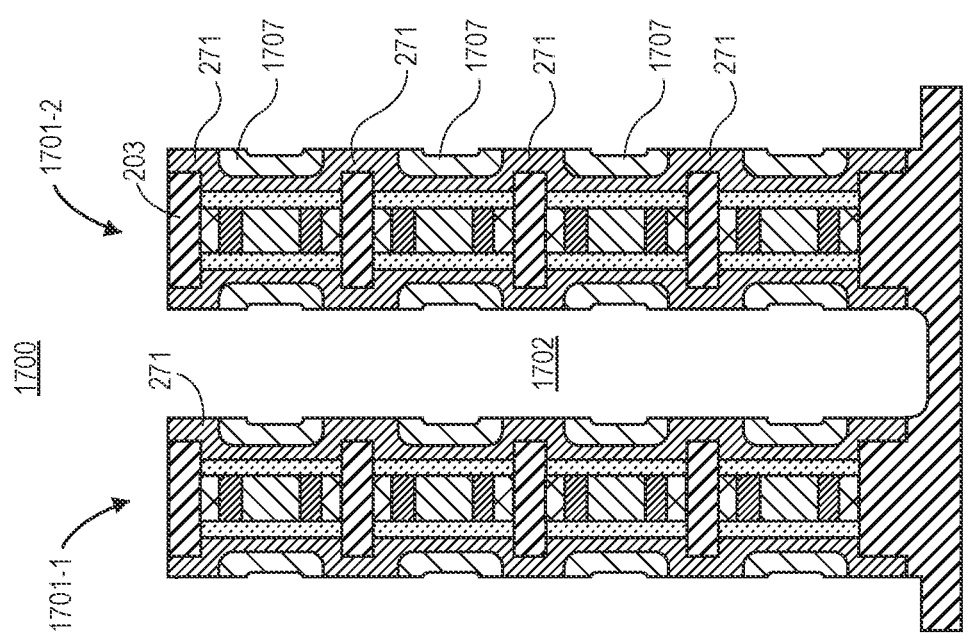

Thereafter, ferroelectric storage layer 271 is formed on intermediate memory structure 1700, using the ALD techniques discussed, for example, in conjunction with FIG. 16(c) above, followed by a conformal deposition of amorphous silicon liner 1707. Resulting intermediate memory structure 1700 is shown in FIG. 17(c). Then, an anisotropic dry etch step removes portions of amorphous silicon liner 1707, exposing the portions of ferroelectric storage layer 271 on the sidewalls of isolation dielectric layers 203 in trenches 1702, while allowing the remainder of amorphous silicon liner 1707 protect the portions of ferroelectric storage layer 271 in the recesses of multi-layers 251-1 to 251-4. The anisotropic dry etch also sputters away amorphous silicon liner 1707 and ferroelectric storage layer 271 from top of intermediate memory structure 1700. Resulting intermediate memory structure 1700 is shown in FIG. 17(d).

Figure 17G:
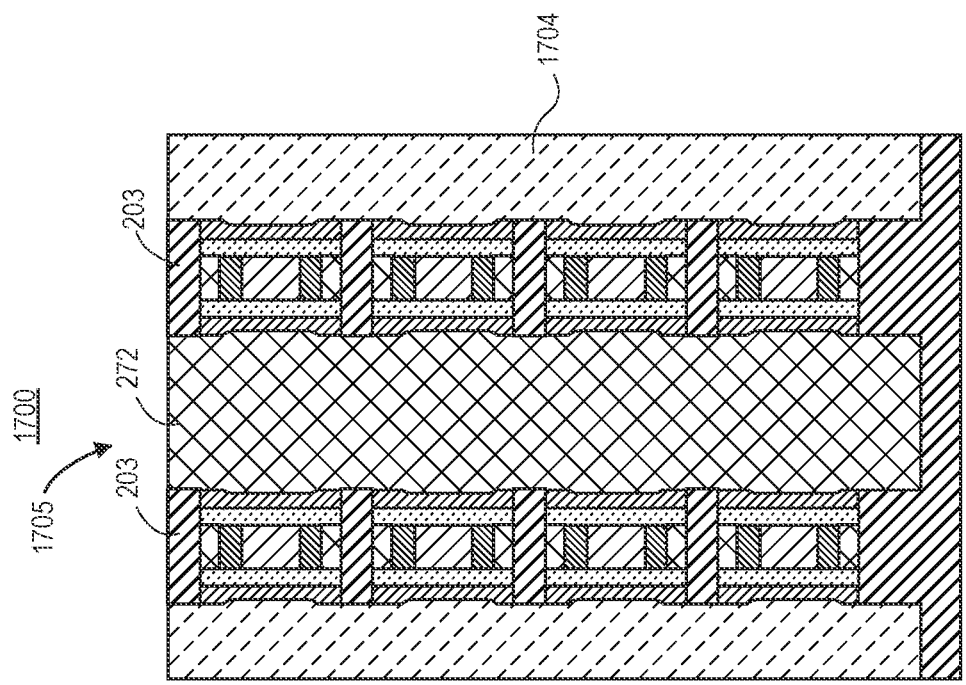
Figure 17F:
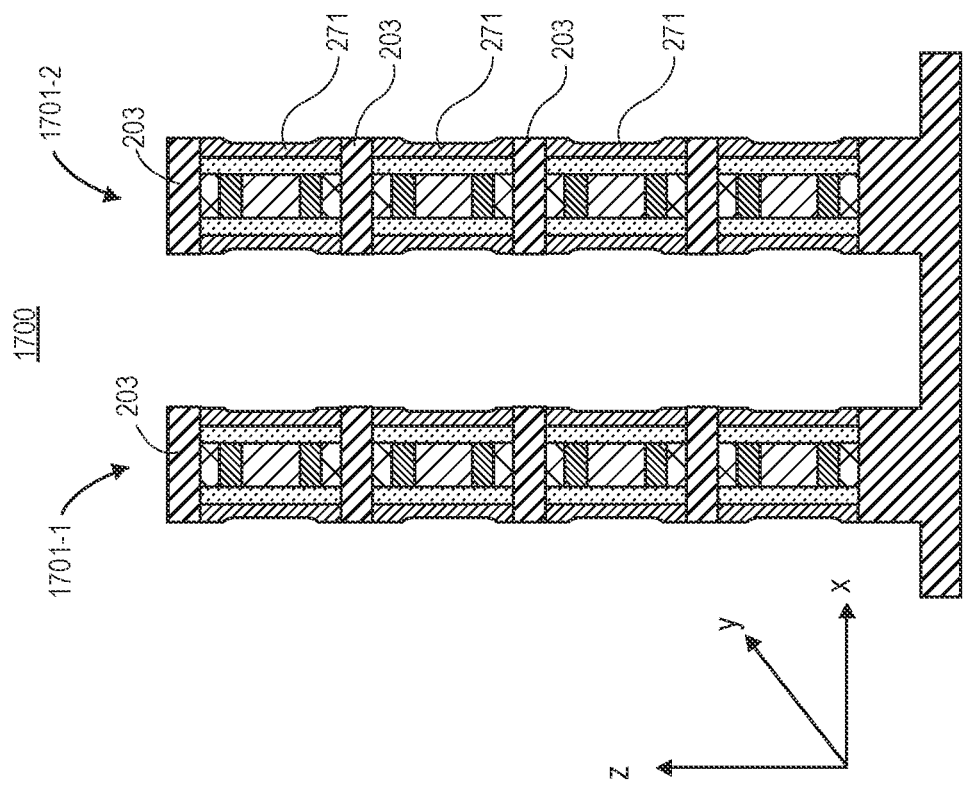

Thereafter, a wet etch that removes the ferroelectric material layer (e.g., hafnium zirconium oxide (HZO)) removes ferroelectric storage layer 271 from the sidewalls of isolation dielectric layers 203. Resulting intermediate memory structure 1700 is shown in FIG. 17(e). Then, the remainder of amorphous silicon liner 1707 may be removed by a wet etch. Resulting intermediate memory structure 1700 is shown in FIG. 17(f).

The 3-dimensional array of NOR memory strings may then be completed using, for example, the process steps described in conjunction with FIGS. 2j to 2t of Provisional Application IV. FIG. 17(g) shows a X-Z plane cross-sectional view of the completed 3-dimensional array of NOR memory strings, showing (i) conductive material 272 (i.e., gate electrode) in shaft 1705, and (ii) oxide 1704 electrically isolating adjacent gate electrodes from each other.

According to another embodiment of the present invention, channel region 270 of FeFET 1353 may be formed with an 8.0 to 15.0 nm thick oxide semiconductor material (e.g., indium zinc oxide (InZnO; or "IZO"). An IZO channel region has the advantage of a high mobility for greater switching performance and without concern for electron or hole tunneling. For example, a 10.0 nm thick IZO film has an electron mobility of 40.6 cm$^2$/V, relative to an aluminum zirconium oxide (AZO) of comparable thickness with an electron mobility of 5.6 cm$^2$/V. Furthermore, the common source region and the common bit line may be formed out of a metal (e.g., Mo). The ferroelectric storage layer of FeFET 1353 may be provided by any of the ferroelectric storage described above (e.g., an SiON interface dielectric layer and a HZO ferroelectric material layer.) As this FeFET does not have a p/n junction, any leakage current from an FeFET in the programmed state is relatively small. Consequently, such an FeFET is particularly advantageous for high-temperature applications. Such an FeFET may also be built with a relatively shorter channel length, as there is no need for a margin to allow for dopant diffusion from the heavily-doped semiconductor common bit line and common source line during any annealing step affecting the channel region. The metal common bit line and common source line also reduces the thickness of the active multi-layer (e.g., 40.0 nm common bit line or common source line, 40.0 nm channel region, and 30.0 nm SiOC interlayer dielectric, for a total of a relatively thinner 150.0 nm). The common source and drain region may be built using a sacrificial material that is replaced in a late metal-replacement step.

The 3-dimensional "horizontal" NOR memory strings of FeFETs disclosed herein have a significant advantages in that they offer a relatively large surface area for the ferroelectric storage layer (e.g., ferroelectric storage layer 271 in FIG. 15(d), 16(d) or 17(j)) when built in the 3-dimensional memory structures disclosed herein (e.g., memory structures 1300, 1500, 1600 or 1700), while requiring a very small footprint on the semiconductor substrate by virtue of their vertical orientation relative to the substrate. This larger surface area provides a tight distribution of voltages in the erase and program states, which are difficult to achieve in highly-scaled planar FeTET.

The FeFETs disclosed herein are illustrated above by adapting storage transistors in the 3-dimensional "horizontal" NOR memory strings, such as those disclosed in Provisional Applications III-IV. However, FeFETs may also be formed by adapting storage transistors in 3-dimensional "vertical" NOR memory strings, such as those disclosed in Provisional Application V, by applying substantially the same principles and methods disclosed herein.

The detailed description above is provided to illustrate specific embodiments of the present invention and is not intended to be limiting. Numerous variations and modifications within the scope of the present invention are possible. For example, while the detailed description above illustrates the present invention using thin-film field-effect transistors with PN junctions between semiconductor layers (e.g., polysilicon layers), the present invention can also be applicable to junction-less transistors. In some embodiments, such junction-less transistors may include thin-film junction-less transistors with a conductive oxide channel region. In some embodiments, suitable conductive metal oxides include gallium oxides, zinc oxides, indium oxides (e.g., indium gallium zinc oxide (IGZO) and indium zinc oxide (IZO)) and any suitable conductive metal oxides with charge-carriers having mobilities can be modified or modulated using suitable preparation or inclusion of suitable impurities. For example, in one embodiment, instead of the polysilicon thin-film field effect transistor with its N$^+$ polysilicon source and drain regions and P$^-$ polysilicon channel region, a junction-less transistor with a low-resistivity conductive material (e.g., titanium nitride (TiN)-lined tungsten (W), tungsten, cobalt, molybdenum) providing the source and drain regions, and a conductive metal oxide (e.g., IGZO) providing a channel region.

The present invention is set forth in the accompanying claims.

We claim:

1. In a 3-dimensional array of memory strings formed above a planar surface of a semiconductor substrate, each memory string comprising:

first, second and third transistor material layers, the third transistor material layer being formed to be in contact with both the first and the second transistor material layers;

a plurality of conductors; and a ferroelectric storage layer between the conductors and the third transistor material layer, and the third transistor material layer is provided between the ferroelectric storage layer and the first and second transistor material layers, wherein (i) the first, the second and the third transistor material layers, the ferroelectric storage layer and the conductors form a plurality of ferroelectric field-effect transistors ("FeFETs") for the memory string; (ii) the first and the second transistor material layers provide a common bit line and a common source line for the FeFETs, respectively; (iii) the third transistor material layer provides a channel region for each FeFET in the memory string, (iv) the ferroelectric storage layer provides a polarizable layer for each FeFET; and (v) each conductor provides a gate electrode for one of the FeFETs in the memory string, wherein each memory string comprises the plurality of FeFETs formed along the common bit line and the common source line, each FeFET being formed at the intersection of each of the conductors to the common bit line and the common source line, and wherein the three dimensional array of memory strings comprises stacks of memory strings formed over the planar surface of the semiconductor substrate, the stacks of memory strings being arrange in a row along a first direction substantially parallel to the planar surface of the semiconductor substrate and each stack being separated from adjacent stacks of memory strings by isolation dielectric layers, the plurality of conductors associated with each memory string being provided in the isolation dielectric layer and extending in a second direction substantially normal to the planar surface of the semiconductor substrate to intersect with the memory strings in each stack, forming the FeFETs at each intersection with the common bit line and the common source line of each memory string in each stack.

2. The memory string of claim 1, wherein the first and second transistor material layers each comprise a semiconductor layer of a first conductivity type, and the third transistor material layer comprises a semiconductor layer of a second conductivity type opposite the first conductivity type.

3. The memory string of claim 1, wherein the first and second transistor material layers each comprise a metal layer, and the third transistor material layer comprises a conductive metal oxide.

4. The memory string of claim 3, wherein the metal layer comprises one or more of titanium nitride-lined tungsten, tungsten, cobalt, and molybdenum.

5. The memory string of claim 3, wherein the conductive metal oxide comprises one or more of: gallium oxides, zinc oxides, and indium oxides.

6. The memory string of claim 5, wherein the indium oxides comprise one or more of: indium gallium zinc oxide (IGZO), indium zinc oxide (IZO) and any conductive metal oxides with charge-carriers mobilities modifiable by inclusion of one or more impurities.

7. The memory string of claim 1, wherein the FeFETs of the memory string are organized as a NOR memory string.

8. The memory string of claim 1, wherein the ferroelectric storage layer comprises an interface dielectric layer and a ferroelectric material layer.

9. The memory string of claim 8, wherein the interface dielectric layer comprises a material with a dielectric constant greater than 3.9.

10. The memory string of claim 8, wherein the interface dielectric layer comprises one or more of zirconium oxide ($ZrO_2$), silicon oxynitride (SiON), silicon nitride ($Si_3N_4$), or silicon oxide ($SiO_2$).

11. The memory string of claim 8, wherein the interface dielectric layer is between 0.0 to 2.0 nm thick.

12. The memory string of claim 8, wherein the interface dielectric layer comprises a native oxide formed inherently when the ferroelectric material layer is directly deposited on the third semiconductor layer.

13. The memory string of claim 8, wherein the interface dielectric layer comprises silicon oxide ($SiO_2$) and a high-k dielectric material.

14. The memory string of claim 13, wherein the high-k dielectric material comprises zirconium oxide ($ZrO_2$).

15. The memory string of claim 8, wherein the ferroelectric material layer comprises a zirconium-doped hafnium oxide ($HfO_2$:Zr; or "HZO"), an aluminum-doped hafnium oxide ($HfO_2$:Al), a silicon-doped hafnium oxide ($HfO_2$:Si) or a lanthanum-doped hafnium oxide ($HfO_2$:La), or any combination thereof.

16. The memory string of claim 15, wherein the HZO comprises hafnium zirconium oxide (HfZrO), hafnium zirconium oxynitride (HfZrON), hafnium zirconium aluminum oxide (HfZrAlO), any combination thereof, or any other hafnium oxide that includes zirconium impurities.

17. The memory string of claim 8, wherein the 3-dimensional array of memory strings are organized such that the ferroelectric material layer of each FeFET is separated from the ferroelectric material layer of the FeFETs in other memory strings.

18. The memory string of claim 1, wherein the ferroelectric storage layer is deposited on the third semiconductor layer using atomic layer deposition (ALD) techniques at temperature between 200° C. to 330° C.

19. The memory string of claim 18, wherein the temperature is between 270° C. and 330° C.

20. The memory string of claim 18, wherein the ferroelectric storage layer is subject to a post-deposition annealing step at a temperature between 400° C. and 1000° C.

21. The memory string of claim 1, wherein each conductor comprises tungsten (W), molybdenum (Mo), aluminum (Al), ruthenium (Ru), tantalum (Ta), titanium (Ti), or any combination or alloy of thereof.

22. The memory string of claim 1, wherein each FeFET has a conducting state threshold voltage greater than 0.0 volts.

23. The memory string of claim 22, wherein the third transistor material layer is boron-doped.

24. The memory string of claim 1, wherein each FeFET has a 1.0 volts to 2.0 volts window between its threshold voltage in its conducting state and its threshold voltage in its non-conducting state.

25. The memory string of claim 1, wherein the third transistor material layer is floating during a programming operation wherein the programming operation is conducted in conjunction with voltage biases that provide a gate-induced drain leakage (GIDL) effect.

26. The memory string of claim 1, wherein at least a portion of the ferroelectric storage layer is deposited using a selective atomic layer deposition technique involving self-assembled monolayers (SAMs) acting on the isolation dielectric layers.

27. The memory string of claim 1, wherein the SAMs comprise species having hydroxyl terminations.

28. The memory string of claim 1, wherein the FeFETs of the memory string are arranged along the first direction substantially parallel to the planar surface.

29. The memory string of claim 1, wherein the FeFETs of a stack of memory strings are arranged along the second direction substantially normal to the planar surface.

30. A thin-film ferroelectric field-effect transistor (FeFET) in a 3-dimensional memory array comprising:
a metal source line and a metal bit line provide above a planar surface of a semiconductor substrate, the metal source line and the metal bit line being arranged along a direction substantially parallel to the planar surface of the semiconductor substrate, the metal source line being separated from the metal bit line by an insulator layer in a direction substantially normal to the planar surface of the semiconductor substrate;

a channel region formed out of an oxide semiconductor material, the channel region being arranged along the direction substantially normal to the planar surface of the semiconductor substrate;

a gate conductor layer arranged along the direction substantially normal to the planar surface of the semiconductor substrate; and a ferroelectric storage layer provided between the channel region and the gate conductor layer, wherein the channel region is in contact with the metal source line and the metal bit line on a first side of the channel region and is in contact with the ferroelectric storage layer on a second side, opposite the first side, of the channel region, the channel region separating the metal source line and the metal bit line from the ferroelectric storage layer.

31. The thin-film FeFET of claim 30, wherein the oxide semiconductor material comprises indium zinc oxide (InZnO; or "IZO").

32. The thin film FeFET of claim 30, wherein the channel region is 8.0 to 12.0 nm thick.

33. The thin-film FeFET of claim 30, wherein the channel region has an electron mobility greater than or equal to 12.0 $cm^2/V$ when the channel region has a thickness greater than 6.0 nm.

34. The thin-film FeFET of claim 30, wherein the metal source line or the metal bit line comprises molybdenum.

35. The thin-film FeFET of claim 30, wherein the FeFET is one of a plurality of FeFETs provided on a memory string.

36. The thin-film FeFET of claim 35, wherein the memory string is organized as a NOR memory string of FeFETs.

37. The thin-film FeFET of claim 35, wherein the memory string is one of a plurality of memory strings formed above the planar surface of a semiconductor substrate.

38. The thin-film FeFET of claim 37, wherein the FeFETs of each memory string are arranged along the direction substantially parallel to the planar surface.

* * * * *